(12) United States Patent
Paluri et al.

(10) Patent No.: US 12,047,579 B2
(45) Date of Patent: Jul. 23, 2024

(54) IMAGE DECODING METHOD FOR CHROMA COMPONENT AND APPARATUS THEREFOR

(71) Applicant: LG Electronics Inc., Seoul (KR)

(72) Inventors: Seethal Paluri, Seoul (KR); Seunghwan Kim, Seoul (KR); Jie Zhao, Seoul (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 17/624,991

(22) PCT Filed: Jul. 3, 2020

(86) PCT No.: PCT/KR2020/008736
§ 371 (c)(1),
(2) Date: Jan. 5, 2022

(87) PCT Pub. No.: WO2021/006559
PCT Pub. Date: Jan. 14, 2021

(65) Prior Publication Data
US 2022/0279186 A1     Sep. 1, 2022

Related U.S. Application Data

(60) Provisional application No. 62/871,062, filed on Jul. 5, 2019.

(51) Int. Cl.
*H04N 19/00*     (2014.01)
*H04N 19/132*    (2014.01)
(Continued)

(52) U.S. Cl.
CPC ......... *H04N 19/132* (2014.11); *H04N 19/176* (2014.11); *H04N 19/186* (2014.11); *H04N 19/46* (2014.11); *H04N 19/70* (2014.11)

(58) Field of Classification Search
CPC .. H04N 19/132; H04N 19/172; H04N 19/176; H04N 19/186; H04N 19/46; H04N 19/70
See application file for complete search history.

(56) References Cited

U.S. PATENT DOCUMENTS

2018/0048901 A1     2/2018 Zhang et al.

FOREIGN PATENT DOCUMENTS

| KR | 20140088098 | 7/2014 |
|---|---|---|
| KR | 20140090156 | 7/2014 |
| KR | 20150064165 | 6/2015 |

OTHER PUBLICATIONS

Paluri et al. "AHG15: Chroma Quantization Qpc Parameter Signalling". Jun. 27, 2019. (Year: 2019).*
(Continued)

*Primary Examiner* — Zhihan Zhou
(74) *Attorney, Agent, or Firm* — Fish & Richardson P.C.

(57) ABSTRACT

An image decoding method performed by a decoding apparatus, according to the present document, comprises the steps of: acquiring image information including chroma quantization parameter data of at least one chroma QP mapping table for chroma components, and prediction information and residual information regarding the chroma components; deriving the chroma QP mapping table on the basis of the chroma quantization parameter data; deriving a chroma quantization parameter for the chroma components on the basis of the chroma QP mapping table; deriving prediction samples for the chroma components on the basis of the prediction information; deriving residual samples on the basis of the residual information and the chroma quantization parameter; and generating a reconstructed picture on the basis of the prediction samples and the residual samples.

4 Claims, 76 Drawing Sheets

(51) Int. Cl.
     *H04N 19/176*     (2014.01)
     *H04N 19/186*     (2014.01)
     *H04N 19/46*      (2014.01)
     *H04N 19/70*      (2014.01)

(56) References Cited

OTHER PUBLICATIONS

Ramasubramonian et al.; Bross et al. "AHG15: On signalling of chroma QP tables"; "Versatile Video Coding (Draft 5)". Jun. 26, 2019; Jun. 11, 2019. (Year: 2019).*

Ramasubramonian et al., "AHG15: On signalling of chroma QP tables," JVET-O0650-v1, Joint Video Experts Team (JVET) of ITU-T SG 16 WP 3 and ISO/IEC JTC 1/SC 29 WG 11, 15th Meeting, Gothenburg, SE, dated Jul. 3-12, 2019, 6 pages.

* cited by examiner

FIG. 12

> Derivation process for quantization parameters
> Inputs to this process are:
>
> – a luma location ( xCb, yCb ) specifying the top-left luma sample of the current coding block relative to the top-left luma sample of the current picture,
>
> – a variable cbWidth specifying the width of the current coding block in luma samples,
>
> – a variable cbHeight specifying the height of the current coding block in luma samples,
>
> – a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.
>
> In this process, the luma quantization parameter $Qp'_Y$ and the chroma quantization parameters $Qp'_{Cb}$ and $Qp'_{Cr}$ are derived.
>
> The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.
>
> NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.
>
> When treeType is equal to SINGLE_TREE or DUAL_TREE_LUMA, the predicted luma quantization parameter $qP_{Y\_PRED}$ is derived by the following ordered steps:
>
>     1. The variable $qP_{Y\_PREV}$ is derived as follows:
>
>        – If one or more of the following conditions are true, $qP_{Y\_PREV}$ is set equal to $SliceQp_Y$:
>
>           – The current quantization group is the first quantization group in a slice.
>
>           – The current quantization group is the first quantization group in a brick.
>
>        – Otherwise, $qP_{Y\_PREV}$ is set

FIG. 13

2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:

– If one or more of the following conditions are true, $qP_{Y\_A}$ is set equal to $qP_{Y\_PREV}$:

– availableA is equal to FALSE.

– the CTB address ctbAddrA of the CTB containing the luma coding block covering the luma location ( xQg − 1, yQg ) is not equal to CtbAddrInBs, where ctbAddrA is derived as follows:

xTmp = ( xQg − 1 ) >> MinTbLog2SizeY
         yTmp = yQg >> MinTbLog2SizeY
         minTbAddrA = MinTbAddrZs[ xTmp ][ yTmp ]
         ctbAddrA = minTbAddrA >> ( 2 * ( CtbLog2SizeY − MinTbLog2SizeY ) )

– Otherwise, $qP_{Y\_A}$ is set equal to the luma quantization parameter $Qp_Y$ of the coding unit containing the luma coding block covering ( xQg − 1, yQg ).

3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:

– If one or more of the following conditions are true, $qP_{Y\_B}$ is set equal to $qP_{Y\_PREV}$:

FIG. 14

- availableB is equal to FALSE.

- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
  yTmp = ( yQg − 1 ) >> MinTbLog2SizeY
  minTbAddrB = MinTbAddrZs[ xTmp ][ yTmp ]
  ctbAddrB =
  minTbAddrB >> ( 2 * ( CtbLog2SizeY − MinTbLog2SizeY ) )          (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.

- the current quantization group is the first quantization group in a CTB row within a brick

- Otherwise, $qP_{Y\_PRED}$ is derived as follows:

$qP_{Y\_PRED} = ( qP_{Y\_A} + qP_{Y\_B} + 1 ) >> 1$

The variable $Qp_Y$ is derived as follows:

$Qp_Y =$
$( ( qP_{Y\_PRED} + CuQpDeltaVal + 64 + 2 * QpBdOffset_Y )\%( 64 + QpBdOffset_Y ) ) − QpBdOffset_Y$

FIG. 15

> The luma quantization parameter $Qp'_Y$ is derived as follows:
>
> $Qp'_Y = Qp_Y + QpBdOffset_Y$
>
> When ChromaArrayType is not equal to 0 and treeType is equal to SINGLE_TREE or DUAL_TREE_CHROMA, the following applies:
>
> – When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).
>
> – The variables $qP_{Cb}$, $qP_{Cr}$ and $qP_{CbCr}$ are derived as follows:
>
> $qPi_{Cb} = Clip3(-QpBdOffset_C, 69, Qp_Y + pps\_cb\_qp\_offset + slice\_cb\_qp\_offset)$
>
> $qPi_{Cr} = Clip3(-QpBdOffset_C, 69, Qp_Y + pps\_cr\_qp\_offset + slice\_cr\_qp\_offset)$
>
> $qPi_{CbCr} = Clip3(-QpBdOffset_C, 69, Qp_Y + pps\_joint\_cbcr\_qp\_offset + slice\_joint\_cbcr\_qp\_offset)$
>
> – If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ based on the index qPi equal to $qPi_{Cb}$, $qPi_{Cr}$ and $qPi_{CbCr}$, respectively as described below:
>
> The variable $Qp_C Idx[\ i\ ]$ is derived as follows:
>
> - For i < qPi_min_idx, $Qp_C Idx[\ i\ ]$ is set equal to qPi.
>
> - For i = qPi_min_idx ... qPiMaxIdx, the following applies:
>
> $Qp_C Idx[\ i\ ] = Qp_C\_qPi\_delta\_val[\ i\ ] + Qp_C Idx[\ i\ -1]$
>
> For i > qPiMaxIdx, $Qp_C Idx[\ i\ ] = qPi - QpOffset_C$
>
> The value of $Qp_C$ is derived as $Qp_C Idx[qPi]$
>
> – If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 16

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$ Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 17

8.7.1 Derivation process for quantization parameters

Inputs to this process are:

– a luma location ( xCb, yCb ) specifying the top-left luma sample of the current coding block relative to the top-left luma sample of the current picture, – a variable cbWidth specifying the width of the current coding block in luma samples, – a variable cbHeight specifying the height of the current coding block in luma samples, – a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.

NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

– If one or more of the following conditions are true, $qP_{Y\_PREV}$ is set equal to $SliceQp_Y$:

– The current quantization group is the first quantization group in a slice.

– The current quantization group is the first quantization group in a brick.

– Otherwise, $qP_{Y\_PREV}$ is set

FIG. 18

> 2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:
>
>    − If one or more of the following conditions are true, $qP_{Y\_A}$ is set equal to $qP_{Y\_PREV}$:
>
>       − availableA is equal to FALSE.
>
>       − the CTB address ctbAddrA of the CTB containing the luma coding block covering the luma location ( xQg − 1, yQg ) is not equal to CtbAddrInBs, where ctbAddrA is derived as follows:
>
>       xTmp = ( xQg − 1 ) >> MinTbLog2SizeY
>       yTmp = yQg >> MinTbLog2SizeY
>       minTbAddrA = MinTbAddrZs[ xTmp ][ yTmp ]
>       ctbAddrA = minTbAddrA >> ( 2 * ( CtbLog2SizeY − MinTbLog2SizeY ) )
>
>    − Otherwise, $qP_{Y\_A}$ is set equal to the luma quantization parameter $Qp_Y$ of the coding unit containing the luma coding block covering ( xQg − 1, yQg ).
>
> 3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:
>
>    − If one or more of the following conditions are true, $qP_{Y\_B}$ is set equal to $qP_{Y\_PREV}$:

FIG. 19

- availableB is equal to FALSE.

- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
yTmp = ( yQg − 1 ) >> MinTbLog2SizeY
minTbAddrB = MinTbAddrZs[ xTmp ][ yTmp ]
ctbAddrB =
minTbAddrB >> ( 2 * ( CtbLog2SizeY − MinTbLog2SizeY ) )     (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.

- the current quantization group is the first quantization group in a CTB row within a brick

- Otherwise, $qP_{Y\_PRED}$ is derived as follows:

$qP_{Y\_PRED} = ( qP_{Y\_A} + qP_{Y\_B} + 1 ) >> 1$

The variable $Qp_Y$ is derived as follows:

$Qp_Y =$
$( ( qP_{Y\_PRED} + CuQpDeltaVal + 64 + 2 * QpBdOffset_Y )\%( 64 + QpBdOffset_Y ) ) − QpBdOffset_Y$

The luma quantization parameter $Qp'_Y$ is derived as follows:

$$Qp'_Y = Qp_Y + QpBdOffset_Y$$

When ChromaArrayType is not equal to 0 and treeType is equal to SINGLE_TREE or DUAL_TREE_CHROMA, the following applies:

– When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

– The variables $qP_{Cb}$, $qP_{Cr}$ and $qP_{CbCr}$ are derived as follows:

$$qPi_{Cb} = Clip3(\ -QpBdOffset_C, 69, Qp_Y + pps\_cb\_qp\_offset + slice\_cb\_qp\_offset\ )$$

$$qPi_{Cr} = Clip3(\ -QpBdOffset_C, 69, Qp_Y + pps\_cr\_qp\_offset + slice\_cr\_qp\_offset\ )$$

$$qPi_{CbCr} = Clip3(\ -QpBdOffset_C, 69, Qp_Y + pps\_joint\_cbcr\_qp\_offset + slice\_joint\_cbcr\_qp\_offset\ )$$

– If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively – If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 21

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$

Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 22

8.7.1 Derivation process for quantization parameters

Inputs to this process are:

– a luma location ( xCb, yCb ) specifying the top-left luma sample of the current coding block relative to the top-left luma sample of the current picture, – a variable cbWidth specifying the width of the current coding block in luma samples, – a variable cbHeight specifying the height of the current coding block in luma samples, – a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.

NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

– If one or more of the following conditions are true, $qP_{Y\_PREV}$ is set equal to $SliceQp_Y$:

– The current quantization group is the first quantization group in a slice.

– The current quantization group is the first quantization group in a brick.

– Otherwise, $qP_{Y\_PREV}$ is set

FIG. 23

> 2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:
>
>> – If one or more of the following conditions are true, $qP_{Y\_A}$ is set equal to $qP_{Y\_PREV}$:
>>
>>> – availableA is equal to FALSE.
>>>
>>> – the CTB address ctbAddrA of the CTB containing the luma coding block covering the luma location ( xQg − 1, yQg ) is not equal to CtbAddrInBs, where ctbAddrA is derived as follows:
>>>
>>> xTmp = ( xQg − 1 ) >> MinTbLog2SizeY
>>> yTmp = yQg >> MinTbLog2SizeY
>>> minTbAddrA = MinTbAddrZs[ xTmp ][ yTmp ]
>>> ctbAddrA = minTbAddrA >> ( 2 * ( CtbLog2SizeY − MinTbLog2SizeY ) )
>>
>> – Otherwise, $qP_{Y\_A}$ is set equal to the luma quantization parameter $Qp_Y$ of the coding unit containing the luma coding block covering ( xQg − 1, yQg ).
>
> 3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:
>
>> – If one or more of the following conditions are true, $qP_{Y\_B}$ is set equal to $qP_{Y\_PREV}$:

FIG. 24

- availableB is equal to FALSE.

- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
yTmp = ( yQg − 1 ) >> MinTbLog2SizeY
minTbAddrB = MinTbAddrZs[ xTmp ][ yTmp ]
ctbAddrB =
minTbAddrB >> ( 2 * ( CtbLog2SizeY − MinTbLog2SizeY ) )        (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.

- the current quantization group is the first quantization group in a CTB row within a brick

- Otherwise, $qP_{Y\_PRED}$ is derived as follows:

$qP_{Y\_PRED} = ( qP_{Y\_A} + qP_{Y\_B} + 1 ) >> 1$

The variable $Qp_Y$ is derived as follows:

$Qp_Y =$
$( ( qP_{Y\_PRED} + CuQpDeltaVal + 64 + 2 * QpBdOffset_Y )\%( 64 + QpBdOffset_Y ) ) - QpBdOffset_Y$

FIG. 25

The luma quantization parameter $Qp'_Y$ is derived as follows:

$Qp'_Y = Qp_Y + QpBdOffset_Y$

When ChromaArrayType is not equal to 0 and treeType is equal to SINGLE_TREE or DUAL_TREE_CHROMA, the following applies:

– When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

– The variables $qP_{Cb}$, $qP_{Cr}$ and $qP_{CbCr}$ are derived as follows:

$qPi_{Cb} = Clip3( -QpBdOffset_C, 69, Qp_Y + pps\_cb\_qp\_offset + slice\_cb\_qp\_offset )$ $qPi_{Cr} = Clip3( -QpBdOffset_C, 69, Qp_Y + pps\_cr\_qp\_offset + slice\_cr\_qp\_offset )$ $qPi_{CbCr} = Clip3( -QpBdOffset_C, 69, Qp_Y + pps\_joint\_cbcr\_qp\_offset + slice\_joint\_cbcr\_qp\_offset )$ – If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively – If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 26

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$ Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 27

8.7.1 Derivation process for quantization parameters

Inputs to this process are:

–a luma location ( xCb, yCb ) specifying the top-left luma sample of the current coding block relative to the top-left luma sample of the current picture, –a variable cbWidth specifying the width of the current coding block in luma samples, –a variable cbHeight specifying the height of the current coding block in luma samples, –a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.

NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

– If one or more of the following conditions are true, $qP_{Y\_PREV}$ is set equal to $SliceQp_Y$:

– The current quantization group is the first quantization group in a slice.

– The current quantization group is the first quantization group in a brick.

– Otherwise, $qP_{Y\_PREV}$ is set

FIG. 28

> 2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:
>
>   − If one or more of the following conditions are true, $qP_{Y\_A}$ is set equal to $qP_{Y\_PREV}$:
>
>     − availableA is equal to FALSE.
>
>     − the CTB address ctbAddrA of the CTB containing the luma coding block covering the luma location ( xQg − 1, yQg ) is not equal to CtbAddrInBs, where ctbAddrA is derived as follows:
>
>       xTmp = ( xQg − 1 ) >> MinTbLog2SizeY
>       yTmp = yQg >> MinTbLog2SizeY
>       minTbAddrA = MinTbAddrZs[ xTmp ][ yTmp ]
>       ctbAddrA = minTbAddrA >> ( 2 * ( CtbLog2SizeY − MinTbLog2SizeY ) )
>
>   − Otherwise, $qP_{Y\_A}$ is set equal to the luma quantization parameter $Qp_Y$ of the coding unit containing the luma coding block covering ( xQg − 1, yQg ).
>
> 3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:
>
>   − If one or more of the following conditions are true, $qP_{Y\_B}$ is set equal to $qP_{Y\_PREV}$:

FIG. 29

> - availableB is equal to FALSE.
>
> - the CTB address ctbAddrB of the CTB containing the luma coding block covering the luma location ( xQg, yQg − 1 ) is not equal to CtbAddrInBs, where ctbAddrB is derived as follows:
>
>   xTmp = xQg >> MinTbLog2SizeY
>   yTmp = ( yQg − 1 ) >> MinTbLog2SizeY
>   minTbAddrB = MinTbAddrZs[ xTmp ][ yTmp ]
>   ctbAddrB =
>   minTbAddrB >> ( 2 * ( CtbLog2SizeY − MinTbLog2SizeY ) )  (8-922)
>
> - Otherwise, $qP_{Y\_B}$ is set equal to the luma quantization parameter $Qp_Y$ of the coding unit containing the luma coding block covering ( xQg, yQg − 1 ).
>
> 4. The predicted luma quantization parameter $qP_{Y\_PRED}$ is derived as follows:
>
>    - If all the following conditions are true, then $qP_{Y\_PRED}$ is set equal to the luma quantization parameter $Qp_Y$ of the coding unit containing the luma coding block covering ( xQg, yQg − 1 ):
>
>      - availableB is equal to TRUE.
>
>      - the current quantization group is the first quantization group in a CTB row within a brick
>
>    - Otherwise, $qP_{Y\_PRED}$ is derived as follows:
>
>      $qP_{Y\_PRED} = ( qP_{Y\_A} + qP_{Y\_B} + 1 ) >> 1$
>
> The variable $Qp_Y$ is derived as follows:
>
> $Qp_Y =$
> $( ( qP_{Y\_PRED} + CuQpDeltaVal + 64 + 2 * QpBdOffset_Y )\%( 64 + QpBdOffset_Y ) ) − QpBdOffset_Y$

FIG. 30

The luma quantization parameter $Qp'_Y$ is derived as follows:

$Qp'_Y = Qp_Y + QpBdOffset_Y$

When ChromaArrayType is not equal to 0 and treeType is equal to SINGLE_TREE or DUAL_TREE_CHROMA, the following applies:

– When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

– The variables $qP_{Cb}$, $qP_{Cr}$ and $qP_{CbCr}$ are derived as follows:

$qPi_{Cb} = Clip3(-QpBdOffset_C, 69, Qp_Y + pps\_cb\_qp\_offset + slice\_cb\_qp\_offset )$ $qPi_{Cr} = Clip3(-QpBdOffset_C, 69, Qp_Y + pps\_cr\_qp\_offset + slice\_cr\_qp\_offset )$ $qPi_{CbCr} = Clip3(-QpBdOffset_C, 69, Qp_Y + pps\_joint\_cbcr\_qp\_offset + slice\_joint\_cbcr\_qp\_offset )$ – If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively – If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 31

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$ Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 32

8.7.1 Derivation process for quantization parameters

Inputs to this process are:

– a luma location ( xCb, yCb ) specifying the top-left luma sample of the current coding block relative to the top-left luma sample of the current picture, – a variable cbWidth specifying the width of the current coding block in luma samples, – a variable cbHeight specifying the height of the current coding block in luma samples, – a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.

NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

– If one or more of the following conditions are true, $qP_{Y\_PREV}$ is set equal to $SliceQp_Y$:

– The current quantization group is the first quantization group in a slice.

– The current quantization group is the first quantization group in a brick.

– Otherwise, $qP_{Y\_PREV}$ is set

FIG. 33

> 2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:
>
> — If one or more of the following conditions are true, $qP_{Y\_A}$ is set equal to $qP_{Y\_PREV}$:
>
> — availableA is equal to FALSE.
>
> — the CTB address ctbAddrA of the CTB containing the luma coding block covering the luma location ( xQg − 1, yQg ) is not equal to CtbAddrInBs, where ctbAddrA is derived as follows:
>
> xTmp = ( xQg − 1 ) >> MinTbLog2SizeY
> yTmp = yQg >> MinTbLog2SizeY
> minTbAddrA = MinTbAddrZs[ xTmp ][ yTmp ]
> ctbAddrA = minTbAddrA >> ( 2 * ( CtbLog2SizeY − MinTbLog2SizeY ) )
>
> — Otherwise, $qP_{Y\_A}$ is set equal to the luma quantization parameter $Qp_Y$ of the coding unit containing the luma coding block covering ( xQg − 1, yQg ).
>
> 3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:
>
> — If one or more of the following conditions are true, $qP_{Y\_B}$ is set equal to $qP_{Y\_PREV}$:

FIG. 34

- availableB is equal to FALSE.
- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
  yTmp = ( yQg − 1 ) >> MinTbLog2SizeY
  minTbAddrB = MinTbAddrZs[ xTmp ][ yTmp ]
  ctbAddrB =
  minTbAddrB >> ( 2 * ( CtbLog2SizeY − MinTbLog2SizeY ) )     (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.
     - the current quantization group is the first quantization group in a CTB row within a brick

- Otherwise, $qP_{Y\_PRED}$ is derived as follows:

$qP_{Y\_PRED}$ = ( $qP_{Y\_A}$ + $qP_{Y\_B}$ + 1 ) >> 1

The variable $Qp_Y$ is derived as follows:

$Qp_Y$ =
( ( $qP_{Y\_PRED}$ + CuQpDeltaVal + 64 + 2 * $QpBdOffset_Y$ )%( 64 + $QpBdOffset_Y$ ) ) − $QpBdOffset_Y$

FIG. 35

The luma quantization parameter $Qp'_Y$ is derived as follows:

$Qp'_Y = Qp_Y + QpBdOffset_Y$

When ChromaArrayType is not equal to 0 and treeType is equal to SINGLE_TREE or DUAL_TREE_CHROMA, the following applies:

- When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

- The variables $qP_{Cb}$, $qP_{Cr}$ and $qP_{CbCr}$ are derived as follows:

$qPi_{Cb} = Clip3(-QpBdOffset_C, 69, Qp_Y + pps\_cb\_qp\_offset + slice\_cb\_qp\_offset )$ $qPi_{Cr} = Clip3(-QpBdOffset_C, 69, Qp_Y + pps\_cr\_qp\_offset + slice\_cr\_qp\_offset )$ $qPi_{CbCr} = Clip3(-QpBdOffset_C, 69, Qp_Y + pps\_joint\_cbcr\_qp\_offset + slice\_joint\_cbcr\_qp\_offset )$

- If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively

- If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 36

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$ Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 37

8.7.1 Derivation process for quantization parameters
Inputs to this process are:

–a luma location ( xCb, yCb ) specifying the top-left luma sample of the current coding block relative to the top-left luma sample of the current picture, –a variable cbWidth specifying the width of the current coding block in luma samples, –a variable cbHeight specifying the height of the current coding block in luma samples, –a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.

NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

– If one or more of the following conditions are true, $qP_{Y\_PREV}$ is set equal to $SliceQp_Y$:

– The current quantization group is the first quantization group in a slice.

– The current quantization group is the first quantization group in a brick.

– Otherwise, $qP_{Y\_PREV}$ is set

FIG. 38

2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:

– If one or more of the following conditions are true, $qP_{Y\_A}$ is set equal to $qP_{Y\_PREV}$:

– availableA is equal to FALSE.

– the CTB address ctbAddrA of the CTB containing the luma coding block covering the luma location ( xQg − 1, yQg ) is not equal to CtbAddrInBs, where ctbAddrA is derived as follows:

xTmp = ( xQg − 1 ) >> MinTbLog2SizeY
      yTmp = yQg >> MinTbLog2SizeY
      minTbAddrA = MinTbAddrZs[ xTmp ][ yTmp ]
      ctbAddrA = minTbAddrA >> ( 2 * ( CtbLog2SizeY − MinTbLog2SizeY ) )

– Otherwise, $qP_{Y\_A}$ is set equal to the luma quantization parameter $Qp_Y$ of the coding unit containing the luma coding block covering ( xQg − 1, yQg ).

3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:

– If one or more of the following conditions are true, $qP_{Y\_B}$ is set equal to $qP_{Y\_PREV}$:

FIG. 39

- availableB is equal to FALSE.

- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
yTmp = ( yQg − 1 ) >> MinTbLog2SizeY
minTbAddrB = MinTbAddrZs[ xTmp ][ yTmp ]
ctbAddrB =
minTbAddrB >> ( 2 * ( CtbLog2SizeY − MinTbLog2SizeY ) )         (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.

- the current quantization group is the first quantization group in a CTB row within a brick

- Otherwise, $qP_{Y\_PRED}$ is derived as follows:

$qP_{Y\_PRED} = ( qP_{Y\_A} + qP_{Y\_B} + 1 ) >> 1$

The variable $Qp_Y$ is derived as follows:

$Qp_Y =$
$( ( qP_{Y\_PRED} + CuQpDeltaVal + 64 + 2 * QpBdOffset_Y )\%( 64 + QpBdOffset_Y ) ) - QpBdOffset_Y$

FIG. 40

> The luma quantization parameter Qp'$_Y$ is derived as follows:
>
> $$Qp'_Y = Qp_Y + QpBdOffset_Y$$
>
> When ChromaArrayType is not equal to 0 and treeType is equal to SINGLE_TREE or DUAL_TREE_CHROMA, the following applies:
>
> – When treeType is equal to DUAL_TREE_CHROMA, the variable Qp$_Y$ is set equal to the luma quantization parameter Qp$_Y$ of the luma coding unit that covers the luma location ( xCb + cbWidth / 2, yCb + cbHeight / 2 ).
>
> – The variables qP$_{Cb}$, qP$_{Cr}$ and qP$_{CbCr}$ are derived as follows:
>
> $$qPi_{Cb} = Clip3(-QpBdOffset_C, 69, Qp_Y + pps\_cb\_qp\_offset + slice\_cb\_qp\_offset)$$
>
> $$qPi_{Cr} = Clip3(-QpBdOffset_C, 69, Qp_Y + pps\_cr\_qp\_offset + slice\_cr\_qp\_offset)$$
>
> $$qPi_{CbCr} = Clip3(-QpBdOffset_C, 69, Qp_Y + pps\_joint\_cbcr\_qp\_offset + slice\_joint\_cbcr\_qp\_offset)$$
>
> – If ChromaArrayType is equal to 1, and Qpc_data_default_flag is equal to FALSE, the variables qP$_{Cb}$, qP$_{Cr}$ and qP$_{CbCr}$ are set equal to the value of Qp$_C$ as-specified in clause 7.x.x based on the index qPi equal to qPi$_{Cb}$, qPi$_{Cr}$ and qPi$_{CbCr}$, respectively
>
> – If ChromaArrayType is equal to 1, and Qpc_data_default_flag is equal to TRUE, the variables qP$_{Cb}$, qP$_{Cr}$ and qP$_{CbCr}$ are specified in Table 8-15 based on the index qPi equal to qPi$_{Cb}$, qPi$_{Cr}$ and qPi$_{CbCr}$, respectively

FIG. 41

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$ Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 42

8.7.1 Derivation process for quantization parameters

Inputs to this process are:

– a luma location ( xCb, yCb ) specifying the top-left luma sample of the current coding block relative to the top-left luma sample of the current picture, – a variable cbWidth specifying the width of the current coding block in luma samples, – a variable cbHeight specifying the height of the current coding block in luma samples, – a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.

NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

– If one or more of the following conditions are true, $qP_{Y\_PREV}$ is set equal to $SliceQp_Y$:

– The current quantization group is the first quantization group in a slice.

– The current quantization group is the first quantization group in a brick.

– Otherwise, $qP_{Y\_PREV}$ is set

FIG. 43

2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:

- If one or more of the following conditions are true, $qP_{Y\_A}$ is set equal to $qP_{Y\_PREV}$:

- availableA is equal to FALSE.

- the CTB address ctbAddrA of the CTB containing the luma coding block covering the luma location ( xQg − 1, yQg ) is not equal to CtbAddrInBs, where ctbAddrA is derived as follows:

xTmp = ( xQg − 1 ) >> MinTbLog2SizeY
        yTmp = yQg >> MinTbLog2SizeY
        minTbAddrA = MinTbAddrZs[ xTmp ][ yTmp ]
        ctbAddrA = minTbAddrA >> ( 2 * ( CtbLog2SizeY − MinTbLog2SizeY ) )

- Otherwise, $qP_{Y\_A}$ is set equal to the luma quantization parameter $Qp_Y$ of the coding unit containing the luma coding block covering ( xQg − 1, yQg ).

3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:

- If one or more of the following conditions are true, $qP_{Y\_B}$ is set equal to $qP_{Y\_PREV}$:

FIG. 44

- availableB is equal to FALSE.

- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
  yTmp = ( yQg − 1 ) >> MinTbLog2SizeY
  minTbAddrB = MinTbAddrZs[ xTmp ][ yTmp ]
  ctbAddrB =
  minTbAddrB >> ( 2 * ( CtbLog2SizeY − MinTbLog2SizeY ) )     (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.

- the current quantization group is the first quantization group in a CTB row within a brick

- Otherwise, $qP_{Y\_PRED}$ is derived as follows:

$qP_{Y\_PRED} = ( qP_{Y\_A} + qP_{Y\_B} + 1 ) >> 1$

The variable $Qp_Y$ is derived as follows:

$Qp_Y =$
$( ( qP_{Y\_PRED} + CuQpDeltaVal + 64 + 2 * QpBdOffset_Y )\%( 64 + QpBdOffset_Y ) ) - QpBdOffset_Y$

FIG. 45

The luma quantization parameter $Qp'_Y$ is derived as follows:

$$Qp'_Y = Qp_Y + QpBdOffset_Y$$

When ChromaArrayType is not equal to 0 and treeType is equal to SINGLE_TREE or DUAL_TREE_CHROMA, the following applies:

- When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

- The variables $qP_{Cb}$, $qP_{Cr}$ and $qP_{CbCr}$ are derived as follows:

$qPi_{Cb} = \text{Clip3}( -QpBdOffset_C, 69, Qp_Y + pps\_cb\_qp\_offset + slice\_cb\_qp\_offset )$ $qPi_{Cr} = \text{Clip3}( -QpBdOffset_C, 69, Qp_Y + pps\_cr\_qp\_offset + slice\_cr\_qp\_offset )$ $qPi_{CbCr} = \text{Clip3}( -QpBdOffset_C, 69, Qp_Y + pps\_joint\_cbcr\_qp\_offset + slice\_joint\_cbcr\_qp\_offset )$

- If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively

- If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 46

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$ Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 47

8.7.1 Derivation process for quantization parameters
Inputs to this process are:

– a luma location ( xCb, yCb ) specifying the top-left luma sample of the current coding block relative to the top-left luma sample of the current picture, – a variable cbWidth specifying the width of the current coding block in luma samples, – a variable cbHeight specifying the height of the current coding block in luma samples, – a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.

NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

– If one or more of the following conditions are true, $qP_{Y\_PREV}$ is set equal to $SliceQp_Y$:

– The current quantization group is the first quantization group in a slice.

– The current quantization group is the first quantization group in a brick.

– Otherwise, $qP_{Y\_PREV}$ is set

FIG. 48

> 2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:
>
>    – If one or more of the following conditions are true, $qP_{Y\_A}$ is set equal to $qP_{Y\_PREV}$:
>
>      – availableA is equal to FALSE.
>
>      – the CTB address ctbAddrA of the CTB containing the luma coding block covering the luma location ( xQg − 1, yQg ) is not equal to CtbAddrInBs, where ctbAddrA is derived as follows:
>
>      xTmp = ( xQg − 1 ) >> MinTbLog2SizeY
>      yTmp = yQg >> MinTbLog2SizeY
>      minTbAddrA = MinTbAddrZs[ xTmp ][ yTmp ]
>      ctbAddrA = minTbAddrA >> ( 2 * ( CtbLog2SizeY − MinTbLog2SizeY ) )
>
>    – Otherwise, $qP_{Y\_A}$ is set equal to the luma quantization parameter $Qp_Y$ of the coding unit containing the luma coding block covering ( xQg − 1, yQg ).
>
> 3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:
>
>    – If one or more of the following conditions are true, $qP_{Y\_B}$ is set equal to $qP_{Y\_PREV}$:

FIG. 49

- availableB is equal to FALSE.

- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
  yTmp = ( yQg − 1 ) >> MinTbLog2SizeY
  minTbAddrB = MinTbAddrZs[ xTmp ][ yTmp ]
  ctbAddrB =
  minTbAddrB >> ( 2 * ( CtbLog2SizeY − MinTbLog2SizeY ) )             (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.

- the current quantization group is the first quantization group in a CTB row within a brick

- Otherwise, $qP_{Y\_PRED}$ is derived as follows:

$qP_{Y\_PRED} = ( qP_{Y\_A} + qP_{Y\_B} + 1 ) >> 1$

The variable $Qp_Y$ is derived as follows:

$Qp_Y =$
$( ( qP_{Y\_PRED} + CuQpDeltaVal + 64 + 2 * QpBdOffset_Y )\%( 64 + QpBdOffset_Y ) ) − QpBdOffset_Y$

FIG. 50

The luma quantization parameter $Qp'_Y$ is derived as follows:

$Qp'_Y = Qp_Y + QpBdOffset_Y$

When ChromaArrayType is not equal to 0 and treeType is equal to SINGLE_TREE or DUAL_TREE_CHROMA, the following applies:

- When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

- The variables $qP_{Cb}$, $qP_{Cr}$ and $qP_{CbCr}$ are derived as follows:

$qPi_{Cb} = Clip3( -QpBdOffset_C, 69, Qp_Y + pps\_cb\_qp\_offset + slice\_cb\_qp\_offset )$ $qPi_{Cr} = Clip3( -QpBdOffset_C, 69, Qp_Y + pps\_cr\_qp\_offset + slice\_cr\_qp\_offset )$ $qPi_{CbCr} = Clip3( -QpBdOffset_C, 69, Qp_Y + pps\_joint\_cbcr\_qp\_offset + slice\_joint\_cbcr\_qp\_offset )$

- If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively

- If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 51

- Otherwise, the variables qP$_{Cb}$, qP$_{Cr}$ and qP$_{CbCr}$ are set equal to Min( qPi, 63 ), based on the index qPi equal to qPi$_{Cb}$, qPi$_{Cr}$ and qPi$_{CbCr}$, respectively.

- The chroma quantization parameters for the Cb and Cr components, Qp'$_{Cb}$ and Qp'$_{Cr}$, and joint Cb-Cr coding Qp'$_{CbCr}$ are derived as follows:

Qp'$_{Cb}$ = qP$_{Cb}$ + QpBdOffset$_C$

Qp'$_{Cr}$ = qP$_{Cr}$ + QpBdOffset$_C$

Qp'$_{CbCr}$ = qP$_{CbCr}$ + QpBdOffset$_C$

Table 8-15 – Specification of Qp$_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| Qp$_C$ | = qPi | 29 | 30 | 31 | 32 | 33 | 33 | 34 | 34 | 35 | 35 | 36 | 36 | 37 | 37 | = qPi − 6 |

FIG. 52

> 8.7.1 Derivation process for quantization parameters
> Inputs to this process are:
>
> – a luma location ( xCb, yCb ) specifying the top-left luma sample of the current coding block relative to the top-left luma sample of the current picture,
>
> – a variable cbWidth specifying the width of the current coding block in luma samples,
>
> – a variable cbHeight specifying the height of the current coding block in luma samples,
>
> – a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.
>
> In this process, the luma quantization parameter $Qp'_Y$ and the chroma quantization parameters $Qp'_{Cb}$ and $Qp'_{Cr}$ are derived.
>
> The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.
>
> NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.
>
> When treeType is equal to SINGLE_TREE or DUAL_TREE_LUMA, the predicted luma quantization parameter $qP_{Y\_PRED}$ is derived by the following ordered steps:
>
> 1. The variable $qP_{Y\_PREV}$ is derived as follows:
>
>     – If one or more of the following conditions are true, $qP_{Y\_PREV}$ is set equal to $SliceQp_Y$:
>
>         – The current quantization group is the first quantization group in a slice.
>
>         – The current quantization group is the first quantization group in a brick.
>
>     – Otherwise, $qP_{Y\_PREV}$ is set

FIG. 53

> 2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:
>
>    − If one or more of the following conditions are true, $qP_{Y\_A}$ is set equal to $qP_{Y\_PREV}$:
>
>       − availableA is equal to FALSE.
>
>       − the CTB address ctbAddrA of the CTB containing the luma coding block covering the luma location ( xQg − 1, yQg ) is not equal to CtbAddrInBs, where ctbAddrA is derived as follows:
>
>         xTmp = ( xQg − 1 ) >> MinTbLog2SizeY
>         yTmp = yQg >> MinTbLog2SizeY
>         minTbAddrA = MinTbAddrZs[ xTmp ][ yTmp ]
>         ctbAddrA = minTbAddrA >> ( 2 * ( CtbLog2SizeY − MinTbLog2SizeY ) )
>
>    − Otherwise, $qP_{Y\_A}$ is set equal to the luma quantization parameter $Qp_Y$ of the coding unit containing the luma coding block covering ( xQg − 1, yQg ).
>
> 3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:
>
>    − If one or more of the following conditions are true, $qP_{Y\_B}$ is set equal to $qP_{Y\_PREV}$:

FIG. 54

- availableB is equal to FALSE.

- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
  yTmp = ( yQg − 1 ) >> MinTbLog2SizeY
  minTbAddrB = MinTbAddrZs[ xTmp ][ yTmp ]
  ctbAddrB =
  minTbAddrB >> ( 2 * ( CtbLog2SizeY − MinTbLog2SizeY ) )         (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.

- the current quantization group is the first quantization group in a CTB row within a brick

- Otherwise, $qP_{Y\_PRED}$ is derived as follows:

$qP_{Y\_PRED} = ( qP_{Y\_A} + qP_{Y\_B} + 1 ) >> 1$

The variable $Qp_Y$ is derived as follows:

$Qp_Y =$
$( ( qP_{Y\_PRED} + CuQpDeltaVal + 64 + 2 * QpBdOffset_Y )\%( 64 + QpBdOffset_Y ) ) − QpBdOffset_Y$

FIG. 55

The luma quantization parameter $Qp'_Y$ is derived as follows:

$$Qp'_Y = Qp_Y + QpBdOffset_Y$$

When ChromaArrayType is not equal to 0 and treeType is equal to SINGLE_TREE or DUAL_TREE_CHROMA, the following applies:

- When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

- The variables $qP_{Cb}$, $qP_{Cr}$ and $qP_{CbCr}$ are derived as follows:

$$qPi_{Cb} = Clip3(-QpBdOffset_C, 69, Qp_Y + pps\_cb\_qp\_offset + slice\_cb\_qp\_offset)$$

$$qPi_{Cr} = Clip3(-QpBdOffset_C, 69, Qp_Y + pps\_cr\_qp\_offset + slice\_cr\_qp\_offset)$$

$$qPi_{CbCr} = Clip3(-QpBdOffset_C, 69, Qp_Y + pps\_joint\_cbcr\_qp\_offset + slice\_joint\_cbcr\_qp\_offset)$$

- If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively

- If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 56

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$ Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

8.7.1 Derivation process for quantization parameters

Inputs to this process are:

– a luma location ( xCb, yCb ) specifying the top-left luma sample of the current coding block relative to the top-left luma sample of the current picture, – a variable cbWidth specifying the width of the current coding block in luma samples, – a variable cbHeight specifying the height of the current coding block in luma samples, – a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.

NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

– If one or more of the following conditions are true, $qP_{Y\_PREV}$ is set equal to $SliceQp_Y$:

– The current quantization group is the first quantization group in a slice.

– The current quantization group is the first quantization group in a brick.

– Otherwise, $qP_{Y\_PREV}$ is set

FIG. 58

2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:

- If one or more of the following conditions are true, $qP_{Y\_A}$ is set equal to $qP_{Y\_PREV}$:

- availableA is equal to FALSE.

- the CTB address ctbAddrA of the CTB containing the luma coding block covering the luma location ( xQg − 1, yQg ) is not equal to CtbAddrInBs, where ctbAddrA is derived as follows:

xTmp = ( xQg − 1 ) >> MinTbLog2SizeY
        yTmp = yQg >> MinTbLog2SizeY
        minTbAddrA = MinTbAddrZs[ xTmp ][ yTmp ]
        ctbAddrA = minTbAddrA >> ( 2 * ( CtbLog2SizeY − MinTbLog2SizeY ) )

- Otherwise, $qP_{Y\_A}$ is set equal to the luma quantization parameter $Qp_Y$ of the coding unit containing the luma coding block covering ( xQg − 1, yQg ).

3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:

- If one or more of the following conditions are true, $qP_{Y\_B}$ is set equal to $qP_{Y\_PREV}$:

FIG. 59

- availableB is equal to FALSE.

- the CTB address ctbAddrB of the CTB containing the luma coding block covering the luma location ( xQg, yQg − 1 ) is not equal to CtbAddrInBs, where ctbAddrB is derived as follows:

xTmp = xQg  >>  MinTbLog2SizeY
  yTmp = ( yQg − 1 )  >>  MinTbLog2SizeY
  minTbAddrB = MinTbAddrZs[ xTmp ][ yTmp ]
  ctbAddrB =
  minTbAddrB  >>  ( 2 * ( CtbLog2SizeY − MinTbLog2SizeY ) )         (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.

- the current quantization group is the first quantization group in a CTB row within a brick

- Otherwise, $qP_{Y\_PRED}$ is derived as follows:

$qP_{Y\_PRED} = ( qP_{Y\_A} + qP_{Y\_B} + 1 )  >>  1$

The variable $Qp_Y$ is derived as follows:

$Qp_Y =$
$( ( qP_{Y\_PRED} + CuQpDeltaVal + 64 + 2 * QpBdOffset_Y )\%( 64 + QpBdOffset_Y ) ) - QpBdOffset_Y$

FIG. 60

The luma quantization parameter $Qp'_Y$ is derived as follows:

$Qp'_Y = Qp_Y + QpBdOffset_Y$

When ChromaArrayType is not equal to 0 and treeType is equal to SINGLE_TREE or DUAL_TREE_CHROMA, the following applies:

– When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

– The variables $qP_{Cb}$, $qP_{Cr}$ and $qP_{CbCr}$ are derived as follows:

$qPi_{Cb} = Clip3( -QpBdOffset_C, 69, Qp_Y + pps\_cb\_qp\_offset + slice\_cb\_qp\_offset )$ $qPi_{Cr} = Clip3( -QpBdOffset_C, 69, Qp_Y + pps\_cr\_qp\_offset + slice\_cr\_qp\_offset )$ $qPi_{CbCr} = Clip3( -QpBdOffset_C, 69, Qp_Y + pps\_joint\_cbcr\_qp\_offset + slice\_joint\_cbcr\_qp\_offset )$ – If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively – If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 61

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$ Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 62

8.7.1 Derivation process for quantization parameters

Inputs to this process are:

– a luma location ( xCb, yCb ) specifying the top-left luma sample of the current coding block relative to the top-left luma sample of the current picture, – a variable cbWidth specifying the width of the current coding block in luma samples, – a variable cbHeight specifying the height of the current coding block in luma samples, – a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.

NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

– If one or more of the following conditions are true, $qP_{Y\_PREV}$ is set equal to $SliceQp_Y$:

– The current quantization group is the first quantization group in a slice.

– The current quantization group is the first quantization group in a brick.

– Otherwise, $qP_{Y\_PREV}$ is set

FIG. 63

> 2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:
>
>   — If one or more of the following conditions are true, $qP_{Y\_A}$ is set equal to $qP_{Y\_PREV}$:
>
>     — availableA is equal to FALSE.
>
>     — the CTB address ctbAddrA of the CTB containing the luma coding block covering the luma location ( xQg − 1, yQg ) is not equal to CtbAddrInBs, where ctbAddrA is derived as follows:
>
>       xTmp = ( xQg − 1 ) >> MinTbLog2SizeY
>       yTmp = yQg >> MinTbLog2SizeY
>       minTbAddrA = MinTbAddrZs[ xTmp ][ yTmp ]
>       ctbAddrA = minTbAddrA >> ( 2 * ( CtbLog2SizeY − MinTbLog2SizeY ) )
>
>   — Otherwise, $qP_{Y\_A}$ is set equal to the luma quantization parameter $Qp_Y$ of the coding unit containing the luma coding block covering ( xQg − 1, yQg ).
>
> 3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:
>
>   — If one or more of the following conditions are true, $qP_{Y\_B}$ is set equal to $qP_{Y\_PREV}$:

FIG. 64

- availableB is equal to FALSE.

- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
yTmp = ( yQg − 1 ) >> MinTbLog2SizeY
minTbAddrB = MinTbAddrZs[ xTmp ][ yTmp ]
ctbAddrB =
minTbAddrB >> ( 2 * ( CtbLog2SizeY − MinTbLog2SizeY ) )       (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.

- the current quantization group is the first quantization group in a CTB row within a brick

- Otherwise, $qP_{Y\_PRED}$ is derived as follows:

$qP_{Y\_PRED}$ = ( $qP_{Y\_A}$ + $qP_{Y\_B}$ + 1 ) >> 1

The variable $Qp_Y$ is derived as follows:

$Qp_Y$ =
( ( $qP_{Y\_PRED}$ + CuQpDeltaVal + 64 + 2 * $QpBdOffset_Y$ )%( 64 + $QpBdOffset_Y$ ) ) − QpBdOffset$_Y$

FIG. 65

The luma quantization parameter $Qp'_Y$ is derived as follows:

$Qp'_Y = Qp_Y + QpBdOffset_Y$

When ChromaArrayType is not equal to 0 and treeType is equal to SINGLE_TREE or DUAL_TREE_CHROMA, the following applies:

- When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

- The variables $qP_{Cb}$, $qP_{Cr}$ and $qP_{CbCr}$ are derived as follows:

$qPi_{Cb} = Clip3( -QpBdOffset_C, 69, Qp_Y + pps\_cb\_qp\_offset + slice\_cb\_qp\_offset )$ $qPi_{Cr} = Clip3( -QpBdOffset_C, 69, Qp_Y + pps\_cr\_qp\_offset + slice\_cr\_qp\_offset )$ $qPi_{CbCr} = Clip3( -QpBdOffset_C, 69, Qp_Y + pps\_joint\_cbcr\_qp\_offset + slice\_joint\_cbcr\_qp\_offset )$ – If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively – If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 66

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$ Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 67

8.7.1 Derivation process for quantization parameters
Inputs to this process are:

– a luma location ( xCb, yCb ) specifying the top-left luma sample of the current coding block relative to the top-left luma sample of the current picture, – a variable cbWidth specifying the width of the current coding block in luma samples, – a variable cbHeight specifying the height of the current coding block in luma samples, – a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.

NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

– If one or more of the following conditions are true, $qP_{Y\_PREV}$ is set equal to $SliceQp_Y$:

– The current quantization group is the first quantization group in a slice.

– The current quantization group is the first quantization group in a brick.

– Otherwise, $qP_{Y\_PREV}$ is set

FIG. 68

> 2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:
>
>     − If one or more of the following conditions are true, $qP_{Y\_A}$ is set equal to $qP_{Y\_PREV}$:
>
>         − availableA is equal to FALSE.
>
>         − the CTB address ctbAddrA of the CTB containing the luma coding block covering the luma location ( xQg − 1, yQg ) is not equal to CtbAddrInBs, where ctbAddrA is derived as follows:
>
>             xTmp = ( xQg − 1 ) >> MinTbLog2SizeY
>             yTmp = yQg >> MinTbLog2SizeY
>             minTbAddrA = MinTbAddrZs[ xTmp ][ yTmp ]
>             ctbAddrA = minTbAddrA >> ( 2 * ( CtbLog2SizeY − MinTbLog2SizeY ) )
>
>     − Otherwise, $qP_{Y\_A}$ is set equal to the luma quantization parameter $Qp_Y$ of the coding unit containing the luma coding block covering ( xQg − 1, yQg ).
>
> 3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:
>
>     − If one or more of the following conditions are true, $qP_{Y\_B}$ is set equal to $qP_{Y\_PREV}$:

FIG. 69

- availableB is equal to FALSE.
- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
  yTmp = ( yQg − 1 ) >> MinTbLog2SizeY
  minTbAddrB = MinTbAddrZs[ xTmp ][ yTmp ]
  ctbAddrB =
  minTbAddrB >> ( 2 * ( CtbLog2SizeY − MinTbLog2SizeY ) )         (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.
     - the current quantization group is the first quantization group in a CTB row within a brick

- Otherwise, $qP_{Y\_PRED}$ is derived as follows:

$qP_{Y\_PRED} = ( qP_{Y\_A} + qP_{Y\_B} + 1 ) >> 1$

The variable $Qp_Y$ is derived as follows:

$Qp_Y =$
$( ( qP_{Y\_PRED} + CuQpDeltaVal + 64 + 2 * QpBdOffset_Y )\%( 64 + QpBdOffset_Y ) ) - QpBdOffset_Y$

FIG. 70

The luma quantization parameter $Qp'_Y$ is derived as follows:

$Qp'_Y = Qp_Y + QpBdOffset_Y$

When ChromaArrayType is not equal to 0 and treeType is equal to SINGLE_TREE or DUAL_TREE_CHROMA, the following applies:

- When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

- The variables $qP_{Cb}$, $qP_{Cr}$ and $qP_{CbCr}$ are derived as follows:

$qPi_{Cb} = Clip3(-QpBdOffset_C, 69, Qp_Y + pps\_cb\_qp\_offset + slice\_cb\_qp\_offset )$ $qPi_{Cr} = Clip3(-QpBdOffset_C, 69, Qp_Y + pps\_cr\_qp\_offset + slice\_cr\_qp\_offset )$ $qPi_{CbCr} = Clip3(-QpBdOffset_C, 69, Qp_Y + pps\_joint\_cbcr\_qp\_offset + slice\_joint\_cbcr\_qp\_offset )$

- If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi equal to $qPi_{Cb}$, $qPi_{Cr}$ and $qPi_{CbCr}$, respectively

- If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 71

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$ Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 72

> 8.7.1 Derivation process for quantization parameters
> Inputs to this process are:
>
> –a luma location ( xCb, yCb ) specifying the top-left luma sample of the current coding block relative to the top-left luma sample of the current picture,
>
> –a variable cbWidth specifying the width of the current coding block in luma samples,
>
> –a variable cbHeight specifying the height of the current coding block in luma samples,
>
> –a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.
>
> In this process, the luma quantization parameter $Qp'_Y$ and the chroma quantization parameters $Qp'_{Cb}$ and $Qp'_{Cr}$ are derived.
>
> The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.
>
> NOTE – : The current quantization group is a rectangluar region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.
>
> When treeType is equal to SINGLE_TREE or DUAL_TREE_LUMA, the predicted luma quantization parameter $qP_{Y\_PRED}$ is derived by the following ordered steps:
>
> 1. The variable $qP_{Y\_PREV}$ is derived as follows:
>
>    – If one or more of the following conditions are true, $qP_{Y\_PREV}$ is set equal to $SliceQp_Y$:
>
>       – The current quantization group is the first quantization group in a slice.
>
>       – The current quantization group is the first quantization group in a brick.
>
>       – Otherwise, $qP_{Y\_PREV}$ is set

FIG. 73

2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable $qP_{Y\_A}$ is derived as follows:

- If one or more of the following conditions are true, $qP_{Y\_A}$ is set equal to $qP_{Y\_PREV}$:

- availableA is equal to FALSE.

- the CTB address ctbAddrA of the CTB containing the luma coding block covering the luma location ( xQg − 1, yQg ) is not equal to CtbAddrInBs, where ctbAddrA is derived as follows:

xTmp = ( xQg − 1 ) >> MinTbLog2SizeY
       yTmp = yQg >> MinTbLog2SizeY
       minTbAddrA = MinTbAddrZs[ xTmp ][ yTmp ]
       ctbAddrA = minTbAddrA >> ( 2 * ( CtbLog2SizeY − MinTbLog2SizeY ) )

- Otherwise, $qP_{Y\_A}$ is set equal to the luma quantization parameter $Qp_Y$ of the coding unit containing the luma coding block covering ( xQg − 1, yQg ).

3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:

- If one or more of the following conditions are true, $qP_{Y\_B}$ is set equal to $qP_{Y\_PREV}$:

FIG. 74

- availableB is equal to FALSE.

- the CTB address ctbAddrB of the CTB containing the luma coding block covering the luma location ( xQg, yQg − 1 ) is not equal to CtbAddrInBs, where ctbAddrB is derived as follows:

xTmp = xQg >> MinTbLog2SizeY
  yTmp = ( yQg − 1 ) >> MinTbLog2SizeY
  minTbAddrB = MinTbAddrZs[ xTmp ][ yTmp ]
  ctbAddrB =
  minTbAddrB >> ( 2 * ( CtbLog2SizeY − MinTbLog2SizeY ) )           (8-922)

- Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:

- If all the following conditions are true, then $qP_{Y\_PRED}$ is set equal to the luma quantization parameter $Qp_Y$ of the coding unit containing the luma coding block covering ( xQg, yQg − 1 ):

- availableB is equal to TRUE.

- the current quantization group is the first quantization group in a CTB row within a brick

- Otherwise, $qP_{Y\_PRED}$ is derived as follows:

$qP_{Y\_PRED} = ( qP_{Y\_A} + qP_{Y\_B} + 1 ) >> 1$

The variable $Qp_Y$ is derived as follows:

$Qp_Y =$
$( ( qP_{Y\_PRED} + CuQpDeltaVal + 64 + 2 * QpBdOffset_Y )\%( 64 + QpBdOffset_Y ) ) − QpBdOffset_Y$

FIG. 75

The luma quantization parameter $Qp'_Y$ is derived as follows:

$$Qp'_Y = Qp_Y + QpBdOffset_Y$$

When ChromaArrayType is not equal to 0 and treeType is equal to SINGLE_TREE or DUAL_TREE_CHROMA, the following applies:

- When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).

- The variables $qP_{Cb}$, $qP_{Cr}$ and $qP_{CbCr}$ are derived as follows:

$qPi_{Cb}$ = Clip3( −QpBdOffset$_C$, 69, Qp$_Y$ + pps_cb_qp_offset + slice_cb_qp_offset )

$qPi_{Cr}$ = Clip3( −QpBdOffset$_C$, 69, Qp$_Y$ + pps_cr_qp_offset + slice_cr_qp_offset )

$qPi_{CbCr}$ = Clip3( −QpBdOffset$_C$, 69, Qp$_Y$ + pps_joint_cbcr_qp_offset + slice_joint_cbcr_qp_offset )

- If ChromaArrayType is equal to 1, and Qpc_data_default_flag is equal to FALSE, the variables $qP_{Cb}$, $qP_{Cr}$ and $qP_{CbCr}$ are set equal to the value of $Qp_C$ as-specified in clause 7.x.x based on the index qPi[i] equal to $qPi_{Cb}$, $qPi_{Cr}$ and $qPi_{CbCr}$, respectively

- If ChromaArrayType is equal to 1, and Qpc_data_default_flag is equal to TRUE, the variables $qP_{Cb}$, $qP_{Cr}$ and $qP_{CbCr}$ are specified in Table 8-15 based on the index qPi equal to $qPi_{Cb}$, $qPi_{Cr}$ and $qPi_{CbCr}$, respectively

FIG. 76

- Otherwise, the variables $qP_{Cb}$, $qP_{Cr}$ and $qP_{CbCr}$ are set equal to Min( qPi, 63 ), based on the index qPi equal to $qPi_{Cb}$, $qPi_{Cr}$ and $qPi_{CbCr}$, respectively.

- The chroma quantization parameters for the Cb and Cr components, $Qp'_{Cb}$ and $Qp'_{Cr}$, and joint Cb-Cr coding $Qp'_{CbCr}$ are derived as follows:

$Qp'_{Cb} = qP_{Cb} + QpBdOffset_C$ $Qp'_{Cr} = qP_{Cr} + QpBdOffset_C$ $Qp'_{CbCr} = qP_{CbCr} + QpBdOffset_C$

Table 8-15 – Specification of $Qp_C$ as a function of qPi for ChromaArrayType equal to 1

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

IMAGE DECODING METHOD FOR CHROMA COMPONENT AND APPARATUS THEREFOR

CROSS-REFERENCE TO RELATED APPLICATIONS

This application is a National Stage application under 35 U.S.C. § 371 of International Application No. PCT/KR2020/008736, filed on Jul. 3, 2020, which claims the benefit U.S. Provisional Application No. 62/871,062, filed on Jul. 5, 2019. The disclosures of the prior applications are incorporated by reference in their entirety.

BACKGROUND OF THE DISCLOSURE

Field of the Disclosure

The present disclosure relates to an image coding technology, and more particularly, to an image decoding method and an apparatus thereof, which use a chroma QP mapping table derived based on signaled chroma quantization parameter data in an image coding system.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

A technical object of the present disclosure is to provide a method and apparatus for improving image coding efficiency.

Another technical object of the present disclosure is to provide a method and an apparatus for improving data coding efficiency for deriving a quantization parameter for chroma components.

According to an embodiment of the present disclosure, an image decoding method performed by a decoding apparatus is provided. The method includes obtaining image information including prediction information and residual information for chroma components and chroma quantization parameter data of at least one chroma Quantization Parameter (QP) mapping table for the chroma components, deriving the chroma QP mapping table based on the chroma quantization parameter data, deriving a chroma quantization parameter for the chroma components based on the chroma QP mapping table, deriving prediction samples for the chroma components based on the prediction information, deriving transform coefficients for the chroma components based on the residual information, deriving residual samples by dequantizing the transform coefficients based on the chroma quantization parameter and generating a reconstructed picture based on the prediction samples and the residual samples, wherein the chroma quantization parameter data includes a syntax element for the number of points in the chroma QP mapping table, a syntax element for a delta value used to derive an input coordinate of a target point of the chroma QP mapping table and a syntax element for a delta value used to derive an output coordinate of the target point of the chroma QP mapping table.

According to another embodiment of the present disclosure, a decoding apparatus performing image decoding is provided. The decoding apparatus includes an entropy encoder configured to obtain image information including prediction information and residual information for chroma components and chroma quantization parameter data of at least one chroma Quantization Parameter (QP) mapping table for the chroma components, a predictor configured to derive prediction samples for the chroma components based on the prediction information, a residual processor configured to derive the chroma QP mapping table based on the chroma quantization parameter data, to derive a chroma quantization parameter for the chroma components based on the chroma QP mapping table, to derive transform coefficients for the chroma components based on the residual information, to derive residual samples by dequantizing the transform coefficients based on the chroma quantization parameter, and an adder configured to generate a reconstructed picture based on the prediction samples and the residual samples, wherein the chroma quantization parameter data includes a syntax element for the number of points in the chroma QP mapping table, a syntax element for a delta value used to derive an input coordinate of a target point of the chroma QP mapping table and a syntax element for a delta value used to derive an output coordinate of the target point of the chroma QP mapping table.

According to still another embodiment of the present disclosure, a video encoding method performed by an encoding apparatus is provided. The method includes deriving prediction samples for chroma components based on inter prediction or intra prediction, deriving residual samples for the chroma components based on the prediction samples, generating chroma quantization parameter data of at least one chroma Quantization Parameter (QP) mapping table for the chroma components and encoding prediction information for the chroma components, residual information for the chroma components and the chroma quantization parameter data, wherein the chroma quantization parameter data includes a syntax element for the number of points in the chroma QP mapping table, a syntax element for a delta value used to derive an input coordinate of a target point of the chroma QP mapping table and a syntax element for a delta value used to derive an output coordinate of the target point of the chroma QP mapping table.

According to yet still another embodiment of the present disclosure, a video encoding apparatus is provided. The encoding apparatus include a predictor configured to derive prediction samples for chroma components based on inter prediction or intra prediction, a residual processor configured to derive residual samples for the chroma components based on the prediction samples, to generate chroma quantization parameter data of at least one chroma Quantization Parameter (QP) mapping table for the chroma components and an entropy encoder configured to encode prediction information for the chroma components, residual information for the chroma components and the chroma quantization parameter data, wherein the chroma quantization parameter data includes a syntax element for the number of points in the chroma QP mapping table, a syntax element for a delta value used to derive an input coordinate of a target point of the chroma QP mapping table and a syntax element for a delta value used to derive an output coordinate of the target point of the chroma QP mapping table.

According to the present disclosure, in deriving the chroma quantization parameter for the chroma components, the chroma quantization parameter for the chroma components can be derived using a chroma QP mapping table derived based on the signaled chroma quantization parameter data, without using a default chroma QP mapping table, and through this, the coding efficiency can be improved by performing the coding based on the quantization parameter according to the characteristic of an image.

According to the present disclosure, the chroma QP mapping table can be derived based on a syntax element representing a delta value used to derive an input coordinate of a point of the chroma QP mapping table and/or a syntax element representing a delta value used to derive an output coordinate of the point of the chroma QP mapping table, and the coding efficiency can be improved by performing the coding based on the chroma QP mapping table in which the characteristic of an image is reflected more specifically.

BRIEF DESCRIPTION OF THE DRAWINGS

FIG. 12 to FIG. 16 represent an example of derivation process for quantization parameters.

FIG. 17 to FIG. 21 represent an example of derivation process for quantization parameters.

FIG. 22 to FIG. 26 represent an example of derivation process for quantization parameters.

FIG. 27 to FIG. 31 represent an example of derivation process for quantization parameters.

FIG. 32 to FIG. 36 represent, an example of derivation process for quantization parameters.

FIG. 37 to FIG. 41 represent an example of derivation process for quantization parameters.

FIG. 42 to FIG. 46 represent an example of derivation process for quantization parameters.

FIG. 47 to FIG. 51 represent an example of derivation process for quantization parameters.

FIG. 52 to FIG. 56 represent an example of derivation process for quantization parameters.

FIG. 57 to FIG. 61 represent an example of derivation process for quantization parameters.

FIG. 62 to FIG. 66 represent an example of derivation process for quantization parameters.

FIG. 67 to FIG. 71 represent an example of derivation process for quantization parameters.

FIG. 72 to FIG. 76 represent an example of derivation process for quantization parameters.

DESCRIPTION OF EXEMPLARY EMBODIMENTS

Figure 1:
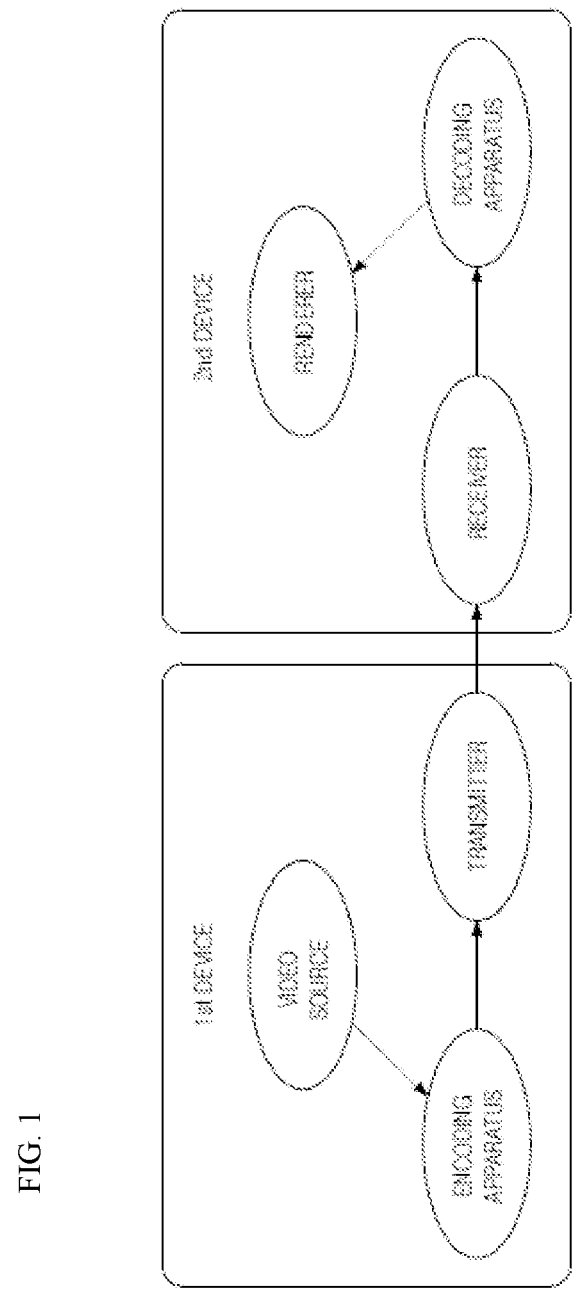
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
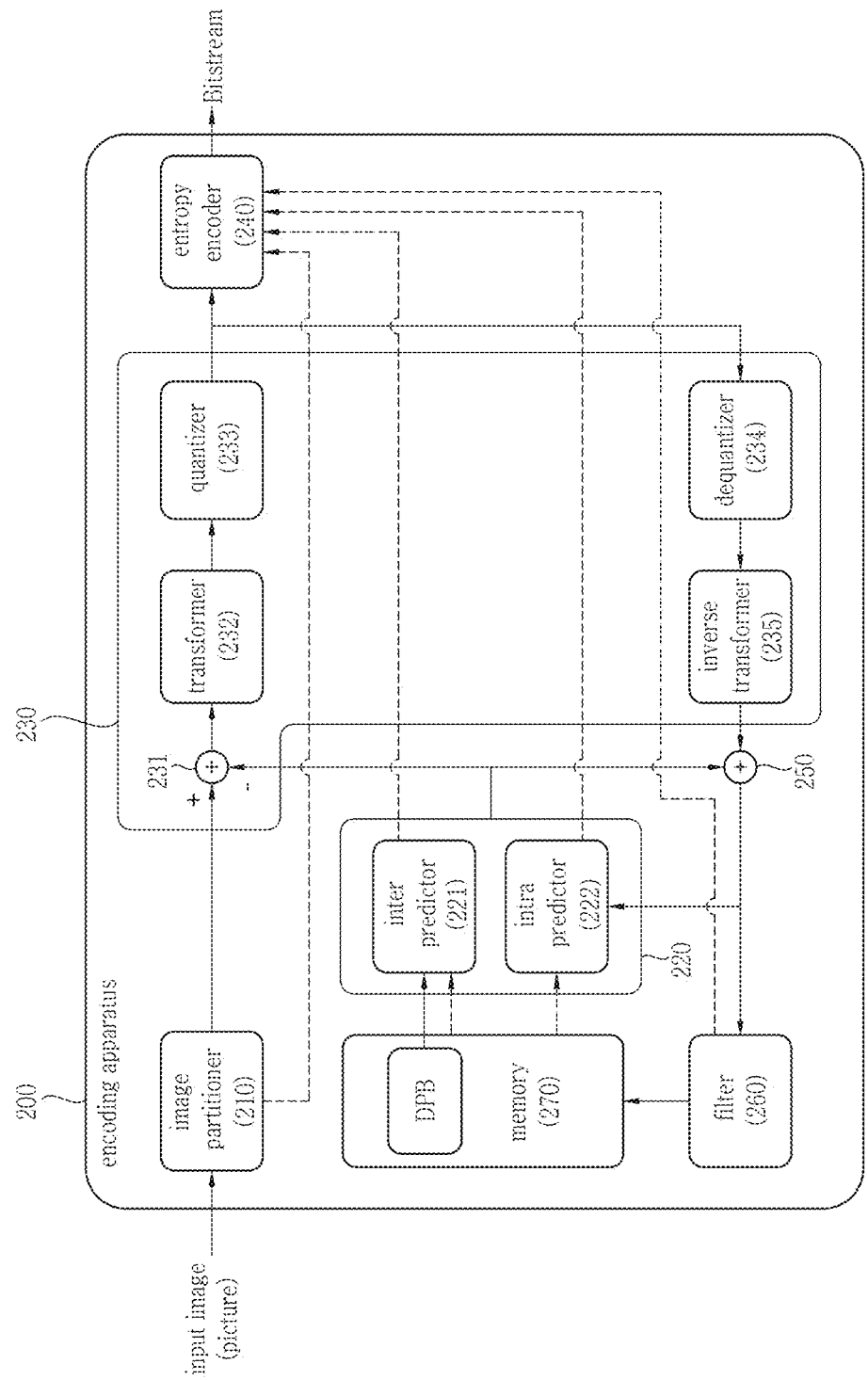
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
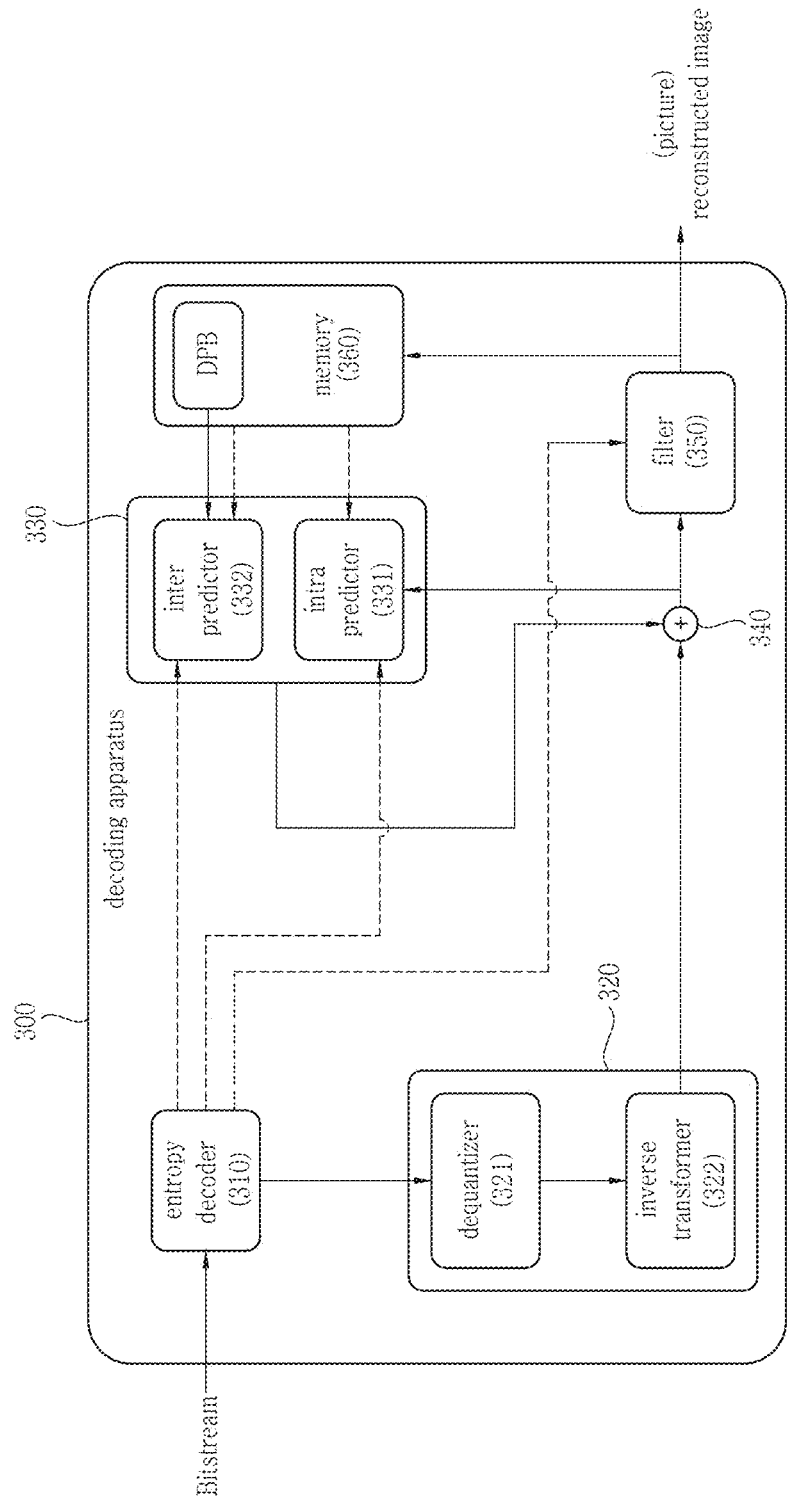
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Intra prediction may refer to prediction that generates prediction samples for a current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of neighboring reference samples of the current block, or (ii) the prediction sample may be derived based on a reference sample existing in a specific (prediction) direction with respect to a prediction sample among the neighboring reference samples of the current block. The case of (i) may be called a non-directional mode or a non-angular mode, and the case of (ii) may be called a directional mode or an angular mode.

In addition, the prediction sample may be generated through interpolation of a first neighboring sample located in the prediction direction of the intra prediction mode of the current block based on the prediction sample of the current block and a second neighboring sample located in a direction opposite to the prediction direction among the neighboring reference samples. The above-described case may be referred to as linear interpolation intra prediction (LIP). In addition, chroma prediction samples may be generated based on the luma samples using a linear model (LM). This case may be called an LM mode or a chroma component LM (CCLM) mode.

In addition, a temporary prediction sample of the current block is derived based on the filtered neighboring reference samples, and a prediction sample of the current block may also be derived by weighted summing the temporary prediction sample and at least one reference sample derived according to the intra prediction mode among the existing neighboring reference samples, that is, unfiltered neighboring reference samples. The above-described case may be referred to as position dependent intra prediction (PDPC).

In addition, a reference sample line with the highest prediction accuracy among neighboring multiple reference sample lines of the current block is selected, and a prediction sample is derived using a reference sample located in the prediction direction in the selected line. In this case, intra prediction encoding may be performed by indicating (signaling) the used reference sample line to the decoding apparatus. The above-described case may be referred to as multi-reference line intra prediction or MRL-based intra prediction.

In addition, the current block is divided into vertical or horizontal sub-partitions and intra prediction is performed based on the same intra prediction mode, but neighboring reference samples may be derived and used in units of the sub-partitions. That is, in this case, the intra prediction mode for the current block is equally applied to the sub-partitions, but the intra prediction performance may be improved in some cases by deriving and using the neighboring reference samples in units of the sub-partitions. This prediction method may be called intra-prediction based on intra sub-partitions (ISP).

The above-described intra prediction methods may be called intra prediction types to be distinguished from the intra prediction mode. The intra prediction types may be referred to by various terms such as intra prediction technique or additional intra prediction modes. For example, the intra prediction types (or additional intra prediction modes, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction process may include an intra prediction mode/type determination step, neighboring reference samples derivation step, and an intra prediction mode/type based prediction sample derivation step. In addition, if necessary, a post-filtering step may be performed on the derived prediction sample.

When intra prediction is applied, an intra prediction mode applied to the current block may be determined using an intra prediction mode of a neighboring block. For example, the decoding device may select one of most probable mode (MPM) candidates in the MPM list derived based on additional candidate modes and an intra prediction mode of the neighboring block (eg, the left and/or top neighboring block) of the current block, or select one of the remaining intra prediction modes not included in the MPM candidates (and planar mode) based on the remaining intra prediction mode information. The MPM list may be configured to include or not include the planner mode as a candidate. For example, when the MPM list includes a planner mode as a candidate, the MPM list may have 6 candidates, and when the MPM list does not include a planner mode as a candidate, the MPM list may have 5 candidates. When the MPM list does not include the planar mode as a candidate, a not planar flag (ex. intra_luma_not_planar_flag) representing whether the intra prediction mode of the current block is not the planar mode may be signaled. For example, the MPM flag may be signaled first, and the MPM index and not planner flag may be signaled when the value of the MPM flag is 1. Also, the MPM index may be signaled when the value of the not planner flag is 1. Here, the fact that the MPM list is configured not to include the planner mode as a candidate is that the planner mode is always considered as MPM rather than that the planner mode is not MPM, thus, the flag (not planar flag) is signaled first to check whether it is the planar mode.

For example, whether the intra prediction mode applied to the current block is among the MPM candidates (and the planar mode) or the remaining modes may be indicated based on the MPM flag (eg, intra_luma_mpm_flag). The MPM flag with a value of 1 may indicate that the intra prediction mode for the current block is within MPM candidates (and planar mode), and The MPM flag with a value of 0 may indicate that the intra prediction mode for the current block is not within MPM candidates (and planar mode). The not planar flag (ex. intra_luma_not_planar_flag) with a value of 0 may indicate that the intra prediction mode for the current block is a planar mode, and the not planar flag with a value of 1 may indicate that the intra prediction mode for the current block is not the planar mode. The MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be an intra prediction mode for a luma component (sample). Hereinafter, the intra prediction mode information may include at least one of the MPM flag (ex. intra_luma_mpm_flag), the not planar flag (ex. intra_luma_not_planar_flag), the MPM index (ex. mpm_idx or intra_luma_mpm_idx), or the remaining intra prediction mode information (rem_intra_luma_luma_mpm_mode or intra_luma_mpminder). In the present disclosure, the MPM list may be referred to by various terms such as an MPM candidate list and candModeList. When the MIP is applied to the current block, a separate MPM flag (ex. intra_mip_mpm_flag) for the MIP, an MPM index (ex. intra_mip_mpm_idx), and remaining intra prediction mode information (ex. intra_mip_mpm_remainder) may be signaled, and the not planar flag may not be signaled.

In other words, in general, when a block partition for an image is performed, the current block to be coded and a neighboring block have similar image characteristics. Therefore, there is a high probability that the current block and the neighboring block have the same or similar intra prediction mode. Accordingly, the encoder may use the intra prediction mode of the neighboring block to encode the intra prediction mode of the current block.

For example, The decoding device/encoding device may construct a most probable modes (MPM) list for the current block. The MPM list may be referred to as the MPM candidate list. Here, the MPM may refer to modes used to improve coding efficiency in consideration of the similarity between the current block and the neighboring blocks during intra prediction mode coding. As described above, the MPM list may be constructed to include the planar mode, or may be constructed to exclude the planar mode. For example, when the MPM list includes the planar mode, the number of candidates in the MPM list may be 6. And, when the MPM list does not include the planar mode, the number of candidates in the MPM list may be 5.

The encoder/decoder may construct a MPM list including 5 or 6 MPMs.

In order to construct the MPM list, three types of modes may be considered: Default intra modes, Neighbor intra modes, and Derived intra modes.

For the Neighbor intra modes, two neighboring blocks, ie, a left neighboring block and an upper neighboring block, may be considered.

As described above, if the MPM list is constructed not to include the planar mode, the planar mode is excluded from the list, and the number of MPM list candidates may be set to 5.

In addition, among the intra prediction modes, the non-directional mode (or non-angular mode) may include a DC mode based on the average of neighboring reference samples of the current block or a planar mode based on interpolation.

Meanwhile, when inter prediction is applied, the predictor of the encoding apparatus/decoding apparatus may derive prediction samples by performing inter prediction in units of blocks. The inter prediction may be applied when performing the prediction on the current block. That is, the predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and./or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

A video/image encoding process based on inter prediction may schematically include, for example, the following.

Figure 4:
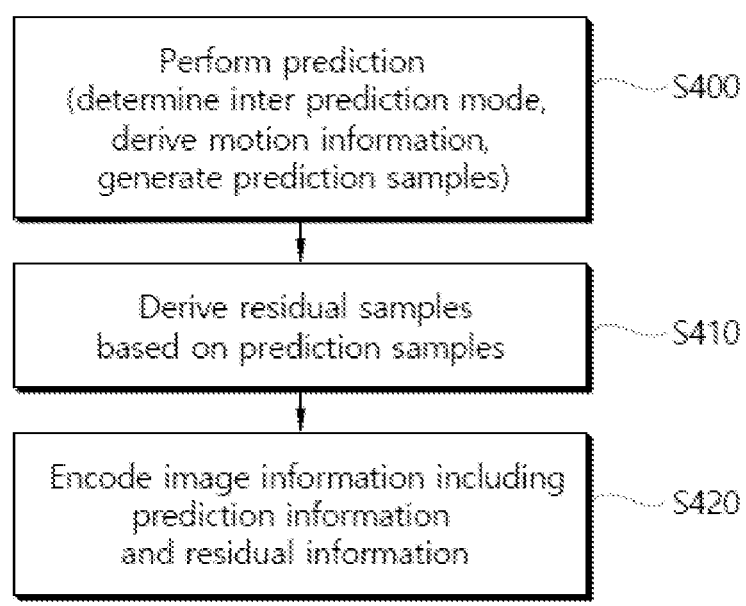
FIG. 4 illustrates an example of an inter prediction-based video/image encoding method.

FIG. 4 illustrates an example of an inter prediction-based video/image encoding method.

The encoding apparatus performs the inter prediction for the current block (S400). The encoding apparatus may derive the inter prediction mode and the motion information of the current block and generate the prediction samples of the current block. Here, an inter prediction mode determining process, a motion information deriving process, and a generation process of the prediction samples may be simultaneously performed and any one process may be performed earlier than other process. For example, the inter-prediction unit of the encoding apparatus may include a prediction mode determination unit, a motion information derivation unit, and a prediction sample derivation unit, and the prediction mode determination unit may determine the prediction mode for the current block, the motion information derivation unit may derive the motion information of the current block, and the prediction sample derivation unit may derive the prediction samples of the current block. For example, the inter-prediction unit of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding apparatus may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding apparatus. The motion information of the current block may be derived by using the motion information of the selected merge candidate.

As another example, when an (A)MVP mode is applied to the current block, the encoding apparatus may configure an (A)MVP candidate list to be described below and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S410). The encoding apparatus may derive the residual samples by comparing original samples and the prediction samples of the current block.

The encoding apparatus encodes image information including prediction information and residual information (S420). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction.

The residual information is information on the residual samples. The residual information may include information on quantized transform coefficients for the residual samples.

An output bitstream may be stored in a (digital) storage medium and transferred to the decoding apparatus or transferred to the decoding apparatus via the network.

Meanwhile, as described above, the encoding apparatus may generate a reconstructed picture (including reconstructed samples and reconstructed blocks) based on the reference samples and the residual samples. This is to derive the same prediction result as that performed by the decoding apparatus, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering process may be further applied to the reconstruction picture as described above.

A video/image decoding process based on inter prediction may schematically include, for example, the following.

Figure 5:
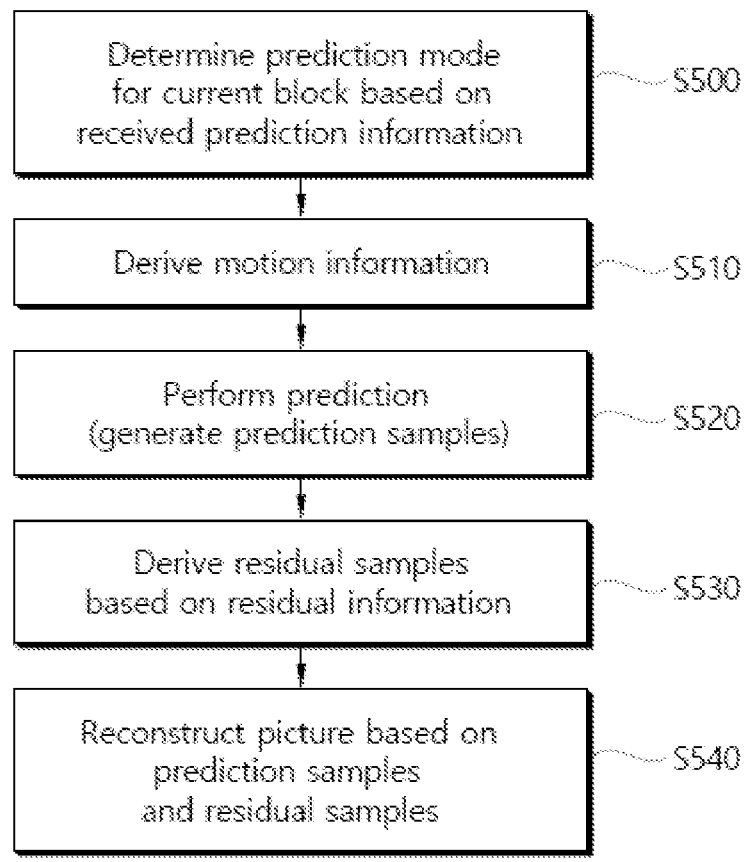
FIG. 5 illustrates an example of an inter prediction-based video/image decoding method.

FIG. 5 illustrates an example of an inter prediction-based video/image decoding method.

Referring to FIG. 5, the decoding apparatus may perform an operation corresponding to the operation performed by the encoding apparatus. The decoding apparatus may perform the prediction for the current block based on received prediction information and derive the prediction samples.

Specifically, the decoding apparatus may determine the prediction mode for the current block based on the received prediction information (S500). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes to be described below.

The decoding apparatus derives the motion information of the current block based on the determined inter prediction mode (S510). For example, when the skip mode or the merge mode is applied to the current block, the decoding apparatus may configure the merge candidate list to be described below and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list to be described below and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information.

The picture indicated by the reference picture index in the reference picture list for the current block may be derived as the reference picture referred for the inter prediction of the current block.

Meanwhile, as described below, the motion information of the current block may be derived without a candidate list configuration and in this case, the motion information of the current block may be derived according to a procedure disclosed in the prediction mode. In this case, the candidate list configuration may be omitted.

The decoding apparatus may generate the prediction samples for the current block based on the motion information of the current block (S520). In this case, the reference picture may be derived based on the reference picture index of the current block and the prediction samples of the current block may be derived by using the samples of the reference block indicated by the motion vector of the current block on the reference picture. In this case, in some cases, a predicted sample filtering procedure for all or some of the prediction samples of the current block may be further performed.

For example, the inter-prediction unit of the decoding apparatus may include a prediction mode determination unit, a motion information derivation unit, and a prediction sample derivation unit, and the prediction mode determination unit may determine the prediction mode for the current block based on the received prediction mode information, the motion information derivation unit may derive the motion information (the motion vector and/or reference picture index) of the current block based on the information on the received motion information, and the prediction sample derivation unit may derive the predicted samples of the current block.

The decoding apparatus generates the residual samples for the current block based on the received residual information (S530). The decoding apparatus may generate the reconstruction samples for the current block based on the prediction samples and the residual samples and generate the reconstruction picture based on the generated reconstruction samples (S540). Thereafter, the in-loop filtering procedure may be further applied to the reconstruction picture as described above.

Figure 6:
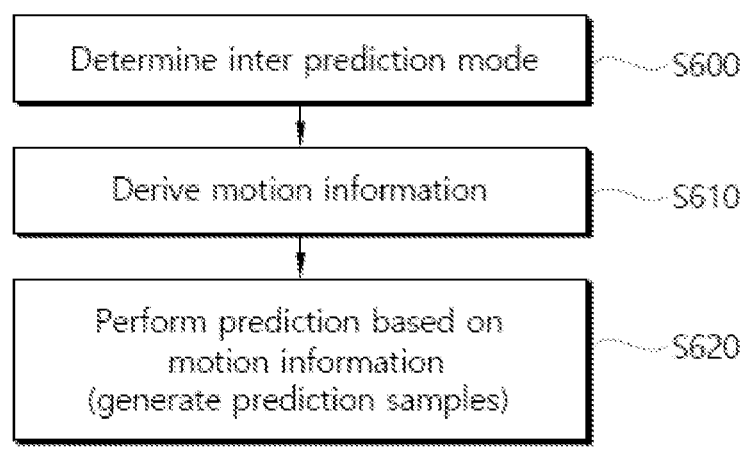
FIG. 6 schematically shows an inter prediction procedure.

FIG. 6 schematically shows an inter prediction procedure.

Referring to FIG. 6, as described above, the inter prediction process may include an inter prediction mode determination step, a motion information derivation step according to the determined prediction mode, and a prediction processing (prediction sample generation) step based on the derived motion information. The inter prediction process may be performed by the encoding apparatus and the decoding apparatus as described above. In this document, a coding device may include the encoding apparatus and/or the decoding apparatus.

Referring to FIG. 6, the coding apparatus determines an inter prediction mode for the current block (S600). Various inter prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present document, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

The coding apparatus derives motion information for the current block (S610). Motion information derivation may be derived based on the inter prediction mode.

The coding apparatus may perform inter prediction using motion information of the current block. The encoding apparatus may derive optimal motion information for the current block through a motion estimation procedure. For example, the encoding apparatus may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

The coding apparatus performs inter prediction based on motion information for the current block (S620). The coding apparatus may derive prediction sample(s) for the current block based on the motion information. A current block including prediction samples may be referred to as a predicted block.

Meanwhile, as described above, the quantizer of the encoding apparatus may derive quantized transform coefficients by applying quantization to transform coefficients. The dequantizer of the encoding apparatus or the dequantizer of the decoding apparatus may derive transform coefficients by applying dequantization to the quantized transform coefficients.

In general, in video/image coding, a quantization ratio may be changed, and a compression rate may be adjusted using the changed quantization ratio. In an implementation aspect, a quantization parameter (QP) may be used instead of directly using the quantization ratio by considering complexity. For example, quantization parameters having integer values of 0 to 63 may be used, and each quantization parameter value may correspond to an actual quantization ratio. Furthermore, for example, a quantization parameter $QP_Y$ for a luma component and a quantization parameter $QP_C$ for a chroma component may be different configured.

In a quantization process, a transform coefficient C may be an input, a quantization ratio (Qstep) may be divided, and a quantized transform coefficient C' may be obtained based on the quantization ratio. In this case, the quantization ratio may be produced in an integer form by multiplying the quantization ratio by a scale by considering calculation complexity, and a shift operation may be performed by a value corresponding to a scale value. A quantization scale may be derived based on the product of the quantization ratio and the scale value. That is, the quantization scale may be derived based on the QP. For example, the quantization scale may be applied to the transform coefficient C', and a quantized transform coefficient C' may be derived based on a result of the application.

A dequantization process is a reverse process of the quantization process. In this process, a quantized transform coefficient C' may be multiplied by a quantization ratio (Qstep), and a reconstructed transform coefficient C" may be obtained based on the result of the multiplication. In this case, a level scale may be derived based on a quantization parameter, the level scale may be applied to the quantized transform coefficient C', and a reconstructed transform coefficient C" may be derived. The reconstructed transform coefficient C" may have some difference from the first transform coefficient C due to a loss in the transform and/or quantization process. Accordingly, dequantization is performed in the encoding apparatus as in the decoding apparatus.

Meanwhile, an adaptive frequency weighting quantization technology for adjusting quantization strength depending on a frequency may be applied. The adaptive frequency weighting quantization technology is a method of differently applying quantization strength for each frequency. In the adaptive frequency weighting quantization, quantization strength for each frequency may be differently applied using a predefined quantization scaling matrix. That is, the aforementioned quantization/dequantization process may be performed based on the quantization scaling matrix. For example, in order to generate the size of a current block and/or a residual signal of the current block, a different quantization scaling matrix may be used depending on whether a prediction mode applied to the current block is inter prediction or intra prediction. The quantization scaling matrix may be called a quantization matrix or a scaling matrix. The quantization scaling matrix may be pre-defined. Furthermore, for frequency adaptive scaling, quantization scale information for each frequency for the quantization scaling matrix may be constructed/encoded in the encoding apparatus and signaled to the decoding apparatus. The quantization scale information for each frequency may be called quantization scaling information. The quantization scale information for each frequency may include scaling list data (scaling_list_data). A (modified) quantization scaling matrix may be derived based on the scaling list data. Furthermore, the quantization scale information for each frequency may include present_flag information representing whether the scaling list data is present. Alternatively, if the scaling list data is signaled in a higher level (e.g., SPS), information representing whether the scaling list data is modified in a lower level (e.g., a PPS or a tile group header, etc.) of a higher level, etc. may be further included.

As in the aforementioned contents, quantization/dequantization may be applied to a luma component and a chroma component based on a quantization parameter.

Quantization parameters for a coding unit may be determined based on information signaled in a picture and/or a slice level. For example, the quantization parameters may be derived as in contents described later.

For example, information related to the derivation of quantization parameters may be signaled as in the following table through a sequence parameter set (SPS).

TABLE 1

| | Descriptor |
|---|---|
| seq_parameter_set_rbsp( ) { | |
|   sps_decoding_parameter_set_id | u(4) |
|   ... | |
|   bit_depth_luma_minus8 | ue(v) |
|   bit_depth_chroma_minus8 | ue(v) |
|   ... | |
|   rbsp_trailing_bits( ) | |
| } | |

Semantics for syntax elements in Table 1 may be the same as the following table.

TABLE 2 bit_depth_luma_minus8 specifies the bit depth of the samples of the luma array $BitDepth_Y$
and the value of the luma quantization parameter range offset $QpBdOffset_Y$ as follows:
  $BitDepth_Y$ = 8 + bit_depth_luma_minus8
  $QpBdOffset_Y$ = 6 * bit_depth_luma_minus8
bit_depth_luma_minus8 shall be in the range of 0 to 8, inclusive.
bit_depth_chroma_minus8 specifies the bit depth of the samples of the chroma arrays
$BitDepth_C$ and the value of the chroma quantization parameter range offset $QpBdOffset_C$ as
follows:
  $BitDepth_C$ = 8 +
  bit_depth_chroma_minus8
  $QpBdOffset_C$ = 6 * bit_depth_chroma_minus8
bit_depth_chroma_minus8 shall be in the range of 0 to 8, inclusive.

For example, the syntax element bit_depth_luma_minus8 may represent $BitDepth_Y$, that is, the bit depth of samples of a luma array, and $QpBdOffset_Y$ that is a luma quantization parameter range offset. That is, for example, the $BitDepth_Y$ and the $QpBdOffset_Y$ may be derived based on the syntax element bit_depth_luma_minus8. For example, the $BitDepth_Y$ may be derived as a value obtained by adding 8 to a value of the syntax element bit_depth_luma_minus8. The $QpBdOffset_Y$ may be derived as a value obtained by multiplying a value of the syntax element bit_depth_luma_minus8 by 6. Furthermore, the bit_depth_luma_minus8 may be in a range of 0 to 8.

Furthermore, for example, the syntax element bit_depth_chroma_minus8 may represent $BitDepth_C$, that is, the bit depth of samples of a chroma array, and $QpBdOffset_C$, that is, a chroma quantization parameter range offset. That is, for example, the $BitDepthd_C$ and the $QpBdOffset_C$ may be derived based on the syntax element bit_depth_chroma_minus8. For example, the $BitDepth_C$ may be derived as a value obtained by adding 8 to a value of the syntax element bit_depth_chroma_minus8. The $QpBdOffset_C$ may be derived as a value obtained by multiplying a value of the syntax element bit_depth_chroma_minus8 by 6. Furthermore, the bit_depth_chroma_minus8 may be in a range of 0 to 8.

Furthermore, information related to the derivation of quantization parameters may be signaled as in the following table, for example, through a picture parameter set (PPS). The information may include a chroma Cb offset, a chroma Cr offset, a joint chroma offset, and an initial quantization parameter. That is, the information may include syntax elements for a chroma Cb offset, a chroma Cr offset, a joint chroma offset, and an initial quantization parameter.

TABLE 3

| | Descriptor |
|---|---|
| pic_parameter_set_rbsp( ) { | |
|   pps_pic_parameter_set_id | ue(v) |
|   ... | |
|   init_qp_minus26 | se(v) |
|   transform_skip_enabled_flag | u(1) |
|   pps_cb_qp_offset | se(v) |
|   pps_cr_qp_offset | se(v) |
|   pps_joint_cbcr_qp_offset | se(v) |
|   pps_slice_chroma_qp_offsets_present_flag | u(1) |
|   ... | |
|   rbsp_trailing_bits( ) | |
| } | |

Semantics for syntax elements in Table 3 may be the same as the following table.

TABLE 4 init_qp_minus26 plus 26 specifies the initial value of SliceQp$_Y$ for each slice referring to
the PPS. The initial value of SliceQp$_Y$ is modified at the slice layer when a non-zero value of
slice_qp_delta is decoded. The value of init_qp_minus26 shall be in the range
of −( 26 + QpBdOffset$_Y$ ) to +37, inclusive.
pps_cb_qp_offset and pps_cr_qp_offset specify the offsets to the luma quantization
parameter Qp'$_Y$ used for deriving Qp'$_{Cb}$ and Qp'$_{Cr}$, respectively. The values of
pps_cb_qp_offset and pps_cr_qp_offset shall be in the range of −12 to +12, inclusive. When
ChromaArrayType is equal to 0, pps_cb_qp_offset and pps_cr_qp_offset are not used in the
decoding process and decoders shall ignore their value.
pps_joint_cbcr_qp_offset specifies the offset to the luma quantization parameter Qp'$_Y$ used
for deriving Qp'$_{CbCr}$. The value of pps_joint_cbcr_qp_offset shall be in the range of −12 to +12,
inclusive. When ChromaArrayType is equal to 0, pps_joint_cbcr_qp_offset is not used
in the decoding process and decoders shall ignore its value.
pps_slice_chroma_qp_offsets_present_flag equal to 1 indicates that the slice_cb_qp_offset
and slice_cr_qp_offset syntax elements are present in the associated slice headers.
pps_slice_chroma_qp_offsets_present_flag equal to 0 indicates that these syntax elements
are not present in the associated slice headers. When ChromaArrayType is equal to 0,
pps_slice_chroma_qp_offsets_present_flag shall be equal to 0.

For example, a value obtained by adding 26 to the syntax element init_qp_minus26 may represent an initial value of SliceQp$_Y$ for each slice that refers to a PPS. If a non-zero value of slice_qp_delta is decoded, an initial value of the SliceQp$_Y$ may be modified in a slice layer. The init_qp_minus26 0 may be in a range of −(26+QpBdOffset$_Y$) to +37.

Furthermore, for example, syntax elements pps_cb_qp_offset and pps_cr_qp_offset may represent offsets for a luma quantization parameter Qp'$_Y$ used to derive Qp'$_{Cb}$ and Qp'$_{Cr}$, respectively. The pps_cb_qp_offset and pps_cr_qp_offset may be in a range of −12 to +12. Furthermore, when ChromaArrayType is 0, in a decoding process, pps_cb_qp_offset and pps_cr_qp_offset may not be used, and the decoding apparatus may ignore values of the syntax elements.

Furthermore, for example, the syntax element pps_joint_cbcr_qp_offset may represent an offset for a luma quantization parameter Qp'$_Y$ used to derive Qp'$_{CbCr}$. The pps_joint_cbcr_qp_offset may be in a range of −12 to +12. Furthermore, when ChromaArrayType is 0, in a decoding process, pps_joint_cbcr_qp_offset may not be used, and the decoding apparatus may ignore a value of the syntax element.

Furthermore, for example, the syntax element pps_slice_chroma_qp_offsets_present_flag may represent whether syntax elements slice_cb_qp_offset and slice_cr_qp_offset are present in slice headers associated with the syntax elements slice_cb_qp_offset and slice_cr_qp_offset. For example, pps_slice_chroma_qp_offsets_present_flag having a value of 1 may represent that the syntax elements slice_cb_qp_offset and slice_cr_qp_offset are present in slice headers associated with the syntax elements slice_cb_qp_offset and slice_cr_qp_offset. Furthermore, for example, pps_slice_chroma_qp_offsets_present_flag having a value of 0 may represent that the syntax elements slice_cb_qp_offset and slice_cr_qp_offset are not present in slice headers associated with the syntax elements slice_cb_qp_offset and slice_cr_qp_offset. Furthermore, when ChromaArrayType is 0, in a decoding process, pps_slice_chroma_qp_offsets_present_flag may be the same as 0.

As in the aforementioned contents, syntax elements parsed in the PPS may be init_qp_minus26, pps_cb_qp_offset_pps_cr_qp_offset, pps_joint_cbcr_qp_offset, and pps_slice_chroma_qp_offsets_present_flag. A syntax element init_qp_minus26 may represent an initial value of SliceQp$_Y$ for each slice that refers to a PPS. Furthermore, syntax elements pps_cb_qp_offset, pps_cr_qp_offset, and pps_joint_cbcr_qp_offset may represent offsets for a luma quantization parameter Qp'$_Y$. Furthermore, the syntax element pps_slice_chroma_qp_offsets_present_flag may represent whether an offset parameter is present in a slice header.

Furthermore, information related to the derivation of quantization parameters may be signaled as in the following table through a slice header, for example.

TABLE 5

| | Descriptor |
|---|---|
| slice_header( ) { | |
|   slice_pic_parameter_set_id | ue(v) |
| ... | |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|     slice_joint_cbcr_qp_offset | se(v) |
|   } | |
| ... | |
|   byte_alignment( ) | |
| } | |

Semantics for syntax elements in Table 5 may be the same as the following table.

TABLE 6 slice_qp_delta specifies the initial value of Qp$_Y$ to be used for the coding blocks in the slice
until modified by the value of CuQpDeltaVal in the coding unit layer. The initial value of the
Qp$_Y$ quantization parameter for the slice, SliceQp$_Y$, is derived as follows:
  SliceQp$_Y$ = 26 + init_qp_minus26 + slice_qp_delta
The value of SliceQp$_Y$ shall be in the range of −QpBdOffset$_Y$ to +63, inclusive.
slice_cb_qp_offset specifies a difference to be added to the value of pps_cb_qp_offset when
determining the value of the Qp'$_{Cb}$ quantization parameter. The value of slice_cb_qp_offset
shall be in the range of −12 to +12, inclusive. When slice_cb_qp_offset is not present, it is
inferred to be equal to 0. The value of pps_cb_qp_offset + slice_cb_qp_offset shall be in the
range of −12 to +12, inclusive.

TABLE 6-continued slice_cr_qp_offset specifies a difference to be added to the value of pps_cr_qp_offset when determining the value of the Qp'$_{Cr}$ quantization parameter. The value of slice_cr_qp_offset shall be in the range of −12 to +12, inclusive. When slice_cr_qp_offset is not present, it is inferred to be equal to 0. The value of pps_cr_qp_offset + slice_cr_qp_offset shall be in the range of −12 to +12, inclusive.
slice_joint_cbcr_qp_offset specifies a difference to be added to the value of pps_joint_cbcr_qp_offset when determining the value of the Qp'$_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset + slice_joint_cbcr_qp_offset shall be in the range of −12 to +12, inclusive.
The derivation process for the luma and chroma quantization parameters begin with the inputs to the process being a luma location, variables specifying the width and height of the current coding block and a variable specifying whether it is a single or a dual tree. The luma, chroma and the joint chroma quantization parameters are dentoted as follows: Qp'$_Y$ Qp'$_{Cb}$ Qp'$_{Cr}$ and Qp'$_{CbCr}$.
cu_qp_delta_sign_flag specifies the sign of CuQpDeltaVal as follows:
- If cu_qp_delta_sign_flag is equal to 0, the corresponding CuQpDeltaVal has a positive value.
- Otherwise (cu_qp_delta_sign_flag is equal to 1), the corresponding CuQpDeltaVal has a negative value.

When cu_qp_delta_sign_flag is not present, it is inferred to be equal to 0.
When cu_qp_delta_abs is present, the variables IsCuQpDeltaCoded and CuQpDeltaVal are derived as follows:
    IsCuQpDeltaCoded = 1
    CuQpDeltaVal = cu_qp_delta_abs * ( 1 − 2 * cu_qp_delta_sign_flag )
The value of CuQpDeltaVal shall be in the range of −( 32 + QpBdOffsetY / 2 ) to +( 31 + QpBdOffsetY / 2 ), inclusive.

For example, slice_qp_delta may represent an initial value of Qp$_Y$ to be used in a coding block within a slice until it is modified by a value of CuQpDeltaVal in a coding unit layer. For example, an initial value of Qp$_Y$ for a slice, SliceQp$_Y$, may be derived as 26+init_qp_minus26+slice_qp_delta. A value of SliceQp$_Y$ may be in a range of −QpBdOffset$_Y$ to +63.

Furthermore, for example, slice_cb_qp_offset may represent a difference to be added to a value of pps_cb_qp_offset when a value of the quantization parameter Qp'$_{Cb}$ is determined. A value of slice_cb_qp_offset may be in a range of −12 to +12. Furthermore, for example, if slice_cb_qp_offset is not present, the slice_cb_qp_offset may be inferred as 0. A value of pps_cb_qp_offset+slice_cb_qp_offset may be in a range of 12 to +12.

Furthermore, for example, slice_cr_qp_offset may represent a difference to be added to a value of pps_cr_qp_offset when a value of a quantization parameter Qp'$_{Cr}$ is determined. A value of slice_cr_qp_offset may be in a range of −12 to +12. Furthermore, for example, if slice_cr_qp_offset is not present, the slice_cr_qp_offset may be inferred as 0. A value of pps_cr_qp_offset+slice_cr_qp_offset may be in a range of 12 to +12.

Furthermore, for example, slice_cbcr_qp_offset may represent a difference to be added to a value of pps_cbcr_qp_offset when a value of a quantization parameter Qp'$_{CbCr}$ is determined. A value of slice_cbcr_qp_offset may be in a range of −12 to +12. Furthermore, for example, if slice_cbcr_qp_offset is not present, the slice_cbCr_qp_offset may be inferred as 0. A value of pps_cbcr_qp_offset+slice_cbcr_qp_offset may be in a range of 12 to +12.

A derivation process for luma and chroma quantization parameters may be started based on the fact that an input for the process is a luma location, a parameter to designate the width and height of a current coding block, and a parameter to designate a single tree or a dual tree. Meanwhile, as in the aforementioned contents, a luma quantization parameter, a chroma quantization parameter and a joint chroma quantization parameter may be represented as Qp'y, Qp'$_{Cb}$, Qp'$_{Cr}$ and Qp'$_{CbCr}$.

Meanwhile, for example, the syntax element cu_qp_delta_sign_flag representing a sign of CuQpDeltaVal may be parsed. For example, the cu_qp_delta_sign_flag may represent the sign of CuQpDeltaVal as follows.

For example, when the cu_qp_delta_sign_flag is 0, CuQpDeltaVal corresponding to the cu_sign_flag may have a positive value. Alternatively, for example, when the cu_qp_delta_sign_flag is 1, CuQpDeltaVal corresponding to the cu_qp_delta_sign_flag may have a negative value. Furthermore, if the cu_qp_delta_sign_flag is not present, the cu_qp_delta_sign_flag may be inferred as 0.

Furthermore, for example, if cu_qp_delta_abs is present, a parameter IsCuQpDeltaCoded may be derived as 1. A parameter CuQpDeltaVal may be derived as cu_qp_delta_abs*(1−2*cu_qp_delta_sign_flag). The CuQpDeltaVal may be in a range of −(32+QpBdOffsetY/2) to +(31+QpBdOffsetY/2).

Thereafter, for example, the luma quantization parameter Qp'$_Y$ may be derived as in the following equation.

$$Qp_Y = \qquad \text{[Equation 1]}$$
$$((qP_{Y\_PRED} + CuQpDeltaVal + 64 + 2 * QpBdOffset_Y) \%$$
$$(64 + QpBdOffset_Y)) - QpBdOffset_Y$$

Furthermore, if ChromaArrayType is not 0 and, treeType is SINGLE_TREE or DUAL_TREE_CHROMA, the following may be applied.
When treeType is equal to DUAL_TREE_CHROMA, a parameter Qp$_Y$ may be set identically with a luma quantization parameter Qp$_Y$ of a luma coding unit including a luma location (xCb+cbWidth/2, yCb+cbHeight/2).
Parameters qP$_{Cb}$, qP$_{Cr}$ and qP$_{CbCr}$ may be derived as follows.

$$qPi_{Cb} = Clip3(-QpBdOffset_C, 69, \qquad \text{[Equation 2]}$$
$$Qp_Y + \text{pps\_cb\_qp\_offset} + \text{slice\_cb\_qp\_offset})$$

-continued $$qPi_{Cr} = Clip3(-QpBdOffset_C, 69,$$

$$Qp_Y + \text{pps\_cr\_qp\_offset} + \text{slice\_cr\_qp\_offset})$$

$$qPi_{CbCr} = Clip3(-QpBdOffset_C, 69, Qp_Y +$$

$$\text{pps\_joint\_cbcr\_qp\_offset} + \text{slice\_joint\_cbcr\_qp\_offset})$$

For example, when ChromaArrayType is 1, parameters $qP_{Cb}$, $qP_{Cr}$ and $qP_{CbCr}$ may be set identically with a QpC value designated in Table 7 based on the same indices qPi as $qPi_{Cb}$, $qPi_{Cr}$ and $qPi_{CbCr}$, respectively.

TABLE 7

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $QP_C$ | =qPi | 29 | 30 | 31 | 32 | 33 | 33 | 34 | 34 | 35 | 35 | 36 | 36 | 37 | 37 | =qPi − 6 |

Alternatively, when ChromaArrayType is not 1, the parameters $qP_{Cb}$, $qP_{Cr}$, and $qP_{CbCr}$ may be set identically with Min (qPi, 63) based on the same indices qPi as $qPi_{Cb}$, $qPi_{Cr}$, and $qPi_{CbC}$, respectively.

Chroma quantization parameters for a Cb component and a Cr component, $Qp'_{Cb}$ and $Qp'_{Cr}$, and a chroma quantization parameter $Qp'_{CbCr}$ for joint Cb-Cr coding may be derived as follows.

$$Qp'_{Cb} = qP_{Cb} + QpBdOffset_C \quad \text{[Equation 3]}$$

$$Qp'_{Cr} = qP_{Cr} + QpBdOffset_C$$

$$Qp'_{CbCr} = qP_{CbCr} + QpBdOffset_C$$

Meanwhile, this document proposes schemes for improving coding efficiency in a quantization/dequantization process.

In an embodiment, this document proposes a method of defining and using a user defined chroma quantization mapping table, not a method of obtaining a chroma quantization parameter value from a luma quantization parameter value through a chroma quantization mapping table predefined in the existing VVC Draft5 v.7 when ChromaArrayType is not 0 (e.g., when ChromaArrayType is 1). In the VVC specification text (e.g., VVC Draft5 v.7), when qPi (a luma quantization parameter value) is given, Qpc (chroma quantization parameter value) is derived through the predefined chroma quantization table (e.g., Table 7), but this document proposes a method of deriving Qpc from qPi based on a chroma quantization mapping table newly defined by a user. According to an embodiment of this document, there is proposed a method in which a Qpc value may be derived through a function relation of a qPi value, a function may be signaled as a syntax, such as an APS, an SPS or a PPS, through a user defined functionality method, which includes the function relation transmit values of predefined syntax elements, and a user defines chroma quantization table mapping based on the transmitted values. For example, since a Qpc value can be derived through the function relation of the qPi value, if syntax element values representing a corresponding function are transmitted, a user defined chroma quantization mapping table may be derived in a form, such as Table 7.

In an embodiment, there is proposed a scheme for signaling information about syntax elements (Qpc_data) representing chroma quantization mapping-related function as in the following table to be described later in an adaptation parameter set (APS).

TABLE 8

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data(adaptation_parameter_set_id ) | |
|   else if ( aps_params_type = = LMCS_APS ) | |
|     lmcs_data( ) | |
|   else if ( aps_params_type = = Qpc_APS ) // 2 | |
|     Qpc_data() | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

Referring to Table 8, if the aps_params_type represents Qpc_APS, for example, when a value of the aps_params_type is 2, Qpc_data( ) may be signaled.

Semantics for syntax elements in Table 8 may be the same as the following table.

TABLE 9 adaptation_parameter_set_id provides an identifier for the APS for reference by other syntax elements.
  NOTE - APSs can be shared across pictures and can be different in different slices within a picture.
  aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.
  aps_extension_data_flag may have any value. Its presence and value do not affect decoder conformance to profiles specified in this version of this Specification. Decoders conforming to this version of this Specification shall ignore all aps_extension_data_flag syntax elements.

TABLE 9-continued aps_params_type specifies the type of APS parameters carried in the APS as specified in the Table 2 shown below.

For example, the syntax element adaptation_parameter_set_id may provide an identifier of an APS referred by other syntax elements.

Furthermore, for example, the syntax element aps_extension_flag may represent whether aps_extension_data_flag_syntax elements are present in an APS RBSP syntax structure. For example, the syntax element aps_extension_flag having a value of 1 may represent that the aps_extension_data_flag_syntax elements are present in the APS RBSP syntax structure. The syntax element aps_extension_flag having a value of 0 may represent that the aps_extension_data_flag_syntax elements are not present in the APS RBSP syntax structure.

Furthermore, for example, the syntax element aps_extension_data_flag may have any value. The presence (presence and value) of the aps_extension_data_flag may not affect decoding suitability for a profile specified in a version of this standard. For example, a decoding apparatus that follows a version of this standard may ignore all syntax elements aps_extension_data_flag.

Furthermore, for example, the syntax element aps_params_type may represent the type of APS parameters included in an APS as illustrated in Table 10.

TABLE 10

| aps_params_type | Name of aps_params_type | Type of APS parameters |
|---|---|---|
| 0 | ALF_APS | ALF parameters |
| 1 | LMCS_APS | LMCS parameters |
| 2 | Qp$_C$_APS | Qpc data parameters |
| 3 . . . 7 | Reserved | Reserved |

For example, referring to Table 10, when a value of the syntax element aps_params_type is 0, the syntax element aps_params_type may represent that the type of APS parameters is ALF parameters. When a value of the syntax element aps_params_type is 1, the syntax element apsparams_type may represent that the type of APS parameters is LMCS parameters. When a value of the syntax element aps_params_type is 2, the syntax element aps_params_type may represent that the type of APS parameters is Qpc data parameters. The Qpc data parameter may represent a chroma quantization data parameter.

Furthermore, this document proposes another embodiment in which information for a quantization parameter is signaled.

For example, the present embodiment proposes a scheme for signaling user defined Qp$_C$ data in a picture parameter set (PPS). As an example for performing a scheme proposed in the present embodiment, a flag representing whether a PPS includes user defined data in an SPS may be introduced. That is, a flag representing whether a PPS includes user defined data in an SPS, may be signaled. Furthermore, according to the present embodiment, user defined data may be signaled in a PPS. Alternatively, user defined data may be signaled in a slice header and/or another header set.

The flag representing whether a PPS includes user defined data may be signaled as in the following table.

TABLE 11

| | Descriptor |
|---|---|
| seq_parameter_set_rbsp( ) { | |
|   sps_decoding_parameter_set_id | u(4) |
|   ... | |
|   Qpc_data_default_flag | u(1) |
|   ... | |
|   rbsp_trailing_bits( ) | |
| } | |

For example, the syntax element Qpc_data_default_flag may be a syntax element of the aforementioned flag. The syntax element Qpc_data_default_flag may represent whether Qpc_data( ) parameters are present in a PPS RBSP syntax structure. For example, Qpc_data_default_flag of 0 may represent that Qpc_data( ) parameters are not present in the PPS RBSP syntax structure and a default table is used to help a determination of chroma quantization. In this case, the default table may be the same as Table 7. Furthermore, for example, Qpc_data_default_flag of 1 may represent that Qpc_data( ) parameters may be present in the PPS RBSP syntax structure.

Furthermore, user defined data signaled in a PPS according to the present embodiment may be the same as the following table.

TABLE 12

| | Descriptor |
|---|---|
| pic_parameter_set_rbsp( ) { | |
|   pps_pic_parameter_set_id | ue(v) |
|   ... | |
|   if(Qpc_data_default_flag) | |
|     Qpc_data( ) | |
|   ... | |
|   rbsp_trailing_bits( ) | |
| } | |

Meanwhile, for example, Qpc_data( ) may include information necessary for chroma quantization derivation when ChromaArrayType is 1.

Furthermore, this document proposes another embodiment in which information for a quantization parameter is signaled.

For example, the present embodiment proposes a flexible structure for chroma quantization parameter (QP) derivation and combined chroma QP derivation. The present embodiment proposes a scheme for signaling an initial flag representing whether a user defined mode in which parameters representing a function used to derive a chroma quantization parameter (QP) in an SPS and/or a PPS may be used is present.

For example, flag information signaled in a high level syntax proposed in the present embodiment may be the same as a table to be described later.

TABLE 13

| | Descriptor |
|---|---|
| high_level_syntax_parameter_set { | |
| ... | |
| Qpc_data_present_flag | u(1) |
| ... | |
| } | |

For example, Qpc_data_present_flag may represent whether parameters for deriving a chroma quantization parameter are present in a high level syntax RBSP syntax structure. For example, Qpc_data_present_flag having a value of 0 may represent that chroma quantization parameters are not present in a high level syntax RBSP syntax structure. Furthermore, for example, Qpc_data_present_flag having a value of 1 may represent that chroma quantization parameters are present in a high level syntax RBSP syntax structure.

Alternatively, the syntax element Qpc_data_present_flag may be used to indicate a scheme of using chroma quantization derivation in a bitstream. For example, the syntax element Qpc_data_present_flag may represent a tool used for chroma quantization derivation or the use of a user defined mode as follows.

For example, Qpc_data_present_flag may represent whether user defined chroma quantization is used in a bitstream. For example, Qpc_data_present_flag having a value of 0 may represent that user defined chroma quantization is not used in a bitstream. Furthermore, for example, Qpc_data_present_flag having a value of 1 may represent that user defined chroma quantization is used solely or along with another flag.

Furthermore, this document proposes another embodiment in which information for a quantization parameter is signaled.

For example, the present embodiment proposes an embodiment in which how chroma quantization parameters (QP), that is, $Qp'_{Cb}$, $Qp'_{Cr}$ and $Qp'_{CbCr}$ can be derived using user defined information signaled in one function. For example, according to the present embodiment, data representing a function for deriving a chroma quantization parameter (QP) may be signaled, and chroma quantization parameters may be derived based on chroma quantization data. Data (or user defined QP mapping table) for chroma quantization parameter derivation may be signaled as in the following table.

TABLE 14

| | Descriptor |
|---|---|
| Qp$_C$_data( ) { | |
|   qPi_min_idx | ue(v) |
|   qPi_delta_max_idx | ue(v) |
|   for ( i = qPi_min_idx; i <= qPiMaxIdx; i++ ) | |
|     Qp$_C$_qPi_val[ i ] | ue(v) |
|   QpOffset$_C$ | ue(v) |
| } | |

Semantics for syntax elements in Table 14 may be the same as the following table.

TABLE 15 qPi_min_idx specifies the minimum qPi index used in the chroma quantization.
qPi_delta_max_idx specifies the delta value between the Qp$_C$_min_idx and the maximum qPi index used for the chroma Qp$_C$ derivation. The value of qPiMaxIdx shall be greater than or equal to qPi_min_idx. The maximum index qPiMaxIdx used in Qp$_C$ derivation is derived as follows:
    qPiMaxIdx = qPi_min_idx + qPi_delta_max_idx
Qp$_C$_qPi_val[i] specifies the Qp$_C$ value for the $i^{th}$ index.
QpOffset$_C$ specifies the offset value to be used the derivation of the Qp$_C$.
The variable Qp$_C$Idx[ qPi ] for qPi with qPi = 0 ... qPiMaxIdx, is derived as follows:
-     For qPi < qPi_min_idx, Qp$_C$Idx[qPi ] is set equal to qPi.
-     For qPi = qPi_min_idx ... qPiMaxIdx, the following applies:
        Qp$_C$Idx[ qPi ] = Qp$_C$_qPi_val[ qPi ]
-     For qPi > qPiMaxIdx, Qp$_C$Idx[ qPi ] = qPi − QpOffset$_C$
Tire value of Qp$_C$ is derived as Qp$_C$Idx[qPi].

For example, the syntax element qPi_min_idx may represent a minimum qPi index used in chroma quantization.

Furthermore, for example, the syntax element qPi_delta_max_idx may represent a delta value between Qpi_min_idx and a maximum qPi index used in chroma Qp$_c$ derivation. A value of qPiMaxIdx may be greater than or equal to qPi_min_idx. For example, a maximum index qPiMaxIdx used in Qp$_c$ derivation may be derived as in the following equation.

$$qPiMaxIdx = \text{qPi\_min\_idx} + \text{qPi\_delta\_max\_idx} \quad \text{[Equation 4]}$$

Furthermore, for example, the syntax element Qp$_C$_qPi_val[i] may represent a Qp$_C$ value for an i-th index.

Furthermore, for example, the syntax element QpOffset$_C$ may represent an offset value used for the derivation of Qp$_C$.

Furthermore, for example, a parameter QpcIdx[qPi] for qPi may be derived as follows. In this case, the qPi may be 0 to qPiMaxIdx.

When qPi<qPi_min_idx, QpcIdx[qPi] may be set identically with qPi.

When qPi=qPi_min_idx . . . qPiMaxIdx, QpcIdx[qPi] may be set identically with Qp$_C$_qPi_val[qPi].

When qPi>qPiMaxIdx, QpcIdx[qPi] may be set as qPi− QpOffset$_C$.

Thereafter, a value of Qp$_C$ may be derived as QpcIdx[qPi].

For example, according to the present embodiment, if a process of deriving a quantization parameter is described in a standard format, the process may be represented as in the following table.

TABLE 16

Derivation process for quantization parameters
Inputs to this process are:
-a luma location ( xCb, yCb ) specifying the top-left luma sample of the current coding block
relative to the top-left luma sample of the current picture,
-a variable cbWidth specifying the width of the current coding block in luma samples,
-a variable cbHeight specifying the height of the current coding block in luma samples,
-a variable treeType specifying whether a single tree (SINGLE_TREE) or a dual tree is used
to partition the CTUs and, when a dual tree is used, whether the luma
(DUAL_TREE_LUMA) or chroma components (DUAL_TREE_CHROMA) are currently
processed.
In this process, the luma quantization parameter $Qp'_Y$ and the chroma quantization
parameters $Qp'_{Cb}$ and $Qp'_{Cr}$ are derived.
The luma location ( xQg, yQg ), specifies the top-left luma sample of the current quantization
group relative to the top left luma sample of the current picture. The horizontal and vertical
positions xQg and yQg are set equal to CuQgTopLeftX and CuQgTopLeftY, respectively.
NOTE - : The current quantization group is a rectangluar region inside a coding tree block
that shares the same $qP_{Y\_PRED}$. Its width and height are equal to the width and height of the
coding tree node of which the top-left luma sample position is assigned to the variables
CuQgTopLeftX and CuQgTopLeftY.
When treeType is equal to SINGLE_TREE or DUAL_TREE_LUMA, the predicted luma
quantization parameter $qP_{Y\_PRED}$ is derived by the following ordered steps:
1. The variable $qP_{Y\_PREV}$ is derived as follows:
   - If one or more of the following conditions are true, $qP_{Y\_PREV}$ is set equal to
     $SliceQp_Y$:
     - The current quantization group is the first quantization group in a slice.
     - The current quantization group is the first quantization group in a brick,
   - Otherwise, $qP_{Y\_PREV}$ is set
2. The availability derivation process for a block as specified in clause 6.4.X [Ed. (BB):
   Neighbouring blocks availability checking process tbd] is invoked with the location
   ( xCurr, yCurr ) set equal to ( xCb, yCb ) and the neighbouring location
   ( xNbY, yNbY ) set equal to ( xQg − 1, yQg ) as inputs, and the output is assigned to
   availableA. The variable $qP_{Y\_A}$ is derived as follows:
   - If one or more of the following conditions are true, $qP_{Y\_A}$ is set equal to $qP_{Y\_PREV}$:
     - availableA is equal to FALSE.
     - the CTB address ctbAddrA of the CTB containing the luma coding block
       covering the luma location ( xQg − 1, yQg ) is not equal to CtbAddrInBs,
       where ctbAddrA is derived as follows:
       xTmp = ( xQg − 1 ) >> MinTbLog2SizeY
       yTmp = yQg >> MinTbLog2SizeY
       minTbAddrA = MmTbAddrZs[ xTmp ][ yTmp ]
       ctbAddrA = minTbAddrA >> ( 2 * ( CtbLog2SizeY − MinTbLog2SizeY ) )
   - Otherwise, $qP_{Y\_A}$ is set equal to the luma quantization parameter $Qp_Y$ of the
     coding unit containing the luma coding block covering ( xQg − 1, yQg ).
3. The availability derivation process for a block as specified in clause 6.4.X [Ed. (BB):
   Neighbouring blocks availability checking process tbd] is invoked with the location
   ( xCurr, yCurr ) set equal to ( xCb, yCb ) and the neighbouring location
   ( xNbY, yNbY ) set equal to ( xQg, yQg − 1 ) as inputs, and the output is assigned to
   availableB. The variable $qP_{Y\_B}$ is derived as follows:
   - If one or more of the following conditions are true, $qP_{Y\_B}$ is set equal to $qP_{Y\_PREV}$:
     - availableB is equal to FALSE.
     - the CTB address ctbAddrB of the CTB containing the luma coding block
       covering the luma location ( xQg, yQg − 1 ) is not equal to CtbAddrInBs,
       where ctbAddrB is derived as follows:
       xTmp = xQg >> MinTbLog2SizeY
       yTmp = ( yQg − 1 ) >> MinTbLog2SizeY
       minTbAddrB = MinTbAddrZs[ xTmp ][ yTmp ]
       ctbAddrB =
       minTbAddrB >> ( 2 * ( CtbLog2SizeY − MinTbLog2SizeY ) ) (8-922)
   - Otherwise, $qP_{Y\_B}$ is set equal to the luma quantization parameter $Qp_Y$ of the
     coding unit containing the luma coding block covering ( xQg, yQg − 1 ).
4. The predicted luma quantization parameter $qP_{Y\_PRED}$ is derived as follows:
   - If all the following conditions are true, then $qP_{Y\_PRED}$ is set equal to the luma
     quantization parameter $Qp_Y$ of the coding unit containing the luma coding block
     covering ( xQg, yQg − 1 ):
     - availableB is equal to TRUE.
     - the current quantization group is the first quantization group in a CTB row
       within a brick
   - Otherwise, $qP_{Y\_PRED}$ is derived as follows:
     $qP_{Y\_PRED} = ( qP_{Y\_A} + qP_{Y\_B} + 1 ) >> 1$
The variable $Qp_Y$ is derived as follows:
   $Qp_Y =$
   $( ( qP_{Y\_PRED} + CuQpDeltaVal + 64 + 2 * QpBdOffset_Y )\%( 64 + QpBdOffset_Y ) ) - QpBdOffset_Y$
The luma quantization parameter $Qp'_Y$ is derived as follows:
   $Qp'_Y = Qp_Y + QpBdOffset_Y$
When ChromaArrayType is not equal to 0 and treeType is equal to SINGLE_TREE or
DUAL TREE CHROMA, the following applies:
- When treeType is equal to DUAL_TREE_CHROMA, the variable $Qp_Y$ is set equal to the
  luma quantization parameter $Qp_Y$ of the luma coding unit that covers the luma location
  ( xCb + cbWidth / 2, yCb + cbHeight / 2 ).

TABLE 16-continued

- The variables $qP_{Cb}$, $qP_{Cr}$ and $qP_{CbCr}$ are derived as follows:
  $qPi_{Cb}$ = Clip3( $-QpBdOffset_C$, 69, $Qp_Y$ + pps_cb_qp_offset + slice_cb_qp_offset )
  $qPi_{Cr}$ = Clip3( $-QpBdOffset_C$, 69, $Qp_Y$ + pps_cr_qp_offset + slice_cr_qp_offset )
  $qPi_{CbCr}$ = Clip3( $-QpBdOffset_C$, 69, $Qp_Y$ + pps_joint_cbcr_qp_offset + slice_joint_c
  bcr_qp_offset )
  - If ChromaArrayType is equal to 1, the variables $qP_{Cb}$, $qP_{Cr}$ and $qP_{CbCr}$ are
  set equal to the value of $Qp_C$ as specified in-Table 8-15 based on the index qPi equal to
  $qPi_{Cb}$, $qPi_{Cr}$ and $qPi_{CbCr}$, respectively clause 7.x x
- Otherwise, the variables $qP_{Cb}$, $qP_{Cr}$ and $qP_{CbCr}$ are set equal to Min( qPi, 63 ), based on the
  index qPi equal to $qPi_{cb}$, $qPi_{Cr}$ and $qPi_{CbCr}$, respectively.
- The chroma quantization parameters for the Cb and Cr components, $Qp'_{Cb}$ and $Qp'_{Cr}$, and
  joint Cb-Cr coding $Qp'_{CbCr}$ are derived as follows:
  $Qp'_{Cb} = qP_{Cb} + QpBdOffset_C$
  $Qp'_{Cr} = qP_{Cr} + QpBdOffset_C$
  $Qp'_{CbCr} = qP_{CbCr} + QpBdOffset_C$ Referring to Table 16, a derivation process for luma and chroma quantization parameter may be started based on the fact that an input for the process is a luma location (xCb, yCb), a parameter cbWidth and cbHeight designating the width and height of a current coding block, and a parameter treeType designating a single tree or a dual tree. Meanwhile, as in the aforementioned contents, a luma quantization parameter and a chroma quantization parameter may be represented as $Qp'_Y$, $Qp'_{Cb}$ and $Qp'_{Cr}$.

Furthermore, this document proposes another embodiment in which information for a quantization parameter is signaled.

For example, the present embodiment proposes an example in which a flag within as an SPS has a user defined mode or a default mode, syntax elements which may be used to control the derivation of a quantization parameter are used. An example of a syntax element which may be used to derive a quantization parameter may be the same as the following tables. Meanwhile, a structure of the syntax elements is not limited to a structure illustrated in the following tables, for example.

TABLE 17

| | Descriptor |
|---|---|
| pic_parameter_set_rbsp( ) { | |
|   pps_pic_parameter_set_id | ue(v) |
| ... | |
|   Qpc_data_default_flag | u(1) |
| ... | |

TABLE 18

| | Descriptor |
|---|---|
| slice_header( ) { | |
|   slice_pic_parameter_set_id | ue(v) |
| ... | |
|   if(!Qpc_data_default_flag ) | |
|     slice_$Qp_C$_aps_id | u(5) |
|   byte_alignment( ) | |
| } | |

TABLE 19

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |

TABLE 19-continued

| | Descriptor |
|---|---|
|     alf_data(adaptation_parameter_set_id ) | |
|   else if ( aps_params_type = = LMCS_APS ) | |
|     lmcs_data( ) | |
|   else if ( aps_params_type = = Qpc_APS ) // 2 | |
|     $Qp_C$_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

For example, the syntax element Qpc_data_default_flag may represent whether a user defined mode is used for the derivation of a quantization parameter. For example, Qpc_data_default_flag having a value of 0 may represent that the user defined mode is used for the derivation of a quantization parameter. Furthermore, for example, Qpc_data_default_flag having a value of 1 may represent that a default table is used for the derivation of a chroma quantization parameter. In this case, the default table may be the same as Table 7. Furthermore, if the syntax element Qpc_data_default_flag is not present, the syntax element Qpc_data_default_flag may be inferred as 1.

Meanwhile, if the user defined mode is used, a corresponding slice header, tile group/header, or another proper header may be used to signal an APS ID. For example, as in Table 18, a syntax element representing an APS ID through a slice header may be signaled.

For example, the syntax element slice_$Qp_c$_aps_id may represent adaptation_parameter_set_id of a $Qp_c$ APS referred to by a slice. TemporalId of a $Qp_c$ APS NAL unit having adaptation_parameter_set_id, such as slice_$Qp_c$_aps_id, may be smaller than or equal to TemporalId of a coded slice NAL unit. If a plurality of $Qp_c$ APSs having adaptation_parameter_set_id having the same value is referred to by two or more slices of the same picture, a plurality of $Qp_c$ APSs having adaptation_parameter_set_id having the same value may have the same content.

Furthermore, an APS structure that transfers chroma quantization data, which is proposed in the present embodiment, may be the same as Table 19.

For example, the syntax element adaptation_parameter_set_id may provide an identifier of an APS referred to by other syntax elements.

Furthermore, for example, the syntax element aps_extension_flag may represent whether aps_extension_data_flag_syntax elements are present in an APS RBSP syntax structure. For example, the syntax element aps_extension_ flag having a value of 1 may represent that the aps_extension_data_flag_syntax elements are present in an APS RBSP syntax structure. The syntax element aps_extension_flag having a value of 0 may represent that the aps_extension_data_flag_syntax elements are not present in an APS RBSP syntax structure.

Furthermore, for example, the syntax element aps_extension_data_flag may have any value. The presence (presence and value) of the aps_extension_data_flag may not affect decoding suitability for a profile specified in a version of this standard. For example, the decoding apparatus following a version of this standard may ignore all of the syntax elements aps_extension_data_flag.

Furthermore, for example, the syntax element aps_params_type may represent the type of APS parameters included in an APS as illustrated in Table 10.

Qpc_data( ) disclosed in Table 19 may be signaled as in the following table.

TABLE 20

|  | Descriptor |
|---|---|
| $Qp_C$_data ( ) { |  |
|   qPi_min_idx | ue(v) |
|   qPi_delta_max_idx | ue(v) |
|   $Qp_C$_prec_minus1 | ue(v) |
|   $Qp_C$_init_val | ue(v) |
|   for ( i = qPi_min_idx + 1; i <= qPiMaxIdx; i++ ) |  |
|     $Qp_C$_qPi_delta_val[ i ] | ue(v) |
|   QpOffset$_C$ | ue(v) |
| } |  |

For example, the syntax element qPi_min_idx may represent a minimum qPi index used in chroma quantization.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. For example, a maximum index qPiMaxIdx used in $Qp_c$ derivation may be derived like Equation 4.

Furthermore, for example, a value obtained by adding 1 to the syntax element $Qp_c$_prec_minus1 may represent the number of bits used for the representation of the syntax lmcs_delta_abs_cw[i]. A value of $Qp_c$_prec_minus1 may be in a range of 0 to BitDepth$_Y$−2.

Furthermore, for example, the syntax element $Qp_c$_init_val may represent a $Qp_C$ value corresponding to qPi_min_idx.

Furthermore, for example, the syntax element $Qp_C$_qPi_delta_val[i] may represent the delta of a $Qp_C$ value for an i-th index.

Furthermore, for example, the syntax element QpOffset$_C$ may represent an offset value used for the derivation of $Qp_c$.

For example, a parameter QpcIdx[qPi] for qPi may be derived as follows. In this case, the qPi may be 0 to qPiMaxIdx.

When qPi<qPi_min_idx, QpcIdx[qPi] may be set identically with qPi.

When qPi=qPi_min_idx . . . qPiMaxIdx, QpcIdx[qPi] may be set as $Qp_c$_qPi_delta_val[qPi]+QpcIdx[qPi−1].

When qPi>qPiMaxIdx, QpcIdx[qPi] may be set as qPi−QpOffset$_C$.

Thereafter, a value of $Qp_c$ may be derived as QpcIdx[qPi].

As in the aforementioned embodiment, a chroma quantization parameter, that is, Qp'Cb, Qp'Cr, and Qp'CbCr, may be derived using signaled user defined information or a default value illustrated in a default table, such as Table 7.

For example, in the present embodiment, if a process of deriving a quantization parameter is written in a standard format, the process may be represented as in the following table.

TABLE 21

Derivation process for quantization parameters
Inputs to this process are:
-a luma location ( xCb, yCb ) specifying the top-left luma sample of the current coding block relative to the top-left luma sample of the current picture,
-a variable cbWidth specifying the width of the current coding block in luma samples,
-a variable cbHeight specifying the height of the current coding block in luma samples,
-a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.
In this process, the luma quantization parameter Qp'$_Y$ and the chroma quantization parameters Qp'$_{Cb}$ and Qp'$_{Cr}$ are derived.
The luma location ( xQg, yQg ), specifies the top-left luma sample of the current quantization group relative to the top left luma sample of the current picture. The horizontal and vertical positions xQg and yQg are set equal to CuQgTopLeftX and CuQgTopLeftY, respectively.
NOTE - : The current quantization group is a rectangluar region inside a coding tree block that shares the same qP$_{Y\_PRED}$. Its width and height are equal to the width and height of the coding tree node of which the top-left luma sample position is assigned to the variables CuQgTopLeftX and CuQgTopLeftY.
When treeType is equal to SINGLE_TREE or DUAL_TREE_LUMA, the predicted luma quantization parameter qP$_{Y\_PRED}$ is derived by the following ordered steps:
   1. The variable qP$_{Y\_PREV}$ is derived as follows:
     - If one or more of the following conditions are true, qP$_{Y\_PREV}$ is set equal to SliceQp$_Y$:
       - The current quantization group is the first quantization group in a slice.
       - The current quantization group is the first quantization group in a brick.
     - Otherwise, qP$_{Y\_PREV}$ is set
       2. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg − 1, yQg ) as inputs, and the output is assigned to availableA. The variable qP$_{Y\_A}$ is derived as follows:

TABLE 21-continued

- If one or more of the following conditions are true, $qP_{Y\_A}$ is set equal to $qP_{Y\_PREV}$:
  - availableA is equal to FALSE.
  - the CTB address ctbAddrA of the CTB containing the luma coding block covering the luma location ( xQg − 1, yQg ) is not equal to CtbAddrInBs, where ctbAddrA is derived as follows:
    xTmp = ( xQg − 1 ) >> MinTbLog2SizeY
    yTmp = yQg >> MinTbLog2SizeY
    minTbAddrA = MinTbAddrZs[ xTmp ][ yTmp ]
    ctbAddrA = minTbAddrA >> ( 2 * ( CtbLog2SizeY − MinTbLog2SizeY ) )
- Otherwise, $qP_{Y\_A}$ is set equal to the luma quantization parameter $Qp_Y$ of the coding unit containing the luma coding block covering ( xQg − 1, yQg ).

3. The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xQg, yQg − 1 ) as inputs, and the output is assigned to availableB. The variable $qP_{Y\_B}$ is derived as follows:
   - If one or more of the following conditions are true, $qP_{Y\_B}$ is set equal to $qP_{Y\_PREV}$:
     - availableB is equal to FALSE.
     - the CTB address ctbAddrB of the CTB containing the luma coding block covering the luma location ( xQg, yQg − 1 ) is not equal to CtbAddrInBs, where ctbAddrB is derived as follows:
       xTmp = xQg >> MinTbLog2SizeY
       yTmp = ( yQg − 1 ) >> MinTbLog2SizeY
       minTbAddrB = MinTbAddrZs[ xTmp ][ yTmp ]
       ctbAddrB =
       minTbAddrB >> ( 2 * ( CtbLog2SizeY − MinTbLog2SizeY ) )  (8-922)
   - Otherwise, $qP_{Y\_B}$ is set equal to the luma quantization parameter $Qp_Y$ of the coding unit containing the luma coding block covering ( xQg, yQg − 1 ).

4. The predicted luma quantization parameter $qP_{Y\_PRED}$ is derived as follows:
   - If all the following conditions are true, then $q_{PY\_PRED}$ is set equal to the luma quantization parameter $Qp_Y$ of the coding unit containing the luma coding block covering ( xQg, yQg − 1 ):
     - availableB is equal to TRUE.
     - the current quantization group is the first quantization group in a CTB row within a brick
   - Otherwise, $qP_{Y\_PRFD}$ is derived as follows:
     qPy_pred = ( $qP_{Y\_A}$ + $qP_{Y\_B}$ + 1 ) >> 1

The variable $Qp_Y$ is derived as follows:
$QP_Y$ =
( ( $qP_{Y\_PRED}$ + CuQpDeltaVal + 64 + 2 * $QpBdOffset_Y$ )%( 64 + $QpBdOffset_Y$ ) ) − $QpBdOffset_Y$ The luma quantization parameter $Qp'_Y$ is derived as follows:
$Qp'_Y$ = $Qp'_Y$ + $QpBdOffset_Y$ When ChromaArrayType is not equal to 0 and treeType is equal to SINGLE_TREE or DUAL_TREE_CHROMA, the following applies:
- When treeType is equal to DUAL_TREE_CHROMA, the variable $Qp_Y$ is set equal to the luma quantization parameter $Qp_Y$ of the luma coding unit that covers the luma location ( xCb + cbWidth / 2, yCb + cbHeight / 2 ).
- The variables $qP_{Cb}$, $qP_{Cr}$ and $qP_{CbCr}$ are derived as follows:
  $qPi_{Cb}$ = Clip3( $-QpBdOffset_C$, 69, $Qp_Y$ + pps_cb_qp_offset + slice_cb_qp_offset )
  $qPi_{Cr}$ = Clip3( $-QpBdOffsct_C$, 69, $Qp_Y$ + pps_cr_qp_offset + slice_cr_qp_offset )
  $qPi_{CbCr}$ = Clip3( $-QpBdOffset_C$, 69, $Qp_Y$ + pps_joint_cbcr_qp_offset + slice_joint_cbcr_qp_offset )
  - If ChromaArrayType is equal to 1, and Qpc_data_default_flag is equal to FALSE, the variables $qP_{Cb}$, $qP_{Cr}$, and $qP_{CbCr}$ are set equal to the value of $Qp_C$ as specified in clause 7.x.x
  - If ChromaArrayType is equal to 1, and Qpc_data_default_flag is equal to TRUE, the variables $qP_{Cb}$, $qP_{Cr}$, and $qP_{cbCr}$ are specified in Table 8-15 based on the index qPi equal to $qPi_{Cb}$, $qPi_{Cr}$, $qPi_{CbCr}$, respectively.
- Otherwise, the variables $qP_{Cb}$, $qP_{Cr}$, and $qP_{CbCr}$ are set equal to Min( qPi, 63 ), based on the index qPi equal to $qPi_{Cb}$, $qPi_{Cr}$, and $qPi_{CbCr}$, respectively.
- The chroma quantization parameters for the Cb and Cr components, $Qp'_{Cb}$ and $Qp'_{Cr}$, and joint Cb-Cr coding $Qp'_{CbCr}$ are derived as follows:
  $Qp'_{Cb}$ = $qP_{Cb}$ + $QpBdOffset_C$
  $Qp'_{Cr}$ = $qP_{Cr}$ + $QpBdOffset_C$
  $Qp'_{CbCr}$ = $qP_{CbCr}$ + $QpBdOffset_C$

TABLE 8-15

Specification of $Qp_C$ as a function of qPi for ChromaArrayType equal to 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_C$ | =qPi | 29 | 30 | 31 | 32 | 33 | 33 | 34 | 34 | 35 | 35 | 36 | 36 | 37 | 37 | =qPi − 6 |

Referring to Table 21, when ChromaArrayType is 1 and $Qp_C\_data\_default\_flag$ indicates false (i.e., for example, when $Qp_C\_data\_default\_flag$ is 0), the parameters $qP_{Cb}$, $qP_{Cr}$ and $qP_{CbCr}$ may be derived based on signaled user defined information as proposed in the present embodiment. When ChromaArrayType is 1 and $Qp_C\_data\_default\_flag$ indicates true (i.e., for example, when $Qp_C\_data\_default\_flag$ is 1), the parameters $qP_{Cb}$, $qP_{Cr}$ and $qP_{CbCr}$ may be derived by a default table based on the same indices $qPi_{Cb}$, $qPi_{Cr}$ and $qPi_{CbCr}$, respectively.

Furthermore, this document proposes another embodiment in which information for a quantization parameter is signaled.

For example, the present embodiment proposes syntax elements which may be used to control the derivation of a quantization parameter by indicating a user defined mode or a default mode through the flag of an SPS. Specifically, the present embodiment proposes a scheme for signaling the syntax elements of the following syntax structure. Meanwhile, a structure of the syntax elements is an example, and is not limited to a structure illustrated in the following table.

TABLE 22

|  | Descriptor |
|---|---|
| $Qp_C\_data$ ( ) {  |  |
|   qPi_min_idx | ue(v) |
|   qPi_delta_max_idx | ue(v) |
|   for ( i = qPi_min_idx; i <= qPiMaxIdx, i++ ) |  |
|     $Qp_C\_qPi\_delta\_val$[ i ] | ue(v) |
|   $QpOffset_C$ | ue(v) |
| } |  |

For example, the syntax element qPi_min_idx may represent a minimum qPi index used in chroma quantization.

Furthermore, for example, the syntax element qPi_delta_max_idx may represent a delta value between Qpi_min_idx and a maximum qPi index used in chroma $Qp_C$ derivation. A value of qPiMaxIdx may be greater than or equal to qPi_min_idx. For example, maximum index qPiMaxIdx used in $Qp_C$ derivation may be derived like Equation 4.

Furthermore, for example, the syntax element $Qp_C\_qPi\_delta\_val$[i] may represent the delta of a $Qp_C$ value for an i-th index.

Furthermore, for example, the syntax element $QpOffset_C$ may represent an offset value used in the derivation of $Qp_c$, such as the aforementioned contents.

As in the aforementioned embodiment, chroma quantization parameter, that is, Qp'Cb, Qp'Cr and Qp'CbCr may be derived using signaled user defined information or a default value used in a default table, such as Table 7.

For example, in the present embodiment, if a process of deriving a quantization parameter is written in a standard format, the process may be represented as in FIG. 12 to FIG. 16.

FIG. 12 to FIG. 16 represent an example of derivation process for quantization parameters.

Referring to FIG. 12 to FIG. 16, when ChromaArrayType is 1 and $Qp_C\_data\_default\_flag$ indicates false (i.e., for example, when $Qp_C\_data\_default\_flag$ is 0), the parameters $qP_{Cb}$, $qP_{Cr}$ and $qP_{CbCr}$ may be derived based on signaled user defined information as proposed in the present embodiment. For example, when ChromaArrayType is 1 and $Qp_C\_data\_default\_flag$ indicates false (i.e., for example, when $Qp_C\_data\_default\_flag$ is 0), the parameters $qP_{Cb}$, $qP_{Cr}$ and $qP_{CbCr}$ may be derived identically with a value of $Qp_c$ based on the same indices qPi as $qPi_{Cb}$, $qPi_{Cr}$ and $qPi_{CbCr}$, respectively, as follows.

For example, the parameter QpcIdx[i] may be derived as follows.

When i<qPi_min_idx, QpcIdx[qPi] may be set identically with qPi.

When i=qPi_min_idx . . . qPiMaxIdx, QpcIdx[i] may be set as $Qp_C\_qPi\_delta\_val$[i]+QpcIdx[i−1].

When i>qPiMaxIdx, QpcIdx[i] may be set as qPi−QpOffset$_C$.

Thereafter, the $Qp_c$ may be set as the QpcIdx[i].

Furthermore, referring to FIG. 12 to FIG. 16, when ChromaArrayType is 1 and $Qp_C\_data\_default\_flag$ indicates true (i.e., for example, when $Qp_C\_data\_default\_flag$ is 1), the parameters $qP_{Cb}$, $qP_{Cr}$ and $qP_{CbCr}$ may be derived by a default table based on the same indices qPi as $qPi_{Cb}$, $qPi_{Cr}$ and $qPi_{CbCr}$, respectively.

Furthermore, this document proposes another embodiment in which information for a quantization parameter is signaled.

For example, the present embodiment proposes syntax elements for a chroma quantization ($Qp_C$) derivation parameter in an adaptation parameter set (APS). For example, an APS ID may be signaled in a slice header. Furthermore, for example, there may be proposed a flag within a picture parameter set (PPS) that represents whether a default table is used or a table derived from information signaled in an APS is used. Furthermore, for example, if a default table is not used, an additional control scheme for supporting access to an APS including $Qp_c$ data may be added to a slice header.

Meanwhile, according to the existing video/image standard, chroma QP may be derived from luma QP, and may be updated by an additionally signaled chroma QP offset. The existing chroma quantization parameter $Qp_C$ table may be a default table, such as Table 7.

The present embodiment proposes adding a function for signaling a chroma quantization parameter $Qp_C$ as a function of an index qPi. An APS may be used to integrate signaling schemes of $Qp_C$ values.

For example, an APS according to the present embodiment may be the same as the following table.

TABLE 24

|  | Descriptor |
|---|---|
| adaptation_parameter_set_rbsp( ) { |  |
|   adaptation_parameter_set_id | u(5) |
|   aps_params_type | u(3) |
|   if( aps_params_type == ALF_APS ) |  |
|     alf_data(adaptation_parameter_set_id ) |  |
|   else if ( aps_params_type == LMCS_APS ) |  |
|     lmcs_data( ) |  |
|   else if ( aps_params_type == $Qp_C$_APS ) // 2 |  |
|     $Qp_C$_data( ) |  |
|   aps_extension_flag | u(1) |
|   if( aps_extension_flag ) |  |
|     while( more_rbsp_data( ) ) |  |
|       aps_extension_data_flag | u(1) |
|   rbsp_trailing_bits( ) |  |
| } |  |

For example, the syntax element adaptation_parameter_set_id may provide an identifier of an APS referred to by other syntax elements.

Furthermore, for example, the syntax element aps_params_type may represent the type of APS parameters included in an APS as illustrated in Table 10.

Furthermore, for example, the syntax element aps_extension_flag may represent whether the aps_extension_data_flag_syntax elements are present in an APS RBSP syntax structure. For example, the syntax element aps_extension_flag having a value of 1 may represent that the aps_extension_data_flag_syntax elements are present in an APS RBSP syntax structure. The syntax element aps_extension_flag having a value of 0 may represent that the aps_extension_data_flag_syntax elements are not present in an APS RBSP syntax structure.

Furthermore, for example, the syntax element aps_extension_data_flag may have any value. The presence (presence and value) of the aps_extension_data_flag may not affect decoding suitability for a profile specified in a version of this standard. For example, the decoding apparatus following a version of this standard may ignore all of the syntax elements aps_extension_data_flag.

$Qp_C$_data( ) disclosed in Table 24 may be signaled as in the following table.

TABLE 25

| | Descriptor |
|---|---|
| $Qp_C$_data ( ) { | |
|     qPi_min_idx | ue(v) |
|     qPi_delta_max_idx | ue(v) |
|     for ( i = qPi_min_idx; i <= qPiMaxIdx; i++ ) | |
|         $Qp_C$_qPi_delta_val[ i ] | ue(v) |
|     $Qp_C$Offset$_C$_present_flag | u(1) |
|     if($Qp_C$Offset$_C$_present_flag) | |
|         QpOffset$_C$ | ue(v) |
| } | |

For example, the syntax element qPi_min_idx may represent a minimum qPi index used in chroma quantization. A value of qPi_min_idx may be in a range of 0 to 63.

Furthermore, for example, the syntax element qPi_delta_max_idx may represent a delta value between Qpi_min_idx and a maximum qPi index used in chroma $Qp_C$ derivation. A value of qPiMaxIdx may be greater than or equal to qPi_min_idx. Furthermore, for example, a value of qPi_delta_max_idx may be in a range of 0 to 63. For example, a maximum index qPiMaxIdx used in $Qp_C$ derivation may be derived like Equation 4.

Furthermore, for example, the syntax element $Qp_C$_qPi_delta_val[i] may represent a difference between $Qp_C$ values for an i-th index. The a difference may also be called a delta.

Furthermore, for example, the syntax element $Qp_C$Offset$_C$_present_flag may represent whether QpOffset$_C$ is present in a bitstream. For example, $Qp_C$Offset$_C$_present_flag having a value of 1 may represent that QpOffset$_C$ is present in a bitstream. Furthermore, for example, QpCOffset$_C$_present_flag having a value of 0 may represent that QpOffset$_C$ is not present in a bitstream. When $Qp_C$Offset$_C$_present_flag is not present, $Qp_C$Offset$_C$_present_flag may be inferred as 0.

Furthermore, for example, the syntax element QpOffset$_C$ may represent an offset value used in the derivation of $Qp_C$.

For example, a parameter QpcIdx[qPi] for qPi may be derived as follows. In this case, the qPi may be 0 to 63.
When qPi<qPi_min_idx, QpcIdx[qPi] may be set identically with qPi.
When qPi=qPi_min_idx . . . qPiMaxIdx, QpcIdx[qPi] may be set as $Qp_C$_qPi_delta_val[qPi]+QpcIdx[qPi−1].
If qPi>qPiMaxIdx, when $Qp_C$Offset$_C$_present_flag is 1, QpcIdx[qPi] may be set as qPi−QpOffset$_C$. If QpCOffset$_C$_present_flag is not 1, that is, if $Qp_C$Offset$_C$_present_flag is 0, QpcIdx[qPi] may be set as qPi−(qPiMaxIdx−QpcIdx[qPiMaxIdx]).

Thereafter, a value of $Qp_c$ may be derived as QpcIdx[qPi].

Furthermore, the present embodiment proposes a flag signaled as a PPS as in the following table.

TABLE 26

| | Descriptor |
|---|---|
| pic_parameter_set_rbsp( ) { | |
|     pps_pic_parameter_set_id | ue(v) |
|     ... | |
|     Qpc_data_default_flag | u(1) |
|     ... | |

For example, the syntax element $Qp_c$_data_default_flag may represent whether a user defined mode is used for quantization parameter derivation. For example, $Qp_c$_data_default_flag having a value of 0 may represent that a user defined mode is used for quantization parameter derivation. Furthermore, for example, $Qp_c$_data_default_flag having a value of 1 may represent that the aforementioned default table is used for quantization parameter derivation. The default table may be the same as Table 7. If $Qp_c$_data_default_flag is not present, $Qp_c$_data_default_flag may be inferred as 1.

Furthermore, the present embodiment proposes a syntax element signaled as a slice header as in the following table.

TABLE 27

| | Descriptor |
|---|---|
| slice_header( ) { | |
|     slice_pic_parameter_set_id | ue(v) |
|     ... | |
|     if(!Qpc_data_default_flag ) | |
|         slice_$Qp_C$_aps_id | u(5) |
|     ... | |
|     byte_alignment( ) | |
| } | |

For example, the syntax element slice_$Qp_c$_aps_id may represent adaptation_parameter_set_id of a $Qp_c$ APS referred to by a slice. TemporalId of a $Qp_c$ APS NAL unit having adaptation_parameter_set_id, such as slice_$Qp_c$_aps_id, may be smaller than or the same as TemporalId of a coded slice NAL unit. If a plurality of $Qp_c$ APSs having adaptation_parameter_set_id having the same value is referred to by two or more slices of the same picture, a plurality of $Qp_c$ APSs having adaptation_parameter_set_id having the same value may have the same content.

For example, in the present embodiment, if a process of deriving a quantization parameter is written in a standard format, the process may be represented as in FIG. 17 to FIG. 21.

FIG. 17 to FIG. 21 represent an example of derivation process for quantization parameters.

Referring to FIG. 17 to FIG. 21, when ChromaArrayType is 1 and $Qp_c$_data_default_flag indicates false (i.e., for example, when $Qp_c$_data_default_flag is 0), the parameters $qP_{Cb}$, $qP_{Cr}$ and $qP_{CbCr}$ may be derived based on signaled user defined information as proposed in the present embodiment. Furthermore, for example, when ChromaArrayType is 1 and $Qp_c$_data_default_flag indicates true (i.e., for example, when $Qp_c$_data_default_flag is 1), the parameters $qP_{Cb}$, $qP_{Cr}$ and $qP_{CbCr}$ may be derived by a default table based on the same indices qPi as $qPi_{Cb}$, $qPi_{Cr}$ and $qPi_{CbCr}$, respectively.

Furthermore, this document proposes another embodiment in which information for a quantization parameter is signaled.

For example, in the present embodiment, it is proposed that user defined derivation of chroma quantization is signaled in an SPS as follows. For example, the present embodiment proposes user defined chroma quantization ($Qp_C$). For example, the flag of an SPS may represent whether a default table is used for chroma quantization derivation or the contents of the table for chroma quantization derivation is derived in information signaled in the SPS.

For example, the present embodiment proposes a scheme for performing chroma quantization as a function of an index qPi by using syntax elements illustrated in the following table.

TABLE 29

|  | Descriptor |
|---|---|
| $Qp_C$\_data( ) { |  |
|   qPi_min_idx | ue(v) |
|   qPi_delta_max_idx | ue(v) |
|   for ( i = qPi_min_idx; i <= qPiMaxIdx, i++ ) |  |
|     $Qp_C$\_qPi_delta_val[ i ] | ue(v) |
| } |  |

For example, the syntax element qPi_min_idx may represent a minimum qPi index used in chroma quantization. A value of qPi_min_idx may be in a range of 0 to 63.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. A value of qPi_delta_max_idx may be in a range of 0 to 63. For example, a maximum index qPiMaxIdx used in $Qp_c$ derivation may be derived like Equation 4.

Furthermore, for example, the syntax element $Qp_C$\_qPi_delta_val[i] may represent the delta of a $Qp_C$ value for an i-th index.

For example, a parameter QpcIdx[qPi] may be derived as follows.

When qPi<qPi_min_idx, QpcIdx[qPi] may be set identically with qPi.

When qPi=qPi_min_idx . . . qPiMaxIdx, QpcIdx[qPi] may be set as $Qp_C$\_qPi_delta_val[qPi]+QpcIdx[qPi−1].

When qPi>qPiMaxIdx, QpcIdx[qPi] may be set as qPi−(qPiMaxIdx−QpcIdx[qPiMaxIdx]).

Thereafter, the $Qp_C$ may be set as the QpcIdx[qPi].

Furthermore, the flag of an SPS representing whether a default table is used for chroma quantization derivation or whether signaled information signaled information is used for chroma quantization derivation, which is proposed in the present embodiment, may be the same as the following table.

TABLE 30

|  | Descriptor |
|---|---|
| seq_parameter_set_rbsp( ) { |  |
|   sps_decoding_parameter_set_id | u(4) |
|   ... |  |
|   Qpc_data_default_flag | u(1) |
|   if(!$Qp_C$\_data_default_flag) |  |
|     $Qp_C$\_data( ) |  |
|   ... |  |

For example, the syntax element $Qp_c$\_data_default_flag may represent whether a user defined mode is used for the derivation of a quantization parameter. For example, $Qp_c$\_data_default_flag having a value of 0 may represent that a user defined mode is used for the derivation of a quantization parameter. Furthermore, for example, $Qp_c$\_data_default_flag having a value of 1 may represent that a default table is used for the derivation of a quantization parameter. The default table may be the same as Table 7. Furthermore, if $Qp_c$\_data_default_flag is not present, the $Qp_c$\_data_default_flag may be inferred as 1.

For example, according to the present embodiment, if a process of deriving a quantization parameter is written in a standard format, the process may be represented as in FIG. 22 to FIG. 26.

FIG. 22 to FIG. 26 represent an example of derivation process for quantization parameters.

Referring to FIG. 22 to FIG. 26, when ChromaArrayType is 1 and $Qp_c$\_data_default_flag indicates false (i.e., for example, when $Qp_c$\_data_default_flag is 0), the parameters $qP_{Cb}$, $qP_{Cr}$ and $qP_{CbCr}$ may be derived based on signaled user defined information as proposed in the present embodiment. Furthermore, for example, when ChromaArrayType is 1 and $Qp_c$\_data_default_flag indicates true (i.e., for example, when $Qp_c$\_data_default_flag is 1), the parameters $qP_{Cb}$, $qP_{Cr}$ and $qP_{CbCr}$ may be derived by a default table based on the same indices qPi as $qPi_{Cb}$, $qPi_{Cr}$ and $qPi_{CbCr}$, respectively.

Furthermore, this document proposes another embodiment in which information for a quantization parameter is signaled.

For example, the present embodiment proposes adding a function for signaling a chroma quantization parameter $Qp_C$ as a function of an index qPi. For example, there may be proposed a scheme for signaling syntax elements for a user defined table for quantization parameter derivation in a PPS. Accordingly, flexibility regarding changing a user defined table and a default table in each picture that refers to a PPS can be provided.

Syntax elements for a signaled user defined table in a PPS proposed in the present embodiment may be the same as the following table.

TABLE 32

|  | Descriptor |
|---|---|
| $Qp_C$\_data( ) { |  |
|   qPi_min_idx | ue(v) |
|   qPi_delta_max_idx | ue(v) |
|   for ( i = qPi_min_idx; i <= qPiMaxIdx; i++ ) |  |
|     $Qp_C$\_qPi_delta_val[ i ] | ue(v) |
| } |  |

For example, the syntax element qPi_min_idx may represent a minimum qPi index used in chroma quantization. A value of qPi_min_idx may be in a range of 0 to 63.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. A value of qPi_delta_max_idx may be in a range of 0 to 63. For example, a maximum index qPiMaxIdx used in $Qp_c$ derivation may be derived like Equation 4.

Furthermore, for example, the syntax element $Qp_c$\_qPi_delta_val[i] may represent the delta of a $Qp_c$ value for an i-th index.

For example, a parameter QpcIdx[qPi] may be derived as follows.

When qPi<qPi_min_idx, QpcIdx[qPi] may be set identically with qPi.
  When qPi=qPi_min_idx . . . qPiMaxIdx, QpcIdx[qPi] may be set as $Qp_C$_qPi_delta_val[qPi]+QpcIdx[qPi−1].
When qPi>qPiMaxIdx, QpcIdx[qPi] may be set as qPi−(qPiMaxIdx−QpcIdx[qPiMaxIdx]).
Thereafter, the $Qp_c$ may be set as the QpcIdx[qPi].

Furthermore, the flag of SPS representing whether a default table is used for chroma quantization derivation or whether signaled information is used for chroma quantization derivation, which is proposed in the present embodiment, may be the same as the following table.

TABLE 33

| | Descriptor |
|---|---|
| seq_parameter_set_rbsp( ) { | |
|   sps_decoding_parameter_set_id | u(4) |
| ... | |
|   Qpc_data_default_flag | u(1) |
|   if(!$Qp_C$_data_default_flag) | |
|     $Qp_C$_data( ) | |
| ... | |

For example, the syntax element $Qp_c$_data_default_flag may represent whether a user defined mode is used for the derivation of a quantization parameter. For example, $Qp_{c\_}$data_default_flag having a value of 0 may represent that a user defined mode is used for the derivation of a quantization parameter. That is, for example, $Qp_c$_data_default_flag having a value of 0 may represent that chroma quantization parameter data $Qp_c$_data( ) is used. When the $Qp_c$_data_default_flag is 0, the chroma quantization parameter data $Qp_c$_data( ) may be signaled. Furthermore, for example, $Qp_{c\_}$data_default_flag having a value of 1 may represent that a default table is used for the derivation of a quantization parameter. The default table may be the same as Table 7. Furthermore, if $Qp_c$_data_default_flag is not present, the. $Qp_c$_data_default_flag may be inferred as 1.

For example, in the present embodiment, if a process of deriving a quantization parameter is written in a standard format, the process may be represented as in FIG. 27 to FIG. 31.

FIG. 27 to FIG. 31 represent an example of derivation process for quantization parameters.

Referring to FIG. 27 to FIG. 31, when ChromaArrayType is 1 and $Qp_c$_data_default_flag indicates false (i.e., for example, when $Qp_c$_data_default_flag is 0), the parameters $qP_{Cb}$, $qP_{Cr}$ and $qP_{CbCr}$ may be derived based on signaled user defined information as proposed in the present embodiment. Furthermore, for example, ChromaArrayType is 1 and $Qp_c$_data_default_flag indicates true (i.e., for example, when $Qp_c$_data_default_flag is 1), the parameters $qP_{Cb}$, $qP_{Cr}$ and $qP_{CbCr}$ may be derived by a default table based on the same indices qPi as $qPi_{Cb}$, $qPi_{Cr}$ and $qPi_{CbCr}$, respectively.

Furthermore, this document proposes another embodiment in which information for a quantization parameter is signaled.

For example, the present embodiment proposes a common mode in which a chroma quantization parameter $Qp_c$ is derived and signaled.

Chroma quantization parameter data $Qp_c$_data( ) for a chroma quantization parameter proposed in the present embodiment may be signaled as in the following table

TABLE 35

| | Descriptor |
|---|---|
| $Qp_C$_data( ) { | |
|   qPi_min_idx | ue(v) |
|   qPi_delta_max_idx | ue(v) |
|   for ( i = qPi_min_idx; i <= qPiMaxIdx; i++ ) | |
|     $Qp_C$_qPi_delta_val[ i ] | ue(v) |
| } | |

For example, the syntax element qPi_min_idx may represent a minimum qPi index used in chroma quantization. A value of qPi_min_idx may be in a range of 0 to 63.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. A value of qPi_delta_max_idx may be in a range of 0 to 63. For example, a maximum index qPiMaxIdx used in $Qp_c$ derivation may be derived like Equation 4.

Furthermore, for example, the syntax element $Qp_{c\_}$qPi_delta_val[i] may represent the delta of a $Qp_c$ value for an i-th index.

For example, a parameter QpcIdx[qPi] may be derived as follows.

When qPi<qPi_min_idx, QpcIdx[qPi] may be set identically with qPi.
  When qPi=qPi_min_idx . . . qPiMaxIdx, QpcIdx[qPi] may be set as $Qp_C$_qPi_delta_val[qPi]+QpcIdx[qPi−1].
When qPi>qPiMaxIdx, QpcIdx[qPi] may be set as qPi−(qPiMaxIdx−QpcIdx[qPiMaxIdx]).
Thereafter, the $Qp_c$ may be set as the QpcIdx[qPi].

Furthermore, the present embodiment proposes a scheme for signaling a flag representing whether a default table is used for chroma quantization derivation or whether signaled information is used for chroma quantization derivation. The flag may be signaled through a high level syntax, such as a sequence parameter set (SPS), or a picture parameter set (PPS). The flag signaled through a high level syntax may be the same as the following table.

TABLE 36

| | Descriptor |
|---|---|
| high_level_parameter_set( ) { | |
| ... | |
|   Qpc_data_default_flag | u(1) |
|   if(!$Qp_C$_data_default_flag) | |
|     $Qp_C$_data( ) | |
| ... | |

For example, the syntax element $Qp_c$_data_default_flag may represent whether a user defined mode is used for the derivation of a quantization parameter. For example, $Qp_{c\_}$data_default_flag having a value of 0 may represent that a user defined mode is used for the derivation of a quantization parameter. That is, for example, $Qp_c$_data_default_flag having a value of 0 may represent chroma quantization parameter data $Qp_c$_data( ) is used. When the $Qp_c$_data_default_flag is 0, the chroma quantization parameter data $Qp_c$_data( ) may be signaled. Furthermore, for example, $Qp_{c\_}$data_default_flag having a value of 1 may represent that a default table is used for the derivation of a quantization parameter. The default table may be the same as Table 7. Furthermore, if $Qp_c\_data\_default\_flag$ is not present, the $Qp_c\_data\_default\_flag$ may be inferred as 1.

For example, in the present embodiment, if a process of deriving a quantization parameter is written in a standard format, the process may be represented as in FIG. 32 to FIG. 36.

FIG. 32 to FIG. 36 represent an example of derivation process for quantization parameters.

Referring to FIG. 32 to FIG. 36, when ChromaArrayType is 1 and $Qp_c\_data\_default\_flag$ indicates false (i.e., for example, when $Qp_c\_data\_default\_flag$ is 0), the parameters $qP_{Cb}$, $qP_{Cr}$ and $qP_{CbCr}$ may be derived based on signaled user defined information as proposed in the present embodiment. Furthermore, for example, when ChromaArrayType is 1 and $Qp_c\_data\_default\_flag$ indicates true (i.e., for example, when $Qp_c\_data\_default\_flag$ is 1), the parameters $qP_{Cb}$, $qP_{Cr}$ and $qP_{CbCr}$ may be derived by a default table based on the same indices qPi as $qPi_{Cb}$, $qPi_{Cr}$ and $qPi_{CbCr}$, respectively.

Furthermore, this document proposes another embodiment in which information for a quantization parameter is signaled.

For example, the present embodiment proposes a scheme for deriving a chroma quantization parameter $Qp_c$ table without an offset. The present embodiment may be proposed to be used along with an APS or to be used independently. For example, a syntax structure of APS integrated with chroma quantization data may be the same as the following table.

TABLE 38

| | Descriptor |
|---|---|
| $Qp_C\_data$ ( ) { | |
|    qPi_min_idx | ue(v) |
|    qPi_delta_max_idx | ue(v) |
|    for ( i = qPi_min_idx; i <= qPiMaxIdx; i++ ) | |
|       $Qp_C\_qPi\_delta\_val$[ i ] | ue(v) |
| } | |

For example, the syntax element qPi_min_idx may represent a minimum qPi index used in chroma quantization. A value of qPi_min_idx may be in a range of 0 to 63.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. A value of qPi_delta_max_idx may be in a range of 0 to 63. For example, a maximum index qPiMaxIdx used in $Qp_c$ derivation may be derived like Equation 4.

Furthermore, for example, the syntax element $Qp_C\_qPi\_delta\_val$[i] may represent a difference between $Qp_C$ values for an i-th index. The difference may also be called a delta.

For example, a parameter QpcIdx[qPi] may be derived as follows. In this case, the qPi may be 0 to 63.

When qPi<qPi_min_idx, QpcIdx[qPi] may be set identically with qPi.
  qPi=When qPi_min_idx . . . qPiMaxIdx, QpcIdx[qPi] may be set as $Qp_C\_qPi\_delta\_val$[qPi]+QpcIdx[qPi−1].
When qPi>qPiMaxIdx, QpcIdx[qPi] may be set as qPi−(qPiMaxIdx−QpcIdx[qPiMaxIdx]).
Thereafter, the $Qp_C$ may be set as the QpcIdx[qPi].

Furthermore, this document proposes another embodiment in which information for a quantization parameter is signaled.

For example, the present embodiment proposes, as an example, a scheme in which a delta (or a difference) between continuous $Qp_C$ values is limited to 1.

For example, the present embodiment proposes a scheme in which user defined chroma quantization ($Qp_C$) is additionally included in the existing image/video standard. For example, the flag of a sequence parameter set (SPS) proposed in the present embodiment may represent whether the existing default table is used for chroma quantization parameter derivation or whether the contents of a table is derived based on information signaled in an SPS. A scheme suitable for a coded image may be selected by accommodating user defined chroma quantization according to the present embodiment, and coding efficiency can be improved.

For example, the present embodiment proposes adding a function for signaling chroma quantization $Qp_C$ as a function of an index qPi by using syntax elements as in the following table.

TABLE 39

| | Descriptor |
|---|---|
| $Qp_C\_data$( ) { | |
|    qPi_min_idx | ue(v) |
|    qPi_delta_max_idx | ue(v) |
|    for ( i = qPi_min_idx; i <= qPiMaxIdx; i++ ) | |
|       $Qp_C\_qPi\_flag$[ i ] | u(1) |
| } | |

For example, the syntax element qPi_min_idx may represent a minimum qPi index used in chroma quantization. A value of qPi_min_idx may be in a range of 1 to 63.

Furthermore, for example, the syntax element qPi_delta_max_idx may represent a delta value between Qpi_min_idx and a maximum qPi index used in chroma $Qp_c$ derivation. A value of qPiMaxIdx may be greater than or equal to qPi_min_idx. A value of qPi_delta_max_idx may be in a range of 1 to 63. For example, a maximum index qPiMaxIdx used in $Qp_c$ derivation may be derived like Equation 4.

Furthermore, for example, the syntax element QpC_qPi_flag[i] may represent whether a $Qp_c$ value is increased by 1. That is, for example, the syntax element QpC_qPi_flag[i] may represent whether an i-th $Qp_c$ value has increased by 1 compared to an (i−1)-th $Qp_c$ value. For example, QpC_qPi_flag[i] having a value of 1 may represent a $Qp_C$ value is increased by 1. QpC_qPi_flag[i] having a value of 0 may represent that a $Qp_C$ value is not increased.

For example, a parameter QpcIdx[qPi] may be derived as follows. In this case, the qPi may be 0 to 63.
When qPi<qPi_min_idx, QpcIdx[qPi] may be set identically with qPi.
When qPi=qPi_min_idx . . . qPiMaxIdx, QpcIdx[qPi] may be set as $Qp_C\_qPi\_flag$[qPi]+QpcIdx[qPi−1].
When qPi>qPiMaxIdx, QpcIdx[qPi] may be set as qPi−(qPiMaxIdx−QpcIdx[qPiMaxIdx]).
Thereafter, the $Qp_C$ may be set as the QpcIdx[qPi].

Furthermore, the present embodiment proposes a scheme for signaling a flag representing whether a default table is used for chroma quantization derivation or whether signaled information is used for chroma quantization derivation. The flag may be signaled through a high level syntax, such as a sequence parameter set (SPS), or a picture parameter set (PPS). The flag signaled through a high level syntax may be the same as the following table.

TABLE 40

| | Descriptor |
|---|---|
| seq_parameter_set_rbsp( ) {  sps_decoding_parameter_set_id | u(4) |
| ... | |
| Qpc_data_default_flag  if(!Qp$_C$_data_default_flag)  Qp$_C$_data( ) | u(1) |
| ... | |

For example, the syntax element Qp$_c$_data_default_flag may represent whether a user defined mode is used for the derivation of a quantization parameter. For example, Qp$_c$_data_default_flag having a value of 0 may represent that a user defined mode is used for the derivation of a quantization parameter. That is, for example, Qp$_c$_data_default_flag having a value of 0 may represent that chroma quantization parameter data Qp$_c$_data( ) is used. When the Qp$_c$_data_default_flag is 0, the chroma quantization parameter data Qp$_c$_data( ) may be signaled. Furthermore, for example, Qp$_c$_data_default_flag having a value of 1 may represent that a default table is used for the derivation of a quantization parameter. The default table may be the same as Table 7. Furthermore, if Qp$_c$_data_default_flag is not present, the Qp$_c$_data_default_flag may be inferred as 1.

For example, in the present embodiment, if a process of deriving a quantization parameter is written in a standard format, the process may be represented as in FIG. 37 to FIG. 41.

FIG. 37 to FIG. 41 represent an example of derivation process for quantization parameters.

Referring to FIG. 37 to FIG. 41, when ChromaArrayType is 1 and Qp$_c$_data_default_flag indicates false (i.e., for example, when Qp$_c$_data_default_flag is 0), the parameters qP$_{Cb}$, qP$_{Cr}$ and qP$_{CbCr}$ may be derived based on signaled user defined information as proposed in the present embodiment. Furthermore, for example, when ChromaArrayType is 1 and Qp$_c$_data_default_flag indicates true (i.e., for example, when Qp$_c$_data_default_flag is 1), the parameters qP$_{Cb}$, qP$_{Cr}$ and qP$_{CbCr}$ may be derived by a default table based on the same indices qPi as qPi$_{Cb}$, qPi$_{Cr}$ and qPi$_{CbCr}$, respectively.

Further, the present disclosure proposes another embodiment for signalling information on a quantization parameter.

For example, the present embodiment proposes an example of a data signalling structure for chroma QP derivation. Specifically, the present embodiment proposes a scheme for adding chroma_qp_mapping_flag that is a new syntax element in the SPS. For example, if the chroma_qp_mapping_flag value is 0, a default chroma QP mapping table may be used to derive the chroma quantization parameter. Further, for example, if the chroma_qp_mapping_flag value is 1, syntax elements used to derive the chroma QP mapping table may be signaled as in the following table.

TABLE 42

| | Descriptor |
|---|---|
| seq_parameter_set_rbsp( ) {  sps_decoding_parameter_set_id | u(4) |
| ... | |
| Qpc_data_default_flag  if(!Qp$_C$_data_default_flag)  qPi_delta_max_idx_minus1 | u(1)  ue(v) |

TABLE 42-continued

| | Descriptor |
|---|---|
| qPi_min_idx_minus1  for ( i = 1; i <= qPi_delta_max_idx_minus1 + 1; i++ ) {  Qp$_C$_qPi_flag[ i ]  ...  } | ue(v)  ue(v) |

For example, the syntax element Qp$_C$_data_default_flag may represent whether a user-defined mode is used to derive the quantization parameter. For example, the Qp$_C$_data_default_flag of which the value is 0 may represent that the user-defined mode is used to derive the quantization parameter. That is, for example, the Qp$_C$_data_default_flag of which the value is 0 may represent that the chroma QP mapping table derived based on the chroma quantization parameter data illustrated in Table 42 as described above is used to derive the chroma quantization parameter. If the Qp$_C$_data_default_flag is 0, the chroma quantization parameter data illustrated in Table 42 as described above may be signaled. Further, for example, the Qp$_C$_data_default_flag of which the value is 1 may represent that a default table is used to derive the quantization parameter. The default table may be the same as that in Table 7 as described above. Further, if the Qp$_C$_data_default_flag is not present, the Qp$_c$_data_default_flag may be inferred as 1.

Further, for example, the value obtained by adding 1 to the syntax element qPi_delta_max_idx_minus1 may represent the number of points of which the mapping function is not increased.

Further, for example, the syntax element qPi_min_idx_minus1 may represent the first element of the set of points of which the mapping function is not increased.

Further, for example, the syntax element Qp$_c$_qPi_flag[i] may represent a delta value between the i-th element and the (i−1)-th element of the set of points of which the mapping function is not increased.

The chroma QP mapping table may be derived as follows based on the chroma quantization-parameter data illustrated in Table 42.

For example, the variable cQpFlatSize may be derived as in the following equation.

$$cQpFlatSize = \text{qPi\_delta\_max\_idx\_minus1} + 1 \qquad \text{[Equation 5]}$$

Further, for example, the variable cQpFlat[ ] may be derived as in the following table.

TABLE 43

| The variable cQpFlat[ ] is derived as follows:  cQpFlat[ 0 ] = qPi_min_idx_minus1 + 1;  for( i = 1; i < cQpFlatSize; i++ ) {  cQpFlat[ i ] = Qp$_C$_qPi_flag [ i ] + cQpFlat[ i − 1 ]  } |
|---|

Thereafter, based on the variable cQpFlatSize and the variable cQpFlat[ ], the chroma QP mapping table may be derived as in the following table.

TABLE 44

The chroma QP mapping table cqpMappingTable[ ] is derived as follows:
cqpMappingTable [ 0 ] = 0;
for( i = 1; i <= maxQP; i++ ) {
  incStep = 1
  for ( j = 0; j < cQpFlatSize; j++){
    if ( i = = cQpFlat[ j ] )
      incStep = 0
  }
  cqpMappingTable [ i ] = cqpMappingTable [ i − 1 ] + incStep;
}

Further, the present disclosure proposes another embodiment for signalling information on the quantization parameter.

For example, the present embodiment proposes a scheme for adding chroma_qp_mapping_flag that is a new syntax element in the SPS. For example, if the chroma_qp_mapping_flag value is 0, the default chroma QP mapping table may be used to derive the chroma quantization parameter. Further, for example, if the chroma_qp_mapping_flag value is 1, the syntax elements used to derive the chroma QP mapping table may be signaled as in the following table.

TABLE 45

| | Descriptor |
|---|---|
| seq_parameter_set_rbsp( ) { | |
|   sps_decoding_parameter_set_id | u(4) |
|   ... | |
|   Qpc_data_default_flag | u(1) |
|   if(!$Qp_C$_data_default_flag) | |
|     qPi_delta_max_idx_minus1 | ue(v) |
|     qPi_min_idx_minus1 | ue(v) |
|     for ( i = 1; i <= qPi_delta_max_idx_minus1 + 1; i++ ) { | |
|       $Qp_C$_qPi_idx_minus1[ i ] | ue(v) |
|   ... | |
| } | |

For example, the syntax element $Qp_C$_data_default_flag may represent whether the user-defined mode is used to derive the quantization parameter. For example, the $Qp_C$_data_default_flag of which the value is 0 may represent that the user-defined mode is used to derive the quantization parameter. That is, for example, the $Qp_C$_data_default_flag of which the value is 0 may represent that the chroma QP mapping table derived based on the chroma quantization parameter data illustrated in Table 42 as described above is used to derive the chroma quantization parameter. If the $Qp_C$_data_default_flag is not present, the $Qp_C$_data_default_flag may be inferred as 1.

Further, for example, the value obtained by adding 1 to the syntax element qPi_delta_max_idx_minus1 may represent the number of points of which the mapping function is not increased.

Further, for example, the value obtained by adding 1 to the syntax element qPi_min_idx_minus1 may represent the first element of the set of points of which the mapping table is not increased.

Further, for example, the value obtained by adding 1 to the syntax element $Qp_C$_qPi_idx_minus1[i] may represent a delta value between the i-th element and the (i−1)-th element of the set of points of which the mapping function is not increased.

The chroma QP mapping table may be derived as follows based on the chroma quantization parameter data illustrated in Table 45.

For example, the variable cQpFlatSize may be derived as in Equation 5 as described above.

Further, for example, the variable cQpFlat[ ] may be derived as in the following table.

TABLE 46

The variable cQpFlat[ ] is derived as follows:
cQpFlat[ 0 ] = qPi_min_idx_minus1 + 1;
for( i = 1; i < cQpFlatSize; i++ ) {
  cQpFlat[ i ] = $Qp_C$_qPi_idx_minus1[ i ] + 1 + cQpFlat[ i − 1 ]
}

Thereafter, based on the variable cQpFlatSize and the variable cQpFlat[ ], the chroma QP mapping table may be derived. For example, the chroma QP mapping table may be derived as in Table 44 as described above.

Further, the present disclosure proposes another embodiment for signalling information on the quantization parameter.

For example, the present embodiment proposes a scheme for signalling an individual table for each chroma component. That is, for example, the present embodiment proposes a scheme for signalling syntax elements used to derive the chroma QP mapping tables for respective chroma components.

For example, the chroma QP mapping tables for respective chroma components may be derived, and the syntax elements for respective chroma components may be signaled as in the following table.

TABLE 47

| | Descriptor |
|---|---|
| $Qp_C$_data( ) { | |
|   qp_luma_to_chroma_joint_map_flag | u(1) |
|   for( i = 0; i < ( qp_luma_to_chroma_joint_map_flag ? 1 : 3 ); i++ ) { | |
|     qPi_min_idx_minus1[i] | ue(v) |
|     qPi_delta_max_idx_minus1[i] | ue(v) |
|     for ( j= qPi_min_idx_minus1 + 1 ; j <= qPiMaxIdx; i++ ) | |
|       $Qp_C$_qPi_flag[ i ][ j ] | u(1) |
|   } | |
| } | |

For example, the syntax element qp_luma_to_chroma_joint_map_flag may represent whether a common luma-chroma quantization parameter mapping table is used for chroma components Cb, Cr, and CbCr. That is, for example, the syntax element qp_luma_to_chroma_joint_map_flag may represent whether one luma-chroma quantization parameter mapping table is applied to Cb residual, Cr residual, and CbCr residual. For example, if a value of the qp_luma_to_chroma_joint_map_flag is 1, the common luma-chroma quantization parameter mapping table may be used for the chroma components Cb, Cr, and CbCr, and if a value of the p_luma_to_chroma_joint_map_flag is 0, an individual luma-chroma quantization parameter mapping table may be used for each of the chroma components Cb, Cr, and CbCr.

Further, for example, the value obtained by adding 1 to the syntax element qPi_min_idx_minus1 may represent the minimum qPi index used for the chroma quantization. The qPi_min_idx_minus1 value may be in the range of 1 to 63.

Further, for example, the value obtained by adding 1 to the syntax element qPi_delta_max_idx_minus1 may represent a delta value between the Qpi_min_idx and the maximum qPi index used for the chroma $Qp_C$ derivation. The qPiMaxIdx value may be equal to or larger than the qPi_min_idx value. For example, the qPi_delta_max_idx_minus1 value may be in the range of 1 to 63. The maximum index qPiMaxIdx used for the $Qp_C$ derivation may be derived as in the following equation.

for($i = 0; i < 3; i++$)            [Equation 6]

{$qPiMaxIdx[i]$ = qPi_min_idx_minus1$[i]$ +

1 + qPi_delta_max_idx_minus1$[i]$ + 1

Further, for example, the syntax element $Qp_C$_qPi_flag[j] may represent whether the $Qp_C$ value is increased by 1. That is, for example, the syntax element QpC_qPi_flag[i][j] may represent whether the j-th $Qp_C$ value of the i-th chroma component is increased by 1 as compared to the (j−1)-th $Qp_C$ value. For example, the QpC_qPi_flag[j] equal to 1 may represent that the $Qp_C$ value is increased by 1, and the QpC_qPi_flag[j] equal to 0 may represent that the $Qp_C$ value is not increased.

For example, the variable QpcIdx[i][qPi] may be derived as follows. Here, the qPi may be maxQp in case of the value of 0.

In case of qPi<qPi_min_idx_minus1+1, the QpcIdx[qPi] may be configured to be the same as qPi.

In case of qPi=qPi_min_idx_minus1+1 ... qPiMaxIdx, the QpcIdx[qPi] may be configured as QpC_qPi_flag[qPi]+QpcIdx[qPi−1].

In case of qPi>qPiMaxIdx, the QpcIdx[qPi] may be configured as qPi−(qPiMaxIdx−QpcIdx[qPiMaxIdx]).

Thereafter, the $Qp_c$ value may be derived as the QpcIdx[i][qPi].

Meanwhile, according to the present embodiment, a flag representing whether the syntax elements used to derive the chroma QP mapping table in the SPS are signaled or the default table is used may be signaled. For example, the flag may be signaled as in the following table.

TABLE 48

| | Descriptor |
|---|---|
| seq_parameter_set_rbsp( ) { | |
|     sps_decoding_parameter_set_id | u(4) |
|     ... | |
|     Qpc_data_default_flag | u(1) |
|     if(!$Qp_C$_data_default_flag) | |
|         $Qp_C$_data( ) | |
|     ... | |

The syntax element $Qp_C$_data_default_flag may represent whether the user-defined mode is used to derive the quantization parameter. For example, the $Qp_C$_data_default_flag of which the value is 0 may represent that the user-defined mode is used to derive the quantization parameter. That is, for example, the $Qp_C$_data_default_flag of which the value is 0 may represent that the chroma QP mapping table derived based on the chroma quantization parameter data illustrated in Table 47 as described above is used to derive the chroma quantization parameter. If the $Qp_C$_data_default_flag is 0, the chroma quantization parameter data illustrated in Table 47 as described above may be signaled. Further, for example, the $Qp_C$_data_default_flag of which the value is 1 may represent that the default table is used to derive the quantization parameter. The default table may be the same as that in Table 7 as described above. Further, if the $Qp_C$_data_default_flag is not present, the $Qp_C$_data_default_flag may be inferred as 1.

For example, according to the present embodiment, through description in the standard format, the process of deriving the quantization parameter may be represented as in FIG. 42 to FIG. 46.

FIG. 42 to FIG. 46 represent an example of derivation process for quantization parameters.

Referring to FIG. 42 to FIG. 46 as described above, if ChromaArrayType is 1, and the $Qp_C$_data_default_flag represents FALSE (e.g., if the $Qp_C$_data_default_flag is 0), the variables $qP_{Cb}$, $qP_{Cr}$, and $qP_{CbCr}$ may be derived based on the user-defined information being signaled as proposed in the present embodiment. Further, for example, if the ChromaArrayType is 1, and the $Qp_C$_data_default_flag represents TRUE (e.g., if the $Qp_C$_data_default_flag is 1), the variables $qP_{Cb}$, $qP_{Cr}$, and $qP_{CbCr}$ may be derived by the default table based on the same index qPi as the $qPi_{Cb}$, $qPi_{Cr}$, and $qPi_{CbCr}$, respectively.

Further, the present disclosure proposes another embodiment for signalling information on the quantization parameter. The present embodiment proposes a scheme for signalling a maximum difference between a starting point and an end point by signalling the end point as the delta for the maximum QP. That is, for example, according to the present embodiment, the syntax element representing the delta value between the maxQp used to derive the chroma $Qp_C$ and the maximum qPi index may be signaled.

The chroma quantization parameter data $Qp_C$_data( ) for the chroma quantization parameter proposed in the present embodiment may be signaled as in the following table.

TABLE 50

| | Descriptor |
|---|---|
| $Qp_C$_data( ) { | |
|     qPi_min_idx | ue(v) |
|     qPi_delta_max_idx | ue(v) |
|     for ( i = qPi_min_idx, i <= qPiMaxIdx; i++ ) | |
|         $Qp_C$_qPi_flag[ i ] | u(1) |
| } | |

For example, the syntax element qPi_min_idx may represent the minimum qPi index used for the chroma quantization. The qPi_min_idx value may be in the range of 0 to 63.

Further, for example, the syntax element qPi_delta_max_idx may represent the delta value between the maxQp and the maximum qPi index used to derive the chroma $Qp_C$. The qPiMaxIdx value may be equal to or larger than the qPi_min_idx value. The qPi_delta_max_idx value may be in the range of 1 to 63. For example, the maximum index qPiMaxIdx used to derive the $Qp_C$ may be derived as in the following equation.

$$qPiMaxIdx = maxQp - qPi\_delta\_max\_idx \quad \text{[Equation 7]}$$

Further, for example, the syntax element $Qp_C\_qPi\_flag[i]$ may represent whether the $Qp_C$ value is increased by 1. That is, for example, the syntax element QpC_qPi_flag[i] may represent whether the i-th $Qp_C$ value is increased by 1 as compared with the (i−1)-th $Qp_C$ value. For example, the QpC_qPi_flag[i] of which the value is 1 may represent that the $Qp_C$ value is increased by 1, and the QpC_qPi_flag[i] of which the value is 0 may represent that the $Qp_C$ value is not increased.

For example, the variable QpcIdx[qPi] may be derived as follows. Here, the qPi may be 0 to 63.
- In case of qPi<qPi_min_idx, the QpcIdx[qPi] may be configured the same as qPi.
- In case of qPi=qPi_min_idx . . . qPiMaxIdx, the QpcIdx[qPi] may be configured as QpC_qPi_flag[qPi]+QpcIdx[qPi−1].
- In case of qPi>qPiMaxIdx, the QpcIdx[qPi] may be configured as qPi−(qPiMaxIdx QpcIdx[qPiMaxIdx]).

Thereafter, the $Qp_c$ may be configured as the QpcIdx[qPi].

Further, the present embodiment proposes a scheme for signaling a flag representing whether the default table is used to derive the chroma quantization, or the information signaled to derive the chroma quantization is used. The flag may be signaled through a high level syntax, such as a sequence parameter set (SPS) or a picture parameter set (PPS). The flag being signaled through the high level syntax may be as in the following table.

TABLE 51

| | Descriptor |
|---|---|
| seq_parameter_set_rbsp( ) { | |
|     sps_decoding_parameter_set_id | u(4) |
|     ... | |
|     Qpc_data_default_flag | u(1) |
|     if(!$Qp_C$_data_default_flag) | |
|         $Qp_C$_data( ) | |
|     ... | |

For example, the syntax element $Qp_C$_data_default_flag may represent whether the user-defined mode is used to derive the quantization parameter. For example, the $Qp_C$_data_default_flag of which the value is 0 may represent that the user-defined mode is used to derive the quantization parameter. That is, for example, the $Qp_C$_data_default_flag of which the value is 0 may represent that the chroma quantization parameter data $Qp_C$_data( ) is used. If the $Qp_C$_data_default_flag is 0, the chroma quantization parameter data $Qp_C$_data( ) may be signaled. Further, for example, the $Qp_C$_data_default_flag of which the value is 1 may represent that the default table is used to derive the quantization parameter. The default table may be as in Table 7 as described above. Further, if the $Qp_C$_data_default_flag is not present, the $Qp_C$_data_default_flag may be inferred as 1.

For example, according to the present embodiment, through description in the standard format, the process of deriving the quantization parameter may be represented as in FIG. 47 to FIG. 51.

FIG. 47 to FIG. 51 represent an example of derivation process for quantization parameters.

Referring to FIG. 47 to FIG. 51 as described above, if the ChromaArrayType is 1, and the $Qp_C$_data_default_flag represents FALSE (e.g., if the $Qp_C$_data_default_flag is 0), the variables $qP_{Cb}$, $qP_{Cr}$, and $qP_{CbCr}$ may be derived based on the user-defined information being signaled as proposed in the present embodiment. Further, for example, if the ChromaArrayType is 1, and the $Qp_C$_data_default_flag represents TRUE (e.g., if the $Qp_C$_data_default_flag is 1), the variables $qP_{Cb}$, $qP_{Cr}$, and $qP_{CbCr}$ may be derived by the default table based on the same index qPi as the $qPi_{Cb}$, $qPi_{Cr}$, and $qPi_{CbCr}$, respectively.

Further, the present disclosure proposes another embodiment for signalling information on the quantization parameter. The present embodiment proposes a scheme for signalling the maximum difference between the starting point and the end point by signalling the end point as the delta for the maximum QP or as a difference between the starting point and the value obtained by adding the delta to the starting point.

The chroma quantization parameter data $Qp_C$_data( ) for the chroma quantization parameter proposed in the present embodiment may be signaled as in the following table.

TABLE 53

| | Descriptor |
|---|---|
| $Qp_C$_data( ) { | |
|     qPi_min_idx_minus1 | ue(v) |
|     is_delta_maxQp | u(1) |
|     qPi_delta_max_idx_minu1 | ue(v) |
|     for ( i = qPi_min_idx_minus1 +1; i <= qPiMaxIdx; i++ ) | |
|         $Qp_C$_qPi_flag[ i ] | u(1) |
| } | |

For example, the value obtained by adding 1 to the syntax element qPi_min_idx_minus1 may represent the minimum qPi index used for the chroma quantization. The qPi_min_idx value may be in the range of 1 to maxQp.

Further, for example, the syntax element is_delta_maxQp may represent whether the maximum index qPiMaxIdx is derived from the maxQp value. For example, the is_delta_maxQp of which the value is 1 may represent that the qPiMaxIdx is derived from the maxQp value. Further, for example, the is_delta_maxQp of which the value is 0 may represent that the qPiMaxIdx is derived from the syntax element qPi_min_idx_minus1.

Further, for example, the value obtained by adding 1 to the syntax element qPi_delta_max_idx_minus1 may represent the delta value between the maxQp and the maximum qPi index used to derive the chroma $Qp_c$. The qPiMaxIdx value may be equal to or larger than the qPi_min_idx. For example, the qPi_delta_max_idx_minus1 value may be in the range of 1 to 63. The maximum index qPiMaxIdx used for the $Qp_c$ derivation may be derived as in the following table.

TABLE 54 index qPiMaxIdx used in $Qp_C$ derivation is derived as follows:
if(is_delta_maxQp){
    qPiMaxIdx = maxQp − qPi_delta_max_idx
} else {
    qPiMaxIdx = qPi_min_idx + qPi_delta_max_idx
}

Further, for example, the syntax element $Qp_C\_qPi\_flag[i]$ may represent whether the $Qp_C$ value is increased by 1. That is, for example, the syntax element QpC_qPi_flag[i] may represent whether the i-th $Qp_C$ value is increased by 1 as compared with the (i−1)-th $Qp_C$ value. For example, the QpC_qPi_flag[i] of which the value is 1 may represent that the $Qp_C$ value is increased by 1, and the QpC_qPi_flag[i] of which the value is 0 may represent that the $Qp_C$ value is not increased.

For example, the variable QpcIdx[qPi] may be derived as follows. Here, the qPi may be 0 to maxQp.

In case of qPi<qPi_min_idx_minus1+1, the QpcIdx[qPi] may be configured the same as the qPi.

In case of qPi=qPi_min_idx_minus1 . . . qPiMaxIdx, the QpcIdx[qPi] may be configured as $Qp_C\_qPi\_flag[qPi]$+QpcIdx[qPi−1].

In case of qPi>qPiMaxIdx, the QpcIdx[qPi] may be configured as qPi−(qPiMaxIdx QpcIdx[qPiMaxIdx]).

Thereafter, the $Qp_C$ may be configured as the QpcIdx [qPi].

Further, the present embodiment proposes a scheme for signaling a flag representing whether the default table is used to derive the chroma quantization, or information being signaled to derive the chroma quantization is used. The flag may be signaled through a high level syntax, such as a sequence parameter set (SPS) or a picture parameter set (PPS). The flag being signaled through the high level syntax may be as in the following table.

TABLE 55

|  | Descriptor |
| --- | --- |
| seq_parameter_set_rbsp( ) { |  |
|    sps_decoding_parameter_set_id | u(4) |
|    ... |  |
|    Qpc_data_default_flag | u(1) |
|    if(!$Qp_C$_data_default_flag) |  |
|       $Qp_C$_data( ) |  |
|    ... |  |

For example, the syntax element $Qp_C\_data\_default\_flag$ may represent whether the user-defined mode is used to derive the quantization parameter. For example, the $Qp_C\_data\_default\_flag$ of which the value is 0 may represent that the user-defined mode is used to derive the quantization parameter. That is, for example, the $Qp_C\_data\_default\_flag$ of which the value is 0 may represent that the chroma quantization parameter data $Qp_C\_data()$ is used. If the $Qp_C\_data\_default\_flag$ is 0, the chroma quantization parameter data $Qp_C\_data()$ may be signaled. Further, for example, the $Qp_C\_data\_default\_flag$ of which the value is 1 may represent that the default table is used to derive the quantization parameter. The default table may be as in Table 7 as described above. Further, if the $Qp_C\_data\_default\_flag$ is not present, the $Qp_C\_data\_default\_flag$ may be inferred as 1.

For example, according to the present embodiment, through description in the standard format, the process of deriving the quantization parameter may be represented as in FIG. 52 to FIG. 56.

FIG. 52 to FIG. 56 represent an example of derivation process for quantization parameters.

Referring to FIG. 52 to FIG. 56 as described above, if the ChromaArrayType is 1, and the $Qp_C\_data\_default\_flag$ represents FALSE (e.g., if the $Qp_C\_data\_default\_flag$ is 0), the variables $qP_{Cb}$, $qP_{Cr}$, and $qP_{CbCr}$ may be derived based on the user-defined information being signaled as proposed in the present embodiment. Further, for example, if the ChromaArrayType is 1, and the $Qp_C\_data\_default\_flag$ represents TRUE (e.g., if the $Qp_C\_data\_default\_flag$ is 1), the variables $qP_{Cb}$, $qP_{Cr}$, and $qP_{CbCr}$ may be derived by the default table based on the same index qPi as the $qPi_{Cb}$, $qPi_{Cr}$, and $qPi_{CbCr}$, respectively.

Further, the present disclosure proposes another embodiment for signalling information on the quantization parameter. The present embodiment proposes a scheme for signalling the maximum difference between the starting point and the end point by signalling the end point as the delta for the maximum QP or as the difference between the starting point and the value obtained by adding the delta to the starting point.

The chroma quantization parameter data $Qp_C\_data()$ for the chroma quantization parameter proposed in the present embodiment may be signaled as in the following table.

TABLE 57

|  | Descriptor |
| --- | --- |
| $Qp_C$_data( ) { |  |
|    qPi_min_idx_minus1 | ue(v) |
|    is_delta_maxQp | u(1) |
|    qPi_delta_max_idx_minus1 | ue(v) |
|    for ( i = qPi_min_idx_minus1 +1; i <= qPiMaxIdx; i++ ) |  |
|       $Qp_C$_qPi_flag[ i ] | u(1) |
| } |  |

For example, the value obtained by adding 1 to the syntax element qPi_min_idx_minus1 may represent the minimum qPi index used for the chroma quantization. The qPi_min_idx value may be in the range of 1 to maxQp.

Further, for example, the syntax element is_delta_maxQp may represent whether the maximum index qPiMaxIdx is derived from the maxQp value. For example, the is_delta_maxQp of which the value is 1 may represent that the qPiMaxIdx is derived from the maxQp value. Further, for example, the is_delta_maxQp of which the value is 0 may represent that the qPiMaxIdx is derived from the syntax element qPi_min_idx_minus1.

Further, for example, the value obtained by adding 1 to the syntax element qPi_delta_max_idx_minus1 may represent the delta value between the maxQp and the maximum qPi index used to derive the chroma $Qp_C$. The qPiMaxIdx value may be equal to or larger than the qPi_min_idx. For example, the qPi_delta_max_idx_minus1 value may be in the range of 1 to 63. The maximum index qPiMaxIdx used to derive the $Qp_C$ may be derived as in Table 54 as described above.

Further, for example, the syntax element $Qp_C\_qPi\_flag[i]$ may represent whether the $Qp_C$ value is increased by 1. That is, for example, the syntax element QpC_qPi_flag[i] may represent whether the i-th $Qp_C$ value is increased by 1 as compared with the (i−1)-th $Qp_C$ value. For example, the QpC_qPi_flag[i] of which the value is 1 may represent that the $Qp_C$ value is increased by 1, and the QpC_qPi_flag[i] of which the value is 0 may represent that the $Qp_C$ value is not increased.

For example, the variable QpcIdx[qPi] may be derived as follows. Here, the qPi may be 0 to maxQp.

In case of qPi<qPi_min_idx_minus1+1, the QpcIdx[qPi] may be configured the same as the qPi.

In case of qPi=qPi_min_idx_minus1 . . . qPiMaxIdx, the QpcIdx[qPi] may be configured as $Qp_C\_qPi\_flag[qPi]$+QpcIdx[qPi−1].

In case of qPi>qPiMaxIdx, the QpcIdx[qPi] may be configured as qPi−(qPiMaxIdx QpcIdx[qPiMaxIdx]).

Thereafter, the $Qp_C$ may be configured as the QpcIdx [qPi].

Further, the present embodiment proposes a scheme for signaling a flag representing whether the default table is used to derive the chroma quantization, or information being signaled to derive the chroma quantization is used. The flag may be signaled through a high level syntax, such as a sequence parameter set (SPS) or a picture parameter set (PPS). The flag being signaled through the high level syntax may be the same as that in the following table.

TABLE 58

| | Descriptor |
|---|---|
| seq_parameter_set_rbsp( ) { | |
|     sps_decoding_parameter_set_id | u(4) |
|     ... | |
|     Qpc_data_default_flag | u(1) |
|     if(!$Qp_C$_data_default_flag) | |
|         $Qp_C$_data( ) | |
|     ... | |

For example, the syntax element $Qp_C$_data_default_flag may represent whether the user-defined mode is used to derive the quantization parameter. For example, the $Qp_C$_data_default_flag of which the value is 0 may represent that the user-defined mode is used to derive the quantization parameter. That is, for example, the $Qp_C$_data_default_flag of which the value is 0 may represent that the chroma quantization parameter data $Qp_C$_data( ) is used. If the $Qp_C$_data_default_flag is 0, the chroma quantization parameter data $Qp_C$_data( ) may be signaled. Further, for example, the $Qp_C$_data_default_flag of which the value is 1 may represent that the default table is used to derive the quantization parameter. The default table may be as in Table 7 as described above. Further, if the $Qp_C$_data_default_flag is not present, the $Qp_C$_data_default_flag may be considered as 1.

For example, according to the present embodiment, through description in the standard format, the process of deriving the quantization parameter may be represented as in FIG. 57 to FIG. 61.

FIG. 57 to FIG. 61 represent an example of derivation process for quantization parameters.

Referring to FIG. 57 to FIG. 61 as described above, if the ChromaArrayType is 1, and the $Qp_C$_data_default_flag represents FALSE (e.g., if the $Qp_C$_data_default_flag is 0), the variables $qP_{Cb}$, $qP_{Cr}$, and $qP_{CbCr}$ may be derived based on the user-defined information being signaled as proposed in the present embodiment. Further, for example, if the ChromaArrayType is 1, and the $Qp_C$_data_default_flag represents TRUE (e.g., if the $Qp_C$_data_default_flag is 1), the variables $qP_{Cb}$, $qP_{Cr}$, and $qP_{CbCr}$ may be derived by the default table based on the same index qPi as the $qPi_{Cb}$, $qPi_{Cr}$, and $qPi_{CbCr}$, respectively.

Further, the present disclosure proposes another embodiment for signalling information on the quantization parameter. The present embodiment proposes a scheme for signalling an index for the chroma QP mapping table by using a minus1 nomenclature instead of the real value.

The chroma quantization parameter data $Qp_C$_data( ) for the chroma quantization parameter proposed in the present embodiment may be signaled as in the following table.

TABLE 60

| | Descriptor |
|---|---|
| $Qp_C$_data( ) { | |
|     qPi_min_idx_minus1 | ue(v) |
|     qPi_delta_max_idx_minus1 | ue(v) |
|     for ( i = qPi_min_idx_minus1; i <= qPiMaxIdx; i++ ) | |
|         $Qp_C$_qPi_flag[ i ] | u(1) |
| } | |

For example, the value obtained by adding 1 to the syntax element qPi_min_idx_minus1 may represent the minimum qPi index used for the chroma quantization. The qPi_min_idx value may be in the range of 1 to 63.

Further, for example, the value obtained by adding 1 to the syntax element qPi_delta_max_idx_minus1 may represent the delta value between the qPi_min_idx and the maximum qPi index used to derive the chroma $Qp_C$. The qPiMaxIdx value may be equal to or larger than the qPi_min_idx. The qPi_delta_max_idx value may be in the range of 1 to 63. For example, the maximum index qPiMaxIdx used to derive the $Qp_C$ may be derived as in the following equation.

$$qPi\text{MaxI}dx = \text{qPi\_min\_idx\_minus1} + 1 + \text{qPi\_delta\_max\_idx\_minus1} + 1 \quad \text{[Equation 8]}$$

Further, for example, the syntax element $Qp_C$_qPi_flag[i] may represent whether the $Qp_C$ value is increased by 1. That is, for example, the syntax element QpC_qPi_flag[i] may represent whether the i-th $Qp_C$ value is increased by 1 as compared with the (i−1)-th $Qp_C$ value. For example, the QpC_qPi_flag[i] of which the value is 1 may represent that the $Qp_C$ value is increased by 1, and the QpC_qPi_flag[i] of which the value is 0 may represent that the $Qp_C$ value is not increased.

For example, the variable QpcIdx[qPi] may be derived as follows. Here, the qPi may be 0 to 63.

In case of qPi<qPi_min_idx_minus1+1, QpcIdx[qPi] may be configured the same as the qPi.

In case of qPi=qPi_min_idx_minus1+1 . . . qPiMaxIdx, the QpcIdx[qPi] may be configured as $Qp_C$_qPi_flag [qPi]+QpcIdx[qPi−1].

In case of qPi>qPiMaxIdx, the QpcIdx[qPi] may be configured as qPi−(qPiMaxIdx−QpcIdx[qPiMaxIdx]).

Thereafter, the $Qp_C$ may be configured as the QpcIdx [qPi].

Further, the present embodiment proposes a scheme for signaling a flag representing whether the default table is used to derive the chroma quantization, or information being signaled to derive the chroma quantization is used. The flag may be signaled through a high level syntax, such as a sequence parameter set (SPS) or a picture parameter set (PPS). The flag being signaled through the high level syntax may be the same as that in the following table.

TABLE 61

| | Descriptor |
|---|---|
| seq_parameter_set_rbsp( ) { | |
|     sps_decoding_parameter_set_id | u(4) |
|     ... | |
|     Qpc_data_default_flag | u(1) |
|     if(!$Qp_C$_data_default_flag) | |
|         $Qp_C$_data( ) | |
|     ... | |

For example, the syntax element $Qp_C\_data\_default\_flag$ may represent whether the user-defined mode is used to derive the quantization parameter. For example, the $Qp_C\_data\_default\_flag$ of which the value is 0 may represent that the user-defined mode is used to derive the quantization parameter. That is, for example, the $Qp_C\_data\_default\_flag$ of which the value is 0 may represent that the chroma quantization parameter data $Qp_C\_data(\ )$ is used. If the $Qp_C\_data\_default\_flag$ is 0, the chroma quantization parameter data $Qp_C\_data(\ )$ may be signaled. Further, for example, the $Qp_C\_data\_default\_flag$ of which the value is 1 may represent that the default table is used to derive the quantization parameter. The default table may be as in Table 7 as described above. Further, if the $Qp_C\_data\_default\_flag$ is not present, the $Qp_C\_data\_default\_flag$ may be considered as 1.

For example, according to the present embodiment, through description in the standard format, the process of deriving the quantization parameter may be represented as in FIG. 62 to FIG. 66.

FIG. 62 to FIG. 66 represent an example of derivation process for quantization parameters.

Referring to FIG. 62 to FIG. 66 as described above, if the ChromaArrayType is 1, and the $Qp_C\_data\_default\_flag$ represents FALSE (e.g., if the $Qp_C\_data\_default\_flag$ is 0), the variables $qP_{Cb}$, $qP_{Cr}$, and $qP_{CbCr}$ may be derived based on the user-defined information being signaled as proposed in the present embodiment. Further, for example, if the ChromaArrayType is 1, and the $Qp_C\_data\_default\_flag$ represents TRUE (e.g., if the $Qp_C\_data\_default\_flag$ is 1), the variables $qP_{Cb}$, $qP_{Cr}$, and $qP_{CbCr}$ may be derived by the default table based on the same index qPi as the $qPi_{Cb}$, $qPi_{Cr}$, and $qPi_{CbCr}$, respectively.

Further, the present disclosure proposes another embodiment for signalling information on the quantization parameter. The present embodiment proposes a scheme in which an individual chroma quantization table is used for each of the chroma components.

The chroma quantization parameter data for the chroma quantization parameter proposed in the present embodiment may be signaled as in the following table.

TABLE 63

| | Descriptor |
|---|---|
| seq_parameter_set_rbsp( ) { | |
|   sps_decoding_parameter_set_id | u(4) |
|   ...... | |
|   Qpc_data_default_flag | u(1) |
|   if(!Qp_C_data_default_flag) { | |
|     sps_separate_qpc_table_flag | u(1) |
|     qPi_cb_min_idx_minus1 | u(7) |
|     qPi_cb_delta_max_idx_minus1 | u(7) |
|     for( i = qPi_cb_min_idx_minus1+1; i <= qPiMaxIdxCb; i++ ) | |
|       Qp_C_cb_qPi_flag[ i ] | u(1) |
|     if( sps_separate_qpc_table_flag ) { | |
|     qPi_cb_min_idx_minus1 | u(7) |
|     qPi_cb_delta_max_idx_minus1 | u(7) |
|     for(i = qPi_cr_min_idx_minus1+1; i <= qPiMaxIdxCr; i++ ) | |
|       Qp_C_cr_qPi_flag[ i ] | u(1) |
|     } | |
|   } | |
|   ...... | |
| } | |

For example, the syntax element $Qp_C\_data\_default\_flag$ may represent whether a default chroma quantization parameter table is used. For example, the $Qp_C\_data\_default\_flag$ of which the value is 1 may represent that the default chroma quantization parameter table is used to derive the chroma quantization parameter. The default table may be as in Table 7 as described above. Further, for example, the $Qp_C\_data\_default\_flag$ of which the value is 0 may represent that the default chroma quantization parameter table is not used to derive the chroma quantization parameter. That is, for example, the $Qp_C\_data\_default\_flag$ of which the value is 0 may represent that the chroma quantization parameter table derived based on the chroma quantization parameter data being signaled to derive the chroma quantization parameter is used.

Further, for example, the syntax element sps_separate_qpc_table_flag may represent whether two individual $Qp_C$ tables are used for a Cb sample and a Cr sample. That is, for example, the syntax element sps_separate_qpc_table_flag may represent whether individual luma-chroma quantization parameter mapping tables are used for a Cb residual and a Cr residual, respectively. For example, the sps_separate_qpc_table_flag of which the value is 1 may represent that the individual $Qp_C$ tables are used for the Cb sample and the Cr sample, respectively, and the sps_separate_qpc_table_flag of which the value is 0 may represent that one $Qp_C$ table is used for the Cb sample and the Cr sample.

Meanwhile, for example, the variable $Qp_{Cb}[i]$ may represent a $Qp_C$ table used for the Cb sample. Further, for example, the variable $Qp_{Cr}[i]$ may represent the $Qp_C$ table used for the Cr sample. Further, for example, if the sps_separate_qpc_table_flag value is 0, the $Qp_{Cr}[i]$ may be the same as the $Qp_{Cb}[i]$. Here, i may be 0 to 69.

Further, for example, the value obtained by adding 1 to the syntax element qPi_cb_min_idx_minus1 may represent the minimum qPi index used for the Cb chroma component. The qPi_cb_min_idx_minus1 value may be in the range of 1 to 69.

Further, for example, the value obtained by adding 1 to the syntax element qPi_cb_delta_max_idx_minus1 may represent the delta value between the qPi_cb_min_idx_minus1 and the maximum qPi_cb_delta_max_idx_minus1 used to derive the Cb chroma $Qp_C$. The qPiMaxIdx value may be equal to or larger than the qPi_min_idx. The qPi_cb_delta_max_idx_minus1 value may be in the range of 1 to 69. For example, the maximum index qPiMaxIdxcb used to derive the $Qp_C$ for the Cb component may be derived as in the following equation.

$$qPiMaxIdxCb = \text{qPi\_cb\_min\_idx\_minus1} + 1 + \text{qPi\_cb\_delta\_max\_idx\_minus1} + 1 \quad [\text{Equation 9}]$$

Further, for example, the syntax element $Qp_C\_cb\_qPi\_flag[i]$ may represent the delta value between the i-th $Qp_C$ value $Qp_{Cb}[i]$ for the Cb component and the (i−1)-th $Qp_C$ value $Qp_{Cb}[i-1]$. The $Qp_C\_cb\_qPi\_flag[i]$ value may be in the range of 0 to 1.

For example, the variable $Qp_{Cb}[i]$ may be derived as follows. Here, i may be 0 to 69.

In case of i=0 . . . qPiMaxIdxCb, the $Qp_{Cb}[i]$ may be configured the same as i.

In case of i=qPi_cb_min_idx_minus1+1+1 . . . qPiMaxIdxCb, the $Qp_{Cb}[i]$ may be configured as $Qp_{Cb}[i-1]+Qp_C\_cb\_qPi\_flag[i]$.

In case of i=qPiMaxIdxCb+1 . . . 69, the $Qp_{Cb}[i]$ may be configured as i−deltaEnd, and the deltaEnd may be derived as qPiMaxIdxCb−$Qp_{Cb}$[qPiMaxIdxCb].

Further, for example, qPi_cr_min_idx_minus1, qPi-MaxIdxCr, and $Qp_C$_cr_qPi_flag[i], which are the syntax elements for the Cr component, may have the same meaning as that of the syntax elements for the Cb component.

Further, the present disclosure proposes another embodiment for signalling information on the quantization parameter. For example, the present embodiment proposes a scheme for signalling parameters for a plurality of chroma QP tables. Further, the present embodiment may be connected to at least one of the embodiments as described above. That is, for example, the embodiments of the present disclosure may be commonly applied.

Specifically, for example, the present embodiment proposes to include a user-defined chroma quantization parameter ($Qp_C$) in a VVC specification text. For example, according to the present embodiment, the flag of the sequence parameter set (SPS) may represent whether the default table is used to derive the chroma quantization parameter or the chroma QP mapping table is derived based on the signaled information in the SPS. Through this, the user-defined chroma quantization parameter may be used in consideration of the content characteristics of an image in the image coding, and the coding efficiency may be improved. Further, the present embodiment may provide flexibility through an option in which one user-defined table is used for the chroma components and an option in which separate user-defined tables are used for the Cb component and the Cr component.

For example, the chroma quantization parameter data $Qp_C$_data( ) for the chroma quantization parameter proposed in the present embodiment may be signaled as in the following table.

TABLE 64

| | Descriptor |
|---|---|
| $Qp_C$_data( ) { | |
|   qPi_min_idx_minus1 | ue(v) |
|   qPi_delta_max_idx | ue(v) |
|   for ( i = qPi_min_idx; i <= qPiMaxIdx; i++ ) | |
|     $Qp_C$_qPi_flag[ i ] | u(1) |
| } | |

For example, the value obtained by adding 1 to the syntax element qPi_min_idx_minus1 may represent the minimum qPi index used for the chroma quantization. The qPi_min_idx value may be in the range of 1 to 69.

Further, for example, the syntax element qPi_delta_max_idx may represent the delta value between the qPi_min_idx and the maximum qPi index used to derive the chroma $Qp_C$. The qPiMaxIdx value may be equal to or larger than the qPi_min_idx. The qPi_delta_max_idx value may be in the range of 0 to 69. For example, the maximum index qPiMaxIdx used to derive the $Qp_C$ may be derived as in Equation 4 as described above.

Further, for example, the syntax element $Qp_C$_qPi_flag[i] may represent whether the $Qp_C$ value is increased by 1. That is, for example, the syntax element QpC_qPi_flag[i] may represent whether the i-th $Qp_C$ value is increased by 1 as compared with the (i−1)-th $Qp_C$ value. For example, the QpC_qPi_flag[i] of which the value is 1 may represent that the $Qp_C$ value is increased by 1, and the QpC_qPi_flag[i] of which the value is 0 may represent that the $Qp_C$ value is not increased.

For example, the variable QpcIdx[qPi] may be derived as follows. Here, the qPi may be 0 to 69.

In case of qPi<qPi_min_idx, the QpcIdx[qPi] may be configured the same as the qPi.

In case of qPi=qPi_min_idx . . . qPiMaxIdx, the QpcIdx[qPi] may be configured as $Qp_C$_qPi_flag[qPi]+QpcIdx[qPi−1].

In case of qPi>qPiMaxIdx, the QpcIdx[qPi] may be configured as qPi−(qPiMaxIdx QpcIdx[qPiMaxIdx]).

Thereafter, the $Qp_C$ may be configured as the QpcIdx [qPi].

Further, the present embodiment proposes a scheme for signaling a flag representing whether the default table is used to derive the chroma quantization or the chroma QP mapping table derived based on the signaled information is used. The flag may be signaled through a high level syntax, such as a sequence parameter set (SPS) or a picture parameter set (PPS). The flag being signaled through the high level syntax may be as in the following table.

TABLE 65

| | Descriptor |
|---|---|
| seq_parameter_set_rbsp( ) { | |
|   sps_decoding_parameter_set_id | u(4) |
|   ... | |
|   Qpc_data_default_flag | u(1) |
|   if(!$Qp_C$_data_default_flag) | |
|     $Qp_C$_data( ) | |
|   ... | |

For example, the syntax element $Qp_C$_data_default_flag may represent whether the user-defined mode is used to derive the quantization parameter. For example, the $Qp_C$_data_default_flag of which the value is 0 may represent that the user-defined mode is used to derive the quantization parameter. That is, for example, the $Qp_C$_data_default_flag of which the value is 0 may represent that the chroma quantization parameter data $Qp_C$_data( ) is used. If the $Qp_C$_data_default_flag is 0, the chroma quantization parameter data $Qp_C$_data( ) may be signaled. Further, for example, the $Qp_C$_data_default_flag of which the value is 1 may represent that the default table is used to derive the quantization parameter. The default table may be as in Table 7 as described above. Further, if the $Qp_C$_data_default_flag is not present, the $Qp_C$_data_default_flag may be inferred as 1.

For example, according to the present embodiment, through description in the standard format, the process of deriving the quantization parameter may be represented as in FIG. 67 to FIG. 71.

FIG. 67 to FIG. 71 represent an example of derivation process for quantization parameters.

Referring to FIG. 67 to FIG. 71 as described above, if the ChromaArrayType is 1, and the $Qp_C$_data_default_flag represents FALSE (e.g., if the $Qp_C$_data_default_flag is 0), the variables $qP_{Cb}$, $qP_{Cr}$, and $qP_{CbCr}$ may be derived based on the user-defined information being signaled as proposed in the present embodiment. Further, for example, if the ChromaArrayType is 1, and the $Qp_C$_data_default_flag represents TRUE (e.g., if the $Qp_C$_data_default_flag is 1), the variables $qP_{Cb}$, $qP_{Cr}$, and $qP_{CbCr}$ may be derived by the default table based on the same index qPi as the $qPi_{Cb}$, $qPi_{Cr}$, and $qPi_{CbCr}$, respectively.

Further, for example, the chroma quantization parameter data $Qp_C$_data( ) in case of using separate user-defined tables for the respective chroma components proposed in the present embodiment may be signaled as in the following table.

TABLE 67

| | Descriptor |
|---|---|
| Qp$_C$_data( ) { | |
|   is_separate_chroma_table | u(1) |
|   for ( i = 0; i <is_separate_chroma_table ? 2 : 1; i++){ | |
|     qPi_min_idx_minus1[ i ] | ue(v) |
|     qPi_delta_max_idx [ i ] | ue(v) |
|     for ( j = qPi_min_idx[i]; j <= qPiMaxIdx[i]; j++ ) | |
|       QP$_C$_qPi_flag[ i ][ j ] | u(1) |
|   } | |
| } | |

For example, the syntax element is separate_chroma_table may represent whether separate chroma quantization table-related parameters are signaled for the Cb component and the Cr component. That is, for example, the syntax element is_separate_chroma_table may represent whether two separate chroma quantization parameter mapping tables are used for the Cb component and the Cr component. For example, the syntax element is_separate_chroma_table may represent whether individual luma-chroma quantization parameter mapping tables are used for the Cb residual and the Cr residual, respectively. For example, the is_separate_chroma_table of which the value is 1 may represent that the separate chroma quantization parameter mapping table is signaled for the Cb component and the Cr component, and the is_separate_chroma_table of which the value is 0 may represent that one chroma quantization parameter mapping table is used for the Cb element, the Cr element, and the joint CbCr elements. For example, if the is_separate_chroma_table value is 1, Pi_min_idx_minus1[i], qPi_delta_max_idx [i], and Qp$_C$ qPi_flag[i][j] for the Cb component, and qPi_min_idx_minus1[i], qPi_delta_max_idx[i], and Qp$_C$_qPi_flag[i][j] for the Cr component may be signaled. Further, for example, if the is separate_chroma_table value is 0, qPi_min_idx_minus1[i], qPi_delta_max_idx[i], and Qp$_C$_qPi_flag[i][j] for the Cb component, the Cr component, and the joint CbCr component may be signaled.

Further, for example, the value obtained by adding 1 to the syntax element qPi_min_idx_minus1[i] may represent the minimum qPi index used for the chroma quantization. The qPi_min_idx value may be in the range of 1 to 69. The variable qPi_min_idx[i] may be configured the same as the value obtained by adding 1 to the qPi_min_idx_minus1[i].

Further, for example, the syntax element qPi_delta_max_idx may represent the delta value between the qPi_min_idx[i] and the maximum qPi index used to derive the chroma Qp$_C$. The qPiMaxIdx[i] value may be equal to or larger than the qPi_min_idx[i]. The qPi_delta_max_idx value may be in the range of 0 to 69. For example, the maximum index qPiMaxIdx[i] used to derive the Qp$_C$ may be derived as in the following equation.

$$qPiMaxIdx[i] = qPi\_min\_idx[i] + qPi\_delta\_max\_idx\_minus1[i] + 1 \quad \text{[Equation 10]}$$

The qPiMaxIdx[i] value may be equal to or larger than the qPi_min_idx_minus1[i].

Further, for example, the syntax element Qp$_C$_qPi_flag [i][U] may represent whether the j-th Qp$_C$ value of the i-th chroma component is increased by 1. That is, for example, the syntax element QpC_qPi_flag[i][ ] may represent whether the j-th Qp$_C$ value of the i-th chroma component is increased by 1 as compared with the (j−1)-th Qp$_C$ value. For example, the QpC_qPi_flag[ ] of which the value is 1 may represent that the j-th Qp$_C$ value of the i-th chroma component is increased by 1, and the QpC_qPi_flag[j] of which the value is 0 may represent that the j-th Qp$_C$ value of the i-th chroma component is not increased.

For example, the variable QpcIdx[i][qPi] may be derived as in the following table. Here, the qPi may be 0 to 69.

TABLE 68

For i =0; i< is_separate_chroma_table ? 2 : 1, i++
  The variable Qp$_C$Idx[i][ qPi ] for qPi with qPi = 0 ... 69, is derived as follows:
  -  For qPi < qPi_min_idx[i], Qp$_C$Idx[i][qPi ] is set equal to qPi.
  -  For qPi = qPi_min_idx[i] ... qPiMaxIdx[i], the following applies:
      Qp$_C$Idx[i][ qPi ] = Qp$_C$_qPi_flag[i][ qPi ] + Qp$_C$Idx[i][ qPi −1]
  -  For qPi > qPiMaxIdx
      Qp$_C$Idx[i][ qPi ] = qPi − (qPiMaxIdx[i] − Qp$_C$Idx[i][ qPiMaxIdx ])
  The value of Qp$_C$ of the ith chroma component is derived as Qp$_C$Idx[i][qPi].

Referring to Table 68, if the is_separate_chroma_table value is 1, the 0-th (i=0) chroma quantization parameter data and the first (i=1) chroma quantization parameter data may be signaled. Here, for example, the 0-th (i=0) chroma quantization parameter data may be chroma quantization parameter data for deriving a chroma quantization parameter mapping table for the Cb component, and the first (i=0) chroma quantization parameter data may be chroma quantization parameter data for deriving a chroma quantization parameter mapping table for the Cr component. Further, referring to Table 68, if the is separate_chroma_table value is 0, only the 0-th (i=0) chroma quantization parameter data may be signaled. Here, for example, the 0-th (i=0) chroma quantization parameter data may be chroma quantization parameter data for deriving a chroma quantization parameter mapping table for the Cb component, the Cr component, and the joint CbCr component. That is, one chroma quantization parameter mapping table may be used for the chroma components.

Further, referring to Table 68, the QpcIdx[i][qPi] may be derived as follows.

In case of qPi<qPi_min_idx[i], the QpcIdx[i][qPi] may be configured the same as the qPi.
  In case of qPi=qPi_min_idx[i] . . . qPiMaxIdx[i], the QpcIdx[qPi] may be configured as Qp$_C$_qPi_flag[i][qPi]+QpcIdx[i][qPi−1].
  In case of qPi>qPiMaxIdx, the QpcIdx[i][qPi] may be configured as qPi−(qPiMaxIdx[i]−QpcIdx[i][qPiMaxIdx]).

Thereafter, the Qp$_C$ value may be derived as the QpcIdx[i][qPi].

Further, the present embodiment proposes a scheme for signalling a flag representing whether the default table is used to derive the chroma quantization, or information being signaled to derive the chroma quantization is used. The flag may be signaled through a high level syntax, such as a sequence parameter set (SPS) or a picture parameter set (PPS). The flag being signaled through the high level syntax may be the same as that in the following table.

TABLE 69

|  | Descriptor |
|---|---|
| seq_parameter_set_rbsp( ) { | |
|     sps_decoding_parameter_set_id | u(4) |
|     ... | |
|     Qpc_data_default_flag | u(1) |
|     if(!Qp$_C$_data_default_flag) | |
|         Qp$_C$_data( ) | |
| ... | |

For example, the syntax element Qp$_C$_data_default_flag may represent whether the user-defined mode is used to derive the quantization parameter. For example, the Qp$_C$_data_default_flag of which the value is 0 may represent that the user-defined mode is used to derive the quantization parameter. That is, for example, the Qp$_C$_data_default_flag of which the value is 0 may represent that the chroma quantization parameter data Qp$_C$_data( ) is used. If the Qp$_C$_data_default_flag is 0, the chroma quantization parameter data Qp$_C$_data( ) may be signaled. Further, for example, the Qp$_C$_data_default_flag of which the value is 1 may represent that the default table is used to derive the quantization parameter. The default table may be as in Table 7 as described above. Further, if the Qp$_C$_data_default_flag is not present, the Qp$_C$_data_default_flag may be inferred as 1.

For example, according to the present embodiment, through description in the standard format, the process of deriving the quantization parameter may be represented as in FIG. 72 to FIG. 76.

FIG. 72 to FIG. 76 represent an example of derivation process for quantization parameters.

Referring to FIG. 72 to FIG. 76 as described above, if the ChromaArrayType is 1, and the Qp$_C$_data_default_flag represents FALSE (e.g., if the Qp$_C$_data_default_flag is 0), the variables qP$_{Cb}$, qP$_{Cr}$, and qP$_{CbCr}$ may be derived based on the user-defined information being signaled as proposed in the present embodiment. Further, for example, if the ChromaArrayType is 1, and the Qp$_C$_data_default_flag represents TRUE (e.g., if the Qp$_C$_data_default_flag is 1), the variables qP$_{Cb}$, qP$_{Cr}$, and qP$_{CbCr}$ may be derived by the default table based on the same index qPi as the qPi$_{Cb}$, qPi$_{Cr}$, and qPi$_{CbCr}$, respectively.

Further, the present disclosure proposes another embodiment for signalling information on the quantization parameter. For example, the present embodiment proposes a scheme for signalling parameters for the chroma QP table without default configuration. Further, the present embodiment may be connected to at least one of the above-described embodiments. That is, for example, the embodiments of the present disclosure may be commonly applied.

The chroma quantization parameter data for the chroma quantization parameter proposed in the present embodiment may be signaled as in the following table.

TABLE 71

|  | Descriptor |
|---|---|
| sequence_parameter_set( ) { | |
|     ... | |
|     is_same_qp_table_for_cb_cr | u(1) |
|     for( i = 0; i <is_same_qp_table_for_cb_cr ? 1 : 3; i++ ) { | |
|         qPi_table_len_idx[ i ] | ue(v) |
|         for( j = 0; j < qPi_table_len_idx [ i ]; j++ ) | |
|             qP$_C$_qPi_in_idx[ i ][ j ] | ue(v) |
|             qp$_C$_qPi_out_idx[ i ] i ][ j ] | ue(v) |
|         } | |
|     } | |
| } | |

For example, the syntax element is_same_qp_table_for_cb_cr may represent whether only one chroma QP mapping table is signaled and applied for the Cb component, the Cr component, and the joint CbCr component. That is, for example, the syntax element is_same_qp_table_for_cb_cr may represent whether parameters related to only one chroma QP mapping table are signaled for the Cb component, the Cr component, and the joint CbCr component, and one chroma QP mapping table is applied. For example, the is_same_qp_table_for_cb_cr of which the value is 1 may represent that only one chroma QP mapping table is signaled and applied for the Cb component, the Cr component, and the joint CbCr component. That is, for example, the is_same_qp_table_for_cb_cr of which the value is 1 may represent that the parameters related to only one chroma QP mapping table are signaled for the Cb component, the Cr component, and the joint CbCr component, and one chroma QP mapping table is applied. Further, for example, the is_same_qp_table_for_cb_cr of which the value is 0 may represent that a plurality of chroma QP mapping tables are signaled and applied for the Cb component, the Cr component, and the joint CbCr component, That is, for example, the is_same_qp_table_for_cb_cr of which the value is 0 may represent that parameters related to the plurality of chroma QP mapping tables are signaled for the Cb component, the Cr component, and the joint CbCr component, and the plurality of chroma QP mapping tables are applied. For example, the is_same_qp_table_for_cb_cr of which the value is 0 may represent that three chroma QP mapping tables are signaled and applied for the Cb component, the Cr component, and the joint CbCr component.

Further, for example, the syntax element qPi_table_len_idx[i] may represent the number of points used to explain the i-th chroma QP mapping table. That is, for example, the qPi_table_len_idx[i] may represent the number of indexes of the (i-th) chroma QP mapping table. The qPi_table_len_idx [i] value may be in the range of 0 to 69+QpBdOffset$_C$.

Further, for example, the syntax element qpc_qPi_in_idx [i][j] may represent the delta value used to derive an input coordinate of the j-th pivot point of the i-th chroma QP mapping table.

Further, for example, the syntax element qp$_C$_qPi_out_idx[i][j] may represent the delta value used to derive an output coordinate of the j-th pivot point of the i-th chroma QP mapping table.

Based on the above-described syntax elements, the i-th QP mapping table cQPTable[i] may be derived as in the following table. Here, if the same_qp_table_for_cb_cr is 1, the i may be 0, whereas if the same_qp_table_for_cb_cr is not 1, the i may be one of 0 to 2.

TABLE 72

The i-th chroma QP mapping tables cQPTable[ i ] for i = 0..same_qp_table_for_cb_cr ? 0 : 2 are derived as follows:

```
qpCtr = 0
qpVal[ i ][ 0 ] = -QpBdOffset_C + qp_C_qPi_in_idx [ i ][ 0 ]
cQPTable[ i ] [ 0 ] = -QpBdOffset_C + qp_C_qPi_out_idx [ i ][ 0 ]
for( j = 1; j < qPi_table_len_idx [ i ]; j++ ) {
    qpVal[ i ][ j ] = qpVal[ i ][ j - 1 ] + qp_C_qPi_in_idx [ i ][ j ]
    cQPTable[ i ][ j ] = cQPTable[ i ][ j - 1 ] + qp_C_qPi_out_idx [ i ][ j ]
}
ChromaQpTable[ i ][ qpVal[ i ][ 0 ] ] = cQPTable[ i ][ 0 ]
if( qpVal[ i ][ 0 ] < -QpBdOffset_C ) {
    for( k = qpVal[ i ][ 0 ] - 1; k >= -QpBdOffset_C; k - - )
        ChromaQpTable[ i ][ k ] = Clip3( -QpBdOffset_C, 69,
    ChromaQpTable[ i ][ k + 1 ] - 1 )
}
for( j = 0 ; j < qPi_table_len_idx [ i ] - 1; j++ ) {
    for( k = cQpTable[ j ] + 1, m = 1; k <= cQPTable[ j + 1 ]; k++, m++ )
        sh = qp_C_qPi_in_idx [j + 1 ] >> 1
        ChromaQpTable[ i ][ k ] =
    ChromaQpTable[ i ][ cQpTable[ j ] ] +
        (qp_C_qPi_out_idx [j + 1] * m + sh) / qP_C_qPi_in_idx [j + 1]
if( qpVal[ i ][ qPi_table_len_idx [ i ] - 1 ] != 69 )
    for( k = qpVal[ i ][ qPi_table_len_idx [ i ] - 1 ] + 1; k <= 69; k++ )
        ChromaQpTable[ i ][ k ] = Clip3( -QpBdOffset_C, 69,
    ChromaQpTable[ i ][ k - 1 ] + 1 )
```

When same_qp_table_for_cb_cr is equal to 1, ChromaQpTable[ 1 ][ k ] is set equal to ChromaQpTable[ 0 ][ k ] for k = -QpBdOffset_C..69.

Referring to Table 72 as described above, the input coordinate of the j-th pivot point of the i-th chroma QP mapping table may be derived based on the $qp_C\_qPi\_in\_idx[i][j]$. The qpVal[i][j] illustrated in Table 72 as described above may represent an input coordinate of the j-th pivot point. Further, referring to Table 72 as described above, the output coordinate of the j-th pivot point of the i-th chroma QP mapping table may be derived based on the $qp_C\_qPi\_out\_idx[i][j]$. The cQPTable[i][j] illustrated in Table 72 as described above may represent the output coordinate of the j-th pivot point.

Further, according to the present embodiment, the following change may be made to derive the chroma QP. For example, restrictions as in the following table may be added.

TABLE 73

The following constraint is added:
The value of qpVal[ i ][ j ] shall be greater than the value qpVal[ i ][ j – 1 ] for j = 1..qPi_table_len_idx [ i ].
- If ChromaArrayType is equal to 1, the following applies:
- If chroma_qp_table_present_flag is equal to 1, the variables $qP_{Cb}$ and $qP_{Cr}$ are set equal to the ChromaQpTable[ 0 ][ qPi_{Cb} ],ChromaQpTable[ 1 ][ qPi_{Cr} ], ChromaQpTable[ 1 ][ qPi_{CbCr} ] respectively.

Referring to Table 73 as described above, the qpVal[i][j] value may be larger than the value of qpVal[i][j−1]. Here, j may be one of 1 to qPi_table_len_idx[i].

Further, if the chroma type is not 0, for example, if the chroma type is 1, the variables $qP_{Cb}$ and $qP_{Cr}$ may be configured the same as ChromaQpTable[0][qPiCb], ChromaQpTable[1][qPiCr], and ChromaQpTable[1][qPiCbCr] in case that the chroma_qp_table_present_flag is 1.

Further, the present disclosure proposes another embodiment for signalling information on the quantization parameter. The present embodiment may be connected to at least one of the above-described embodiments. For example, the present embodiment proposes a scheme for limiting the range of the signaled qp index. As an example, the present embodiment may propose to signal the syntax element qPi_table_len_idx in the previous example as described above as follows.

For example, the syntax element qPi_table_len_idx[i] may represent the number of points used to explain the chroma QP mapping table. Further, the value of the syntax element qPi_table_len_idx[i] may be in the range of 0 to 69+QpBdOffsetC.

As described above, the present embodiment may propose a scheme for limiting the parameter (e.g., the number of points of the chroma QP mapping table represented by the qPi_table_len_idx[i]) in the minimum range that may be signaled or inferred in another way.

Figure 7:
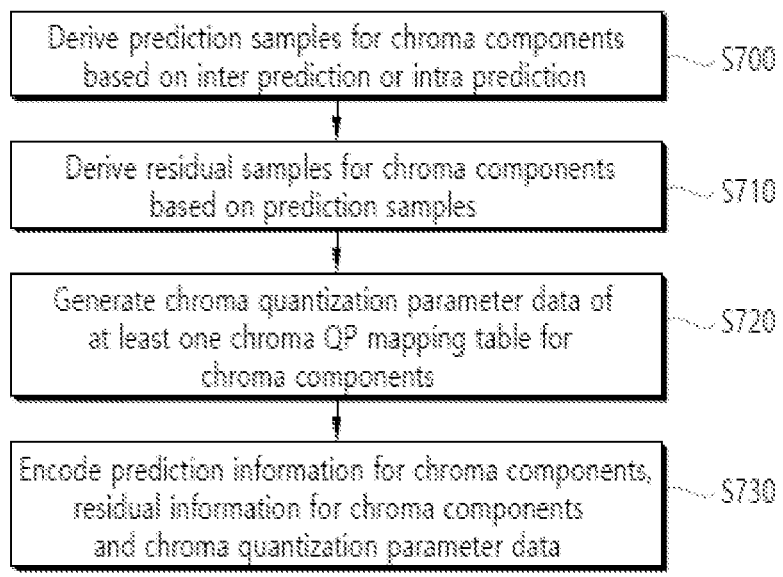
FIG. 7 schematically shows an image encoding method by an encoding apparatus according to the present document.

FIG. 7 schematically shows an image encoding method by an encoding apparatus according to the present document. The method disclosed in FIG. 7 may be performed by the encoding apparatus disclosed in FIG. 2. Specifically, for example, S700 of FIG. 7 may be performed by the predictor of the encoding apparatus, S710 to S720 may be performed by the residual processor of the encoding apparatus, S730 may be performed by the entropy encoder of the encoding apparatus. Further, although not illustrated, a process of generating reconstructed samples and a reconstructed picture based on residual samples and prediction samples for chroma components may be performed by the adder of the encoding apparatus.

The encoding apparatus derives prediction samples for chroma components based on inter prediction or intra prediction (S700). The encoding apparatus may derive prediction samples for the chroma components based on a prediction mode. That is, for example, the encoding apparatus may derive prediction samples of a current block for the chroma components based on the prediction mode. In this case, various prediction methods disclosed in the present disclosure, such as inter prediction or intra prediction, may be applied. The chroma components may include a Cb component, a Cr component, and/or a joint CbCr component.

For example, the encoding apparatus may determine whether to perform inter prediction or intra prediction with respect to the current block for the chroma components, and may determine a specific inter prediction mode or a specific intra prediction mode based on an RD cost. In accordance with the determined mode, the encoding apparatus may derive the prediction samples for the current block.

The encoding apparatus derives residual samples for the chroma components based on the prediction samples (S710). For example, the encoding apparatus may derive the residual samples through subtraction of the original samples and prediction samples of the current block for the chroma components in the current picture.

The encoding apparatus generates chroma quantization parameter data of at least one chroma quantization parameter (QP) mapping table for the chroma components (S720).

The encoding apparatus may generate chroma quantization parameter data of at least one chroma quantization parameter (QP) mapping table for the chroma components. A default chroma QP mapping table for the chroma components may not be used. That is, if the chroma quantization parameter for the chroma components is used, the encoding apparatus may generate the chroma quantization parameter data of at least one chroma quantization parameter (QP) mapping table of the chroma components. The image information may include the chroma quantization parameter data of at least one chroma QP mapping table for the chroma components. Further, for example, the chroma component may include a Cb component, a Cr component, and/or a joint CbCr component. Further, for example, the chroma quantization parameter data may include a syntax element representing the number of points in the chroma QP mapping table, a syntax element representing a delta value used to derive an input coordinate of a target point of the chroma QP mapping table, and/or a syntax element representing a delta value used to derive an output coordinate of the target point of the chroma QP mapping table. Further, for example, the value of the syntax element representing the number of points of the chroma QP mapping table may be in the range of 0 to a specific value. The specific value may be 69+QpBdOffsetC. Further, for example, the syntax element representing the number of points of the chroma QP mapping table may be the qPi_table_len_idx[i] as described above, and the syntax element representing the delta value used to derive the input coordinate of the target point of the chroma QP mapping table may be the qpC_qPi_in_idx[i][j] as described above, and the syntax element representing the delta value used to derive the output coordinate of the target point of the chroma QP mapping table may be the qpC_qPi_out_idx[i][j] as described above.

Further, for example, the encoding apparatus may determine whether one chroma QP mapping table is applied to the chroma components, and may generate a flag representing whether one chroma QP mapping table is applied to the chroma components. The image information may include the flag representing whether one chroma QP mapping table is applied to the chroma components.

For example, the encoding apparatus may generate the flag representing whether one chroma QP mapping table is applied to the chroma components based on the chroma type. Here, the chroma type may mean the ChromaArrayType as described above. For example, if the chroma type value is not 0, the encoding apparatus may generate the flag representing whether one chroma QP mapping table is applied to the chroma components. For example, if the chroma type value is 1, the encoding apparatus may generate the flag representing whether one chroma QP mapping table is applied to the chroma components. Here, if the chroma type value is 0, the chroma type may be a monochrome format, and if the chroma type value is 1, the chroma type may be a 4:2:0 format. If the chroma type value is 2, the chroma type may be a 4:2:2 format, and if the chroma type value is 3, the chroma type may be a 4:4:4 format. For example, the syntax element for the flag may be the above-described qp_juma_to_chroma_joint_map_flag flag, sps_separate_qpc_table_flag, is_separate_chroma_table, or is_same_qp_table_for_cb_cr.

For example, if the flag value is 1, the flag may represent that one chroma QP mapping table is applied to the chroma components. Further, for example, if the flag value is 0, the flag may represent that a plurality of chroma QP mapping tables are applied to the chroma components. That is, for example, if the flag value is 0, the flag may represent that an individual chroma QP mapping table are applied to each chroma component.

Accordingly, for example, if the flag value is 1, the chroma quantization parameter data of one chroma QP mapping table for the chroma components may be signaled, and if the flag value is 0, the chroma quantization parameter data of the plurality of chroma QP mapping tables for the chroma components may be signaled. That is, for example, if the flag value is 0, the chroma quantization parameter data of an individual chroma QP mapping table for each chroma component may be signaled.

Further, for example, the flag may be signaled through a high level syntax. For example, the flag may be signaled through a sequence parameter set (SPS), a picture parameter set (PPS), a slice header, or an adaptation parameter set (APS).

Further, for example, the encoding apparatus may generate the chroma quantization parameter data for the chroma components based on the flag.

For example, the chroma quantization parameter data of the plurality of chroma QP mapping tables for the chroma components may include first chroma quantization parameter data of the first chroma QP mapping table for the Cb component, and second chroma quantization parameter data of the second chroma QP mapping table for the Cr component. Further, for example, the chroma quantization parameter data may include the first chroma quantization parameter data of the first chroma QP mapping table for the Cb component, the second chroma quantization parameter data of the second chroma QP mapping table for the Cr component, and/or third chroma quantization parameter data of a third chroma QP mapping table for the joint CbCr component.

Meanwhile, for example, the encoding apparatus may generate a joint CbCr enable flag representing whether the third chroma quantization parameter data of the third chroma QP mapping table for the joint CbCr component is present. That is, for example, the encoding apparatus may determine whether the third chroma quantization parameter data of the third chroma QP mapping table for the joint CbCr component is present, and may generate the joint CbCr enable flag. Further, for example, the encoding apparatus may generate the joint CbCr enable flag representing whether the third chroma quantization parameter data of the third chroma QP mapping table for the joint CbCr component is present based on the chroma type. Here, the chroma type may mean the ChromaArrayType as described above. For example, if the chroma type value is not 0, the encoding apparatus may generate the joint CbCr enable flag representing whether the third chroma quantization parameter data of the third chroma QP mapping table for the joint CbCr component is present. For example, if the chroma type value is 1, the encoding apparatus may generate the joint CbCr enable flag representing whether the third chroma quantization parameter data of the third chroma QP mapping table for the joint CbCr component is present. Further, for example, the joint CbCr enable flag may be signaled through a high level syntax. For example, the joint CbCr enable flag may be signaled through a sequence parameter set (SPS), a picture parameter set (PPS), a slice header, or an adaptation parameter set (APS).

In this case, if the flag value is 0 (i.e., it is determined that the plurality of chroma QP mapping tables are applied to the chroma components), and the joint CbCr enable flag value is 1 (i.e., it is determined that the third chroma quantization parameter data of the third chroma QP mapping table for the joint CbCr component is present), the chroma quantization parameter data may include the first chroma quantization parameter data of the first chroma QP mapping table for the Cb component, the second chroma quantization parameter data of the second chroma QP mapping table for the Cr component, and the third chroma quantization parameter data of the third chroma QP mapping table for the joint CbCr component.

Further, for example, the first chroma quantization parameter data may include a syntax element representing the number of points of the first chroma QP mapping table for the Cb component, a syntax element representing the delta value used to derive the input coordinate of the target point of the first chroma QP mapping table, and/or a syntax element representing the delta value used to derive the output coordinate of the target point of the first chroma QP mapping table. The syntax element representing the number of points of the first chroma QP mapping table may be the qPi_table_len_idx[i], the syntax element representing the delta value used to derive the input coordinate of the target point of the first chroma QP mapping table may be the qpC_qPi_in_idx[i][j], and the syntax element representing the delta value used to derive the output coordinate of the target point of the first chroma QP mapping table may be the qpC_qPi_out_idx[i][j]. Further, for example, the first chroma quantization parameter data may be signaled through the high level syntax. For example, the first chroma quantization parameter data may be signaled through the sequence parameter set (SPS), the picture parameter set (PPS), the slice header, or the adaptation parameter set (APS).

Further, for example, the second chroma quantization parameter data may include a syntax element representing the number of points of the second chroma QP mapping table for the Cr component, a syntax element representing the delta value used to derive the input coordinate of the target point of the second chroma QP mapping table, and/or a syntax element representing the delta value used to derive the output coordinate of the target point of the second chroma QP mapping table. The, syntax element representing the number of points of the second chroma QP mapping table may be the qPi_table_len_idx[i], the syntax element representing the delta value used to derive the input coordinate of the target point of the second chroma QP mapping table may be the qpC_qPi_in_idx[i][j], and the syntax element representing the delta value used to derive the output coordinate of the target point of the second chroma QP mapping table may be the qpC_qPi_out_idx[i][j]. Further, for example, the second chroma quantization parameter data may be signaled through the high level syntax. For example, the second chroma quantization parameter data may be signaled through the sequence parameter set (SPS), the picture parameter set (PPS), the slice header, or the adaptation parameter set (APS).

Further, for example, the third chroma quantization parameter data may include a syntax element representing the number of points of the third chroma QP mapping table for the joint CbCr component, a syntax element representing the delta value used to derive the input coordinate of the target point of the third chroma QP mapping table, and/or a syntax element representing the delta value used to derive the output coordinate of the target point of the third chroma QP mapping table. The syntax element representing the number of points of the third chroma QP mapping table may be the qPi_table_len_idx[i], the syntax element representing the delta value used to derive the input coordinate of the target point of the third chroma QP mapping table may be the qpC_qPi_in_idx[i][j], and the syntax element representing the delta value used to derive the output coordinate of the target point of the third chroma QP mapping table may be the qpC_qPi_out_idx[i][j]. Further, for example, the third chroma quantization parameter data may be signaled through the high level syntax. For example, the third chroma quantization parameter data may be signaled through the sequence parameter set (SPS), the picture parameter set (PPS), the slice header, or the adaptation parameter set (APS).

Further, for example, if the flag value is 1 (i.e., it is determined that one chroma QP mapping table is applied to the chroma components), the chroma quantization parameter data may include the chroma quantization parameter data of one chroma QP mapping table for the Cb component, the Cr component, and the joint CbCr component.

The encoding apparatus encodes prediction information for the chroma components, residual information for the chroma components and the chroma quantization parameter data (S730). The encoding apparatus may encode chroma quantization parameter data of at least one chroma quantization parameter (QP) mapping table for the chroma components. The image information may include chroma quantization parameter data of at least one chroma quantization parameter (QP) mapping table for the chroma components.

Also, for example, the encoding apparatus may encode a flag representing whether one chroma QP mapping table is applied to the chroma components and/or the joint CbCr enable flag. The image information may include a flag representing whether one chroma QP mapping table is applied to the chroma components and/or the joint CbCr enable flag.

Further, for example, the encoding apparatus may generate and encode prediction information for the current block. The prediction information may include prediction mode information representing a prediction mode of the current block for the chroma components. The image information may include the prediction information.

Also, for example, the encoding apparatus may encode residual information for the residual samples. For example, the encoding apparatus may derive transform coefficients based on the residual samples, and may generate the residual information based on the transform coefficients. For example, the encoding apparatus may derive quantized residual samples by quantizing the residual samples based on a chroma quantization parameter, derive the transform coefficients based on the quantized residual samples, and generate and encode the residual information based on the transform coefficients. Further, for example, the encoding apparatus may derive quantized residual samples by quantizing the residual samples based on the chroma quantization parameter, derive the transform coefficients by transforming the quantized residual samples, and generate and encode the residual information based on the transform coefficients.

For example, if the value of the flag is 0, the encoding apparatus may derive quantized residual samples for the Cb component by quantizing residual samples for the Cb component based on a first chroma quantization parameter for the Cb component, and may derive quantized residual samples for the Cr component by quantizing residual samples for the Cr component based on a second chroma quantization parameter for the Cr component. Further, for example, if the value of the flag is 0, the encoding apparatus may derive quantized residual samples for the Cb component by quantizing residual samples for the Cb component based on a first chroma quantization parameter for the Cb component, and may derive quantized residual samples for the Cr component by quantizing residual samples for the Cr component based on a second chroma quantization parameter for the Cr component, and derive quantized residual samples for the joint CbCr component by quantizing residual samples for the joint CbCr component based on a third chroma quantization parameter for the joint CbCr component. Further, for example, if the value of the flag is 1, the encoding apparatus may derive quantized residual samples for the chroma components by quantizing residual samples for the chroma components based on a chroma quantization parameter.

The image information may include the residual information. For example, the residual information may include syntax elements for the transform coefficients of the current chroma block. For example, the syntax elements may include syntax elements, such as coded_sub_block_flag, sig_coeff_flag, coeff_sign_flag, abs_level_gt1_flag, par_level_flag, abs_level_gtX_flag, abs_remainder, and/or coeff_sign_flag.

Also, for example, the encoding apparatus may encode and output the image information in the form of a bitstream.

Meanwhile, a bitstream including the image information may be transmitted to the decoding apparatus through a network or a (digital) storage medium. Here, the network may include a broadcast network and/or a communication network, and the digital storage medium may include various types of storage media such as an USB disk, an SD, a CD, a DVD, a Bluray disk, an HDD, and an SSD.

Figure 8:
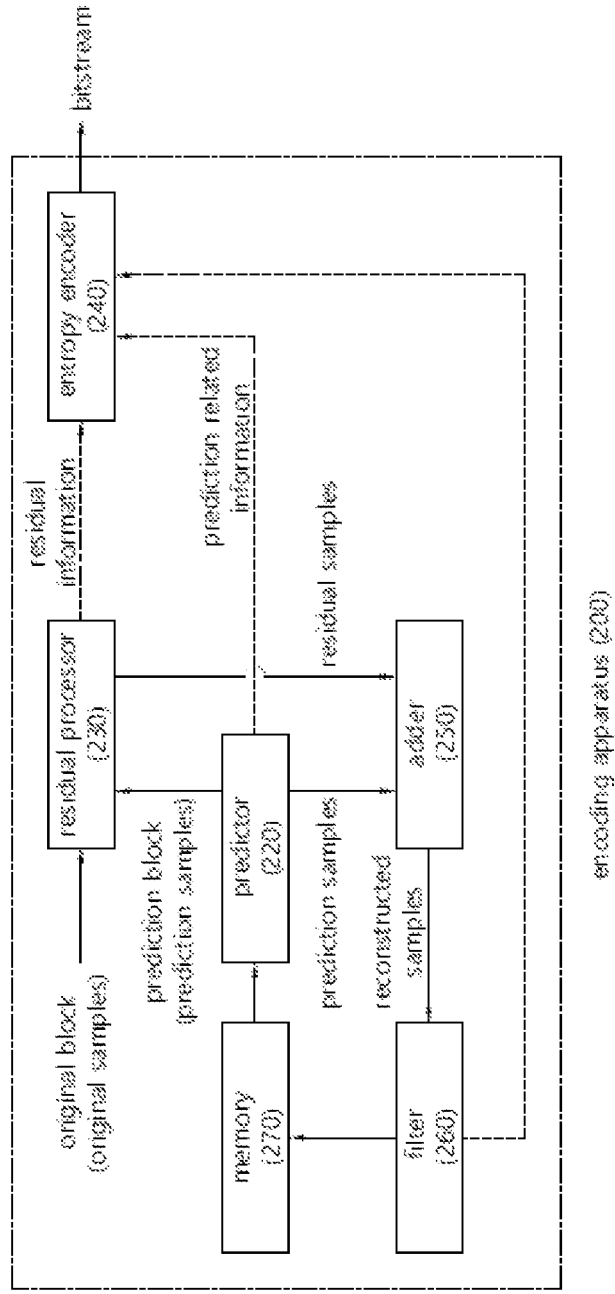
FIG. 8 schematically shows an encoding apparatus for performing an image encoding method according to this document.

FIG. 8 schematically shows an encoding apparatus for performing an image encoding method according to this document. The method disclosed in FIG. 7 may be performed by the encoding apparatus disclosed in FIG. 8. Specifically, for example, the predictor of the encoding apparatus of FIG. 8 may perform S700, the residual processor of the encoding apparatus may perform S710 to S720, and the entropy encoder of the encoding apparatus may perform S730. Further, although not illustrated, a process of generating reconstructed samples and a reconstructed picture based on the residual samples and prediction samples may be performed by the adder of the encoding apparatus.

Figure 9:
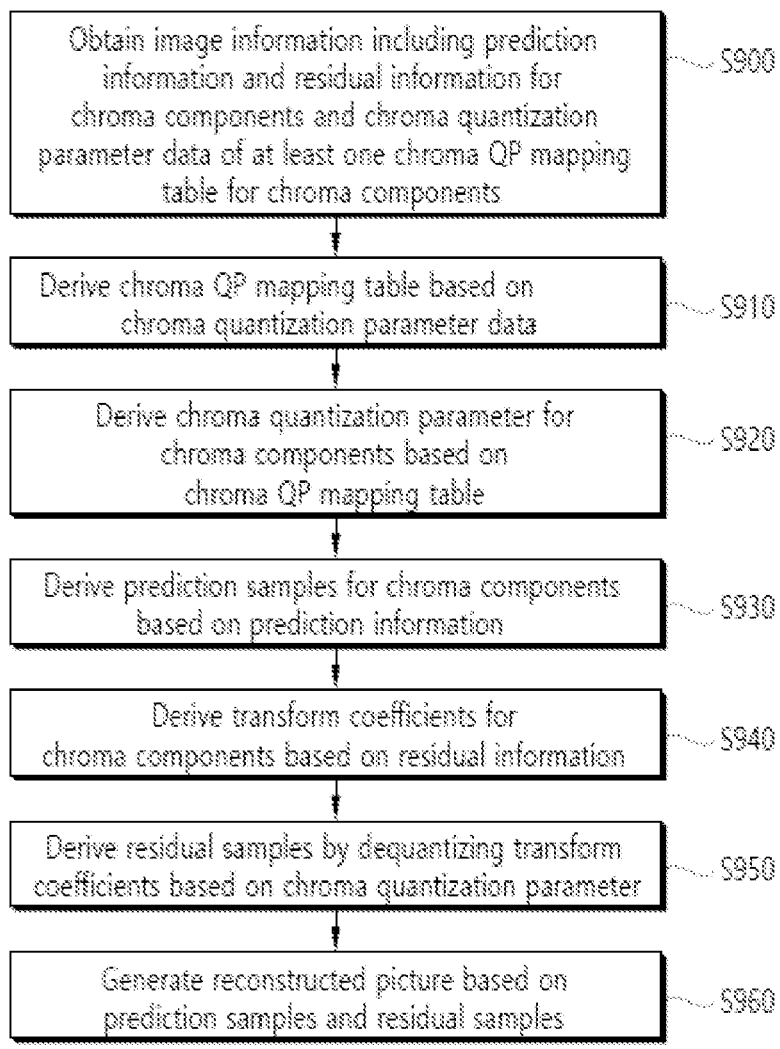
FIG. 9 schematically shows an image decoding method by a decoding apparatus according to this document.

FIG. 9 schematically shows an image decoding method by a decoding apparatus according to this document. The method disclosed in FIG. 9 may be performed by the decoding apparatus disclosed in FIG. 3. Specifically, for example, S900 of FIG. 9 may be performed by the entropy decoder of the decoding apparatus, S930 of FIG. 9 may be performed by the predictor of the decoding apparatus, and S910 to S920 and S940 to S950 of FIG. 9 may be performed by the residual processor of the decoding apparatus, and S960 of FIG. 9 may be performed by the adder of the decoding apparatus.

The decoding apparatus obtain image information including prediction information and residual information for chroma components and chroma quantization parameter data of at least one chroma Quantization Parameter (QP) mapping table for the chroma components (S900). The decoding apparatus may obtain image information through a bitstream. For example, the image information may include information on the chroma quantization parameter. The decoding apparatus may obtain image information through a bitstream.

For example, the image information may include chroma quantization parameter data of at least one chroma quantization parameter (QP) mapping table. For example, the decoding apparatus may obtain the chroma quantization parameter data of at least one chroma quantization parameter (QP) mapping table for the chroma components. A default chroma QP mapping table for the chroma components may not be used. That is, if the chroma quantization parameter for the chroma components is used, the decoding apparatus may obtain the chroma quantization parameter data of at least one chroma quantization parameter (QP) mapping table for the chroma components. Further, for example, the chroma component may include a Cb component, a Cr component, and/or a joint CbCr component. Further, for example, the chroma quantization parameter data may include a syntax element representing the number of points in the chroma QP mapping table, a syntax element representing a delta value used to derive an input coordinate of a target point of the chroma QP mapping table, and/or a syntax element representing a delta value used to derive an output coordinate of the target point of the chroma QP mapping table. Further, for example, the value of the syntax element representing the number of points of the chroma QP mapping table may be in the range of 0 to a specific value. The specific value may be 69+QpBdOffsetC. Further, for example, the syntax element representing the number of points of the chroma QP mapping table may be the qPi_table_len_idx[i] as described above, and the syntax element representing the delta value used to derive the input coordinate of the target point of the chroma QP mapping table may be the $qp_{C\_}qPi\_in\_idx[i][j]$ as described above, and the syntax element representing the delta value used to derive the output coordinate of the target point of the chroma QP mapping table may be the $qp_{C\_}qPi\_out\_idx[i][j]$ as described above.

Further, for example, the chroma quantization parameter data of the chroma QP mapping table may be signaled through a high level syntax. For example, the chroma quantization parameter data may be signaled through a sequence parameter set (SPS), a picture parameter set (PPS), a slice header, or an adaptation parameter set (APS).

Further, for example, the decoding apparatus may obtain a flag representing whether one chroma QP mapping table is applied to the chroma components. That is, for example, the decoding apparatus may obtain the flag representing whether one chroma QP mapping table is signaled and applied to the chroma components. The image information may include the flag. Meanwhile, for example, the decoding apparatus may obtain the flag representing whether one chroma QP mapping table is applied based on the chroma type. Here, the chroma type may mean the ChromaArrayType as described above. For example, if the chroma type value is not 0, the decoding apparatus may obtain the flag representing whether one chroma QP mapping table is applied. For example, if the chroma type value is 1, the decoding apparatus may obtain the flag representing whether one chroma QP mapping table is applied. Here, if the chroma type value is 0, the chroma type may be a monochrome format, and if the chroma type value is 1, the chroma type may be a 4:2:0 format. If the chroma type value is 2, the chroma type may be a 4:2:2 format, and if the chroma type value is 3, the chroma type may be a 4:4:4 format. For example, the syntax element for the flag may be the above-described qp_luma_to_chroma_joint_map_flag, sps_separate_qpc_table_flag, is_separate_chroma_table, or is_same_qp_table_for_cb_cr.

For example, if the flag value is 1, the flag may represent that one chroma QP mapping table is applied to the chroma components. Further, for example, if the flag value is 0, the flag may represent that a plurality of chroma QP mapping tables are applied to the chroma components. That is, for example, if the flag value is 0, the flag may represent that an individual chroma QP mapping table is applied to each chroma component.

Accordingly, for example, if the flag value is 1, the chroma quantization parameter data of one chroma QP mapping table for the chroma components may be signaled, and if the flag value is 0, the chroma quantization parameter data of the plurality of chroma QP mapping tables for the chroma components may be signaled. That is, for example, if the flag value is 0, the chroma quantization parameter data of an individual chroma QP mapping table for each chroma component may be signaled.

Further, for example, the flag may be signaled through a high level syntax. For example, the flag may be signaled through a sequence parameter set (SPS), a picture parameter set (PPS), a slice header, or an adaptation parameter set (APS).

Further, for example, the chroma quantization parameter data of the plurality of chroma QP mapping tables for the chroma components may include first chroma quantization parameter data of the first chroma QP mapping table for the Cb component, and second chroma quantization parameter data of the second chroma QP mapping table for the Cr component. Further, for example, the chroma quantization parameter data may include the first chroma quantization parameter data of the first chroma QP mapping table for the Cb component, the second chroma quantization parameter data of the second chroma QP mapping table for the Cr component, and/or third chroma quantization parameter data of a third chroma QP mapping table for the joint CbCr component.

Meanwhile, for example, the decoding apparatus may obtain a joint CbCr enable flag representing whether the third chroma quantization parameter data of the third chroma QP mapping table for the joint CbCr component is present. For example, the image information may include the joint CbCr enable flag representing whether the third chroma quantization parameter data of the third chroma QP mapping table for the joint CbCr component is present. Further, for example, the decoding apparatus may obtain the joint CbCr enable flag representing whether the third chroma quantization parameter data of the third chroma QP mapping table for the joint CbCr component is present based on the chroma type. Here, the chroma type may mean the ChromaArrayType as described above. For example, if the chroma type value is not 0, the decoding apparatus may obtain the joint CbCr enable flag representing whether the third chroma quantization parameter data of the third chroma QP mapping table for the joint CbCr component is present. For example, if the chroma type value is 1, the decoding apparatus may obtain the joint CbCr enable flag representing whether the third chroma quantization parameter data of the third chroma QP mapping table for the joint CbCr component is present. Further, for example, the joint CbCr enable flag may be signaled through a high level syntax. For example, the joint CbCr enable flag may be signaled through a sequence parameter set (SPS), a picture parameter set (PPS), a slice header, or an adaptation parameter set (APS).

In this case, if the flag value is 0 (i.e., the flag represents that the plurality of chroma QP mapping tables are applied to the chroma components), and the joint CbCr enable flag value is 1 (i.e., the joint CbCr enable flag represents that the third chroma quantization parameter data of the third chroma QP mapping table for the joint CbCr component is present), the chroma quantization parameter data may include the first chroma quantization parameter data of the first chroma QP mapping table for the Cb component, the second chroma quantization parameter data of the second chroma QP mapping table for the Cr component, and the third chroma quantization parameter data of the third chroma QP mapping table for the joint CbCr component.

Further, for example, the first chroma quantization parameter data may include a syntax element representing the number of points of the first chroma QP mapping table for the Cb component, a syntax element representing the delta value used to derive the, input coordinate of the target point of the first chroma QP mapping table, and/or a syntax element representing the delta value used to derive the output coordinate of the target point of the first chroma QP mapping table. The syntax element representing the number of points of the first chroma QP mapping table may be the qPi_table_len_idx[i], the syntax element representing the delta value used to derive the input coordinate of the target point of the first chroma QP mapping table may be the $qp_C\_qPi\_in\_idx[i][j]$, and the syntax element representing the delta value used to derive the output coordinate of the target point of the first chroma QP mapping table may be the $qp_C\_qPi\_out\_idx[i][j]$. Further, for example, the first chroma quantization parameter data may be signaled through the high level syntax. For example, the first chroma quantization parameter data may be signaled through the sequence parameter set (SPS), the picture parameter set (PPS), the slice header, or the adaptation parameter set (APS).

Further, for example, the second chroma quantization parameter data may include a syntax element representing the number of points of the second chroma QP mapping table for the Cr component, a syntax element representing the delta value used to derive the input coordinate of the target point of the second chroma QP mapping table, and/or a syntax element representing the delta value used to derive the output coordinate of the target point of the second chroma QP mapping table. The syntax element representing the number of points of the second chroma QP mapping table may be the qPi_table_len_idx[i], the syntax element representing the delta value used to derive the input coordinate of the target point of the second chroma QP mapping table may be the $qp_C\_qPi\_in\_idx[i][j]$, and the syntax element representing the delta value used to derive the output coordinate of the target point of the second chroma QP mapping table may be the $qp_C\_qPi\_out\_idx[i][j]$. Further, for example, the second chroma quantization parameter data may be signaled through the high level syntax. For example, the second chroma quantization parameter data may be signaled through the sequence parameter set (SPS), the picture parameter set (PPS), the slice header, or the adaptation parameter set (APS).

Further, for example, the third chroma quantization parameter data may include a syntax element representing the number of points of the third chroma QP mapping table for the joint CbCr component, a syntax element representing the delta value used to derive the input coordinate of the target point of the third chroma QP mapping table, and/or a syntax element representing the delta value used to derive the output coordinate of the target point of the third chroma QP mapping table. The syntax element representing the number of points of the third chroma QP mapping table may be the qPi_table_len_idx[i], the syntax element representing the delta value used to derive the input coordinate of the target point of the third chroma QP mapping table may be the $qp_C$_qPi_in_idx[i][j], and the syntax element representing the delta value used to derive the output coordinate of the target point of the third chroma QP mapping table may be the $qp_C$_qPi_out_idx[i][j]. Further, for example, the third chroma quantization parameter data may be signaled through the high level syntax. For example, the third chroma quantization parameter data may be signaled through the sequence parameter set (SPS), the picture parameter set (PPS), the slice header, or the adaptation parameter set (APS).

Further, for example, if the flag value is 1 (i.e., the flag represents that one chroma QP mapping table is applied to the chroma components), the chroma quantization parameter data may include the chroma quantization parameter data of (one) chroma QP mapping table for the Cb component, the Cr component, and the joint CbCr component.

Further, for example, the image information may include prediction information and/or residual information for the chroma components. For example, the image information may include the prediction information for the chroma components, and the prediction information may include the prediction mode information. The prediction mode information may represent whether inter prediction or intra prediction is applied to the current block for the chroma components. Further, for example, the residual information may include syntax elements for transform coefficients of the current block for the chroma components. For example, the syntax elements may include syntax elements, such as coded_sub_block_flag, sig_coeff_flag, coeff_sign_flag, abs_level_gt1_flag, par_level_flag, abs_level_gtX_flag, abs_remainder, and/or coeff_sign_flag.

The decoding apparatus derives the chroma QP mapping table based on the chroma quantization parameter data (S910). The decoding apparatus may derive the chroma QP mapping table based on the chroma quantization parameter data. The chroma QP mapping table may be called a chroma quantization parameter table, or user-defined quantization parameter mapping table.

For example, as described above, the chroma QP mapping table may be derived based on the syntax element representing the number of points of the chroma QP mapping table, the syntax element representing the delta value used to derive the input coordinate of the target point of the chroma QP mapping table, and/or the syntax element representing the delta value used to derive the output coordinate of the target point of the chroma QP mapping table. That is, for example, the chroma QP mapping table for the chroma components may be derived based on the quantization parameter data. For example, as illustrated in Table 72 as described above, the chroma QP mapping table for the chroma components may be derived based on the quantization parameter data.

For example, if the flag value is 0 (i.e., the flag represents that the plurality of chroma QP mapping tables are applied to the chroma components), the first chroma QP mapping table for the chroma Cb component may be derived based on the first chroma quantization parameter data of the first chroma QP mapping table for the Cb component. Further, for example, if the flag value is 0, the second chroma QP mapping table for the chroma Cb component may be derived based on the second chroma quantization parameter data of the second chroma QP mapping table for the Cr component. Further, for example, if the flag value is 0, the first chroma QP mapping table for the chroma CbCr component may be derived based on the third chroma quantization parameter data of the third chroma QP mapping table for the joint CbCr component.

Further, for example, if the flag value is 1 (i.e., the flag represents that one chroma QP mapping table is applied to the chroma components), the chroma quantization parameter table for the chroma components may be derived based on the chroma quantization parameter data of the chroma QP mapping table for the chroma components. The chroma components may include the Cb component, the Cr component, and/or the joint CbCr component.

The decoding apparatus derives a chroma quantization parameter for the chroma components based on the chroma QP mapping table (S920). The decoding apparatus may derive the chroma quantization parameter for the chroma components based on the chroma QP mapping table.

For example, if the flag value is 0, the first chroma quantization parameter for the Cb component may be derived based on the first chroma QP mapping table, and the second chroma quantization parameter for the Cr component may be derived based on the second chroma QP mapping table. Further, for example, if the flag value is 0, the first chroma quantization parameter for the Cb component may be derived based on the first chroma QP mapping table, the second chroma quantization parameter for the Cr component may be derived based on the second chroma QP mapping table, and the third chroma quantization parameter for the joint CbCr component may be derived based on the third chroma QP mapping table. Here, the quantization parameter for the Cb component may represent the $QP'_{Cb}$ as described above, the quantization parameter for the Cr component may represent the $QP'_{Cr}$ as described above, and the quantization parameter for the joint CbCr component may represent the $QP'_{CbCr}$ as described above.

For example, the index for the chroma components (Cb component, Cr component, or joint CbCr component) may be derived based on the quantization parameter for the luma component, and the chroma quantization parameter for the chroma components may be derived based on the chroma quantization parameter of the point for the index of the chroma QP mapping table for the chroma components. That is, for example, the chroma quantization parameter for the chroma components may be derived based on the chroma quantization parameter for the point of the same index as the quantization parameter of the luma component in the chroma QP mapping table.

Further, for example, the chroma quantization parameter (e.g., $QP'_{Cb}$, $QP'_{Cr}$, or $QP'_{CbCr}$) for the chroma components may be derived by adding an offset to the chroma quantization parameter (e.g., $QP_{Cb}$, $QP_{Cr}$, or $QP_{CbCr}$) of the point for the index of the chroma QP mapping table for the chroma components (Cb component, Cr component, or joint CbCr component). The offset may be derived based on the syntax element representing the offset for deriving the quantization parameter for the chroma components.

Further, for example, if the flag value is 1, the chroma quantization parameter for the chroma components may be derived based on one chroma QP mapping table for the chroma components. Accordingly, the chroma quantization parameter may be equally applied to the chroma components.

For example, the index for the chroma components (Cb component, Cr component, and joint CbCr component) may be derived based on the quantization parameter for the luma component, and the chroma quantization parameter for the chroma components may be derived based on the chroma quantization parameter of the point for the index of the chroma QP mapping table for the chroma components. That is, for example, the chroma quantization parameter for the chroma components may be derived based on the chroma quantization parameter for the point of the same index as the quantization parameter of the luma component in the chroma QP mapping table.

Further, for example, the chroma quantization parameter for the chroma components may be derived by adding the offset to the chroma quantization parameter for the point of the index of the chroma QP mapping table for the chroma components. The offset may be derived based on the syntax element representing the offset for deriving the chroma quantization parameter for the chroma components.

The decoding apparatus derives prediction samples for the chroma components based on the prediction information (S930). The decoding apparatus may determine whether inter prediction or intra prediction is applied to the chroma components based on the prediction information, and may perform prediction based thereon. That is, for example, the decoding apparatus may determine whether inter prediction or intra prediction is applied to a current block for the chroma components based on the prediction information, and may perform prediction based thereon.

For example, the decoding apparatus may derive a prediction mode applied to the current block for the chroma components based on the prediction information, and may derive prediction samples of the current block based on the prediction mode. for example, when the inter prediction is applied to the current block, the decoding apparatus may derive motion information on the current block based on prediction information included in the image information, may derive the prediction samples of the current block based on the motion information. Also, for example, when the intra prediction is applied to the current block, the decoding apparatus may derive a reference sample based on a neighboring sample of the current block, may derive the prediction samples of the current block based on the reference sample and an intra prediction mode of the current block. The reference samples may include include top reference samples and left reference samples of the current block. For example, when the size of the current block is N×N and an x component and any component of the top-left sample position of the current block are 0, the left reference samples may be p[−1][0] to p[−1][2N−1], and the top reference samples may be p[0][−1] to p[2N−1][−1].

The decoding apparatus derives transform coefficients for the chroma components based on the residual information (S940). For example, the decoding apparatus may derive transform coefficients for the chroma components based on the received residual information. Alternatively, for example, the decoding apparatus may derive transform coefficients based on residual information, and may derive inverse transformed transform coefficients by inverse transforming the transform coefficients. The transform coefficients may include transform coefficients for the Cb component, transform coefficients for the Cr component, and/or transform coefficients for the joint CbCr component.

The decoding apparatus derives residual samples by dequantizing the transform coefficients based on the chroma quantization parameter (S950). The decoding apparatus may derive residual samples based on the chroma quantization parameter.

For example, if the value of the flag is 0, the decoding apparatus may derive residual samples for the Cb component by dequantizing transform coefficients for the Cb component based on a first chroma quantization parameter for the Cb component, and may derive residual samples for the Cr component by dequantizing transform coefficients for the Cr component based on a second chroma quantization parameter for the Cr component. Further, for example, if the value of the flag is 0, the decoding apparatus may derive residual samples for the Cb component by dequantizing transform coefficients for the Cb component based on a first chroma quantization parameter for the Cb component, and may derive residual samples for the Cr component by dequantizing transform coefficients for the Cr component based on a second chroma quantization parameter for the Cr component, and may derive residual samples for the joint CbCr component by dequantizing transform coefficients for the joint CbCr component based on a third chroma quantization parameter for the joint CbCr component. Further, for example, if the value of the flag is 1, the decoding apparatus may derive residual samples for the chroma components by dequantizing transform coefficients for the chroma components based on a chroma quantization parameter.

Further, for example, if the value of the flag is 0, the decoding apparatus may derive residual samples for the Cb component by dequantizing inverse transformed transform coefficients for the Cb component based on a first chroma quantization parameter for the Cb component, and may derive residual samples for the Cr component by dequantizing inverse transformed transform coefficients for the Cr component based on a second chroma quantization parameter for the Cr component. Further, for example, if the value of the flag is 0, the decoding apparatus may derive residual samples for the Cb component by dequantizing inverse transformed transform coefficients for the Cb component based on a first chroma quantization parameter for the Cb component, and may derive residual samples for the Cr component by dequantizing inverse transformed transform coefficients for the Cr component based on a second chroma quantization parameter for the Cr component, and may derive residual samples for the joint CbCr component by dequantizing inverse transformed transform coefficients for the joint CbCr component based on a third chroma quantization parameter for the joint CbCr component. Further, for example, if the value of the flag is 1, the decoding apparatus may derive residual samples for the chroma components by dequantizing inverse transformed transform coefficients for the chroma components based on a chroma quantization parameter.

The decoding apparatus generates a reconstructed picture based on the prediction samples and the residual samples (S960). For example, the decoding apparatus may generate the reconstructed picture based on the residual samples.

Meanwhile, for example, the decoding apparatus may derive prediction samples by performing an inter prediction mode or an intra prediction mode for the current block based on the prediction information received through a bitstream, may generate reconstructed samples and/or a reconstructed picture by adding the prediction samples and the residual samples.

Afterward, depending on the needs, to improve the subjective/objective image quality, an in-loop filtering procedure such as deblocking filtering and an SAO and/or ALF procedure may be applied to the reconstructed samples as described above.

Figure 10:
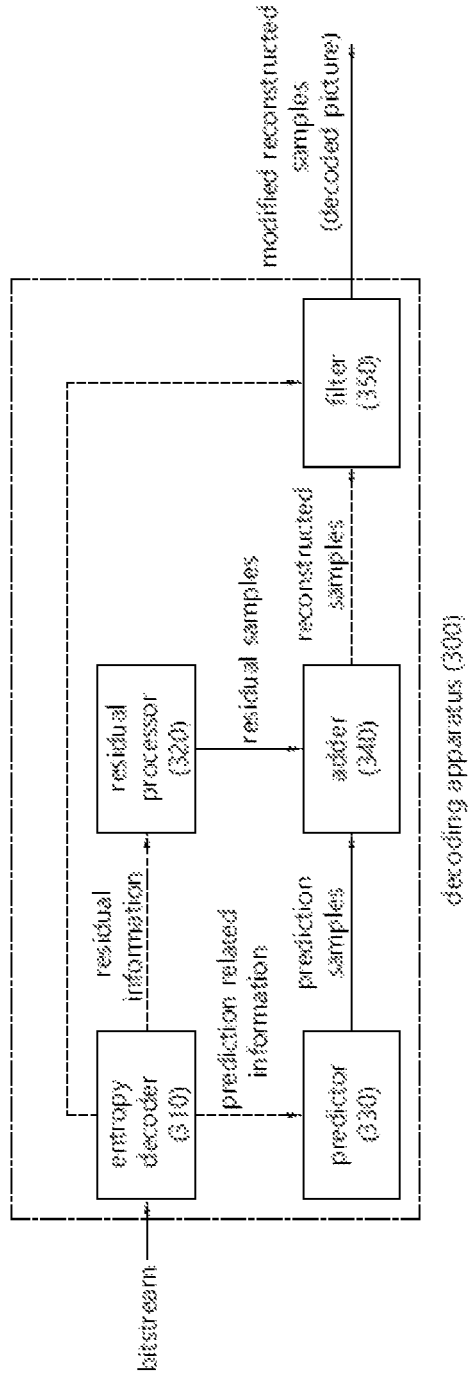
FIG. 10 schematically shows a decoding apparatus for performing an image decoding method according to this document.

FIG. 10 schematically shows a decoding apparatus for performing an image decoding method according to this document. The method disclosed in FIG. 9 may be performed by the decoding apparatus disclosed in FIG. 10. Specifically, for example, the entropy decoder of the decoding apparatus of FIG. 10 may perform S900 of FIG. 9, the predictor of the decoding apparatus of FIG. 10 may perform S930 of FIG. 9, the residual processor of the decoding apparatus of FIG. 10 may perform S910 to S920 and S940 to S950 of FIG. 9, and the adder of the decoding apparatus of FIG. 10 may perform S960 of FIG. 9.

According to the present disclosure as described above, in order to derive the chroma quantization parameter for the chroma components, the chroma quantization parameter for the chroma components can be derived using the chroma QP mapping table derived based on the signaled chroma quantization parameter data without using the default chroma QP mapping table, and through this, coding efficiency can be improved through performing coding based on the quantization parameter according to the characteristics of the image.

Further, according to the present disclosure, the chroma QP mapping table can be derived based on the syntax element representing the delta value used to derive the input coordinate of the point of the chroma QP mapping table and/or the syntax element representing the delta value used to derive the output coordinate of the point of the chroma QP mapping table, and coding efficiency can be improved by performing the coding based on the chroma QP mapping table in which the characteristics of the image is reflected more specifically.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 11:
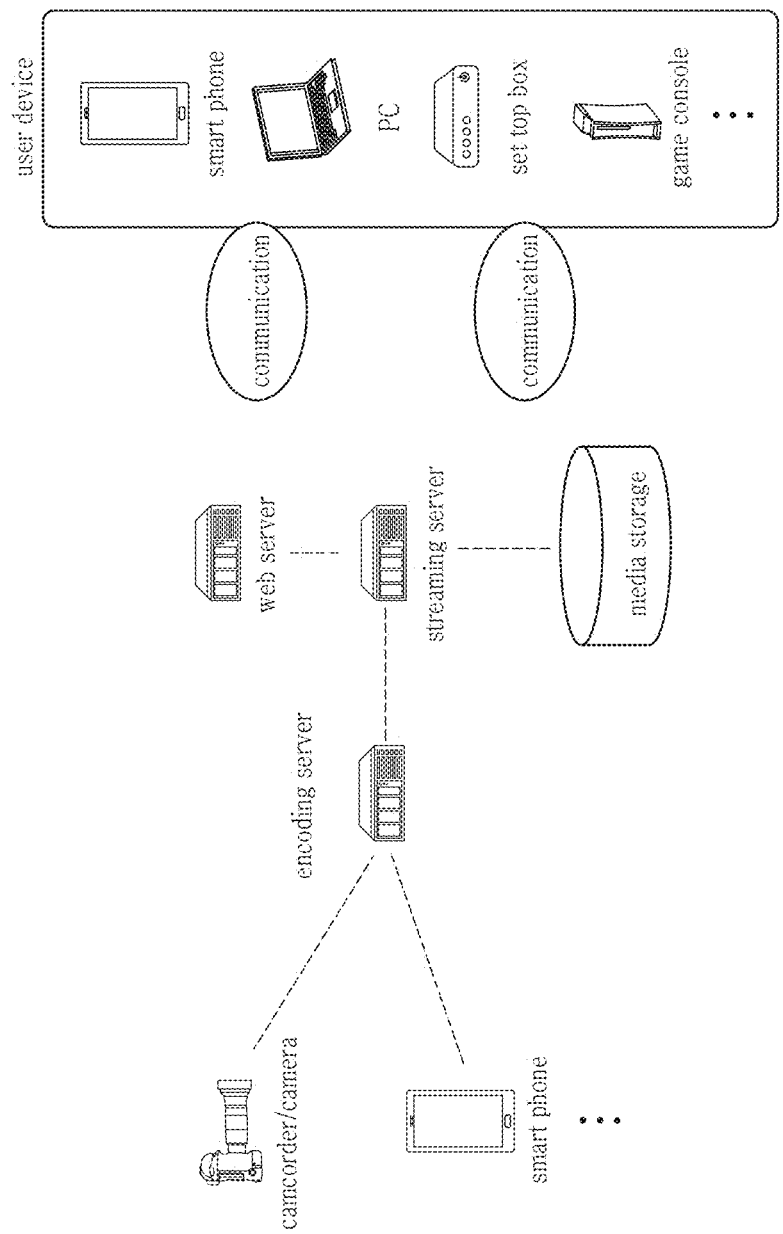
FIG. 11 illustrates a structural diagram of a contents streaming system to which the present disclosure is applied.

FIG. 11 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method, performed by a decoding apparatus, the method comprising:
    obtaining image information including prediction information and residual information for chroma components and chroma quantization parameter data of at least one chroma Quantization Parameter (QP) mapping table for the chroma components;
    deriving the chroma QP mapping table based on the chroma quantization parameter data;
    deriving a chroma quantization parameter for the chroma components based on the chroma QP mapping table;
    deriving prediction samples for the chroma components by performing inter prediction or intra prediction based on the prediction information;
    deriving transform coefficients for the chroma components based on the residual information;
    deriving residual samples by dequantizing the transform coefficients based on the chroma quantization parameter; and
    generating a reconstructed picture based on the prediction samples and the residual samples,
    wherein the chroma quantization parameter data includes a syntax element for the number of points in the chroma QP mapping table, a syntax element for a delta value used to derive an input coordinate of a target point of the chroma QP mapping table, and a syntax element for a delta value used to derive an output coordinate of the target point of the chroma QP mapping table,
    wherein the chroma quantization parameter data is signaled through a sequence parameter set (SPS),
    wherein the chroma QP mapping table for the chroma components is derived based on (i) a flag related to whether one chroma QP mapping table is signaled and applied for a Cb component, a Cr component, and a joint CbCr component and (ii) a joint CbCr enable flag,
    wherein, based on a value of the flag being equal to 1, the one chroma QP mapping table is signaled and applied for the Cb component, the Cr component, and the joint CbCr component, and
    wherein, based on the value of the flag being equal to 0 and a value of the joint CbCr enable flag being equal to 1, a plurality of chroma QP mapping tables including each chroma QP mapping table for each of the Cb component, the Cr component, and the joint CbCr component are signaled.

2. An image encoding method performed by an encoding apparatus, the method comprising:
    deriving prediction samples for chroma components based on inter prediction or intra prediction;
    deriving residual samples for the chroma components based on the prediction samples;
    generating chroma quantization parameter data of at least one chroma Quantization Parameter (QP) mapping table for the chroma components; and
    encoding prediction information for the chroma components, residual information for the chroma components, and the chroma quantization parameter data,
    wherein the chroma quantization parameter data includes a syntax element for the number of points in the chroma QP mapping table, a syntax element for a delta value used to derive an input coordinate of a target point of the chroma QP mapping table, and a syntax element for a delta value used to derive an output coordinate of the target point of the chroma QP mapping table,
    wherein the chroma quantization parameter data is signaled through a sequence parameter set (SPS),
    wherein the chroma QP mapping table for the chroma components is derived based on (i) a flag related to whether one chroma QP mapping table is signaled and applied for a Cb component, a Cr component, and a joint CbCr component and (ii) a joint CbCr enable flag,
    wherein, based on a value of the flag being equal to 1, the one chroma QP mapping table is signaled and applied for the Cb component, the Cr component, and the joint CbCr component, and
    wherein, based on the value of the flag being equal to 0 and a value of the joint CbCr enable flag being equal to 1, a plurality of chroma QP mapping tables including each chroma QP mapping table for each of the Cb component, the Cr component and the joint CbCr component are signaled.

3. A non-transitory computer-readable storage medium storing a bitstream generated by a method, the method comprising:
    deriving prediction samples for chroma components based on inter prediction or intra prediction;
    deriving residual samples for the chroma components based on the prediction samples;
    generating chroma quantization parameter data of at least one chroma Quantization Parameter (QP) mapping table for the chroma components;
    encoding prediction information for the chroma components, residual information for the chroma components, and the chroma quantization parameter data; and
    generating the bitstream including image information comprising the prediction information, the residual information, and the chroma quantization parameter data,
    wherein the chroma quantization parameter data includes a syntax element for the number of points in the chroma QP mapping table, a syntax element for a delta value used to derive an input coordinate of a target point of the chroma QP mapping table, and a syntax element for a delta value used to derive an output coordinate of the target point of the chroma QP mapping table,
    wherein the chroma quantization parameter data is signaled through a sequence parameter set (SPS),
    wherein the chroma QP mapping table for the chroma components is derived based on (i) a flag related to whether one chroma QP mapping table is signaled and applied for a Cb component, a Cr component, and a joint CbCr component and (ii) a joint CbCr enable flag, wherein, based on a value of the flag being equal to 1, the one chroma QP mapping table is signaled and applied for the Cb component, the Cr component, and the joint CbCr component, and wherein, based on the value of the flag being equal to 0 and a value of the joint CbCr enable flag being equal to 1, a plurality of chroma QP mapping tables including each chroma QP mapping table for each of the Cb component, the Cr component, and the joint CbCr component are signaled.

4. A transmission method of data for image, the method comprising:

obtaining a bitstream of image information including prediction information for chroma components, residual information for the chroma components, and chroma quantization parameter data of at least one chroma quantization parameter (QP) mapping table for the chroma components; and transmitting the data including the bitstream of the image information including the prediction information, the residual information, and the chroma quantization parameter data, wherein the chroma quantization parameter data includes a syntax element for the number of points in the chroma QP mapping table, a syntax element for a delta value used to derive an input coordinate of a target point of the chroma QP mapping table, and a syntax element for a delta value used to derive an output coordinate of the target point of the chroma QP mapping table, wherein the chroma quantization parameter data is signaled through a sequence parameter set (SPS), wherein the chroma QP mapping table for the chroma components is derived based on (i) a flag related to whether one chroma QP mapping table is signaled and applied for a Cb component, a Cr component, and a joint CbCr component and (ii) a joint CbCr enable flag, wherein, based on a value of the flag being equal to 1, the one chroma QP mapping table is signaled and applied for the Cb component, the Cr component, and the joint CbCr component, and wherein, based on the value of the flag being equal to 0 and a value of the joint CbCr enable flag being equal to 1, a plurality of chroma QP mapping tables including each chroma QP mapping table for each of the Cb component, the Cr component, and the joint CbCr component are signaled.

* * * * *